United States Patent [19]
Murashita et al.

[11] Patent Number: 5,861,922
[45] Date of Patent: *Jan. 19, 1999

[54] IMAGE DATA CODING AND RESTORING METHOD AND APPARATUS FOR CODING AND RESTORING THE SAME

[75] Inventors: Kimitaka Murashita; Tsugio Noda, both of Kawasaki, Japan

[73] Assignee: Fujitsu Ltd., Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 631,908

[22] Filed: Apr. 12, 1996

Related U.S. Application Data

[63] Continuation of Ser. No. 121,637, Sep. 16, 1993, abandoned.

[30] Foreign Application Priority Data

Sep. 16, 1992 [JP] Japan .................................. 4-246245
Jul. 7, 1993 [JP] Japan .................................. 5-168078

[51] Int. Cl.⁶ .................................................... H04N 7/24
[52] U.S. Cl. .......................................... 348/420; 348/390
[58] Field of Search .................................. 348/402, 412, 348/413, 415, 416, 699, 384, 390, 401, 420; H04N 7/130

[56] References Cited

U.S. PATENT DOCUMENTS

| | | |
|---|---|---|
| 4,667,233 | 5/1987 | Furukawa . |
| 4,809,067 | 2/1989 | Kikuchi et al. . |
| 4,837,618 | 6/1989 | Hatori et al. ............................ 348/401 |
| 4,862,264 | 8/1989 | Wells et al. ............................. 348/416 |
| 5,046,071 | 9/1991 | Tanoi ....................................... 348/415 |
| 5,057,916 | 10/1991 | Krause et al. . |
| 5,235,419 | 8/1993 | Krause .................................... 348/416 |

FOREIGN PATENT DOCUMENTS

| | | |
|---|---|---|
| 0 084 270 | 7/1983 | European Pat. Off. . |
| 0 434 427 A2 | 6/1991 | European Pat. Off. . |
| 2 207 829 | 2/1989 | United Kingdom . |

OTHER PUBLICATIONS

ICASSP.89, Multidimensional Signal Processing, Glasgow (GB), 23–26 May 1989 'Thyagarajan et al: "Image sequence coding using interframe VDPCM & motion compensation", IEEE, vol. 3, pp. 1858–1861'.

Electronics. DE 1984 A 1985: Electronics Week, vol. 57, No. 2, Jan. 1984, New York US, pp. 113–115, Anderson et al. 'codec squeezes color teleconferencing through digital telephone lines'.

Proceedings of Eusipco–90, 18–21 Sep. 1990, Barcelona (ES), Signal Processing V 'Sallent et al: "Simulation of a teleconference codec for ISDN", Elsevier, vol.II, pp. 793–796'.

IEEE Transactions On Communications, vol. 29, No. 12, Dec. 1981, New York US pp. 1977–1981 Matsui et al. 'High–Speed Transmission Of Sequential Freeze–Pictures By Extracting Changed Areas'.

PCT International Application Number WO 87/03768, dated 18 Jun. 1987.

*Primary Examiner*—Richard Lee
*Attorney, Agent, or Firm*—Staas & Halsey

[57] ABSTRACT

When encoding the continuous image by dividing the respective frames into a plurality of blocks, the image in the block in the present frame is compared with a corresponding image in the block in the same position of the reference frame and the amount of the changes of the predetermined image element within respective blocks is calculated. Only when the amount of change exceeds the predetermined threshold value, the image data of respective blocks is coded. A plurality of threshold values can be adapted and appropriately changed by considering a spatially changing pattern of the amount of the change of the image from the reference frame or a refreshing operation.

15 Claims, 57 Drawing Sheets

Fig. 10

BLOCK INFORMATION: 1 0 1 0 0 ——— 0 1

CODED DATA ABOUT VALID BLOCKS: VALID BLOCK 1 | VALID BLOCK 3 | … | VALID BLOCK $\ell$

IMAGE DATA CODING AND RESTORING METHOD AND APPARATUS FOR CODING AND RESTORING THE SAME

This application is a continuation of application Ser. No. 08/121,637, filed Sep. 16, 1993, now abandoned.

BACKGROUND OF THE INVENTION

1. Field of the Invention

The present invention relates to an image data coding method of coding the image data with a high efficiency, an apparatus for coding an image data, a restoring method of decoding the coded image and an apparatus for restoring the same and more particularly to an image data coding and decoding method of dividing the image data into a plurality of blocks to produce the coded data of all the images related to the respective blocks obtained by dividing the image data.

2. Description of the Related Art

In the field of a television conference/television telephone involving colored static images and colored moving image, the image data whose information capacity is much greater than typical numerical data are used, and more particularly, the data of the intermediate level of the image, or the colored image data requires high-speed and high quantity transmission. Therefore, it is necessary to process the coding of the values of the respective image elements with a high efficiency.

The adaptive discrete cosine transform method is known as an example of an image data coding method with a high efficiency.

This adaptive discrete cosine transform method (which is abbreviated as ADCT) divides the image into a plurality of blocks comprising, for example, 8×8 image elements, transforms the image signal of respective blocks into (two-dimensional DCT coefficients corresponding to the distributions of the space frequency by the two-dimensional discrete cosine transform), quantizes the two-dimensional DCT coefficient within a block obtained by the transform by using a threshold value suitable for vision, and then encodes the quantized coefficient by using a huffman table obtained statistically.

The conventional coding device for the static image using the ADCT encodes the respective images separately, even if the respective values between images do not change greatly because of a close interrelation between them, for example, in the case of a moving image which is considered as a group of static images.

FIG. 1 shows an example of a structure of the conventional coding apparatus for a static image.

A static image is divided into a plurality of blocks comprising 8×8 image elements, for example, and is inputted from the input terminal 11 and the respective image signals are sequentially restored in the input order to the block buffer 12.

The two-dimensional DCT unit 13 reads the respective image signals from block buffer 12 by transforming the image signal corresponding to a plurality of image elements in respective blocks into the two-dimensional DCT coefficient corresponding to the space frequency of the same number as the plurality of image elements by using the two-dimensional discrete cosine transform.

Linear quantization unit 14 quantizes the two-dimensional DCT coefficient (matrix) of respective blocks by using the quantizing threshold value (quantizing matrix) which is suitable for vision and obtained from visual experimentation. The linear quantization unit 14 reads the quantizing threshold value from a quantizing threshold unit.

Variable length coding unit 16 performs a variable length coding of the quantization coefficient obtained by quantizing unit 14 by using the huffman coding table 17 obtained statistically, and outputs from the output terminal 18 the coded data obtained from the variable length coding method.

In the variable length coding method, the quantizing coefficient (matrix) arranged in a two-dimensional manner is converted to a one-dimensional train of numerical values by using a scanning operation called zig-zag scanning and performs a variable length coding based on the difference between the head DCT coefficient of a block and the head DCT coefficient of the preceding block with regard to the DC component. The value of the valid coefficients whose value is not zero is combined with the length of run (Run-length of the invalid coefficient whose value is zero), thereby applying the variable length coding to respective blocks.

FIG. 2 shows a structure of a conventional restoring apparatus of the static image for restoring data coded by the above-recited variable length coding to the images.

The data coded by the coding apparatus for the static image is inputted from the input terminal 21 to variable length restoring unit 22 in units of blocks.

The variable length restoring unit 22 restores the quantizing coefficient of the DC component and AC components in the respective blocks using the huffman coding table 17 (huffman decoding table 27) which is used in the above variable length coding.

Dequantization unit 23 converts the decoded quantization coefficient of respective DC component and AC component into the two-dimensional DCT coefficients by using the quantized value 29 (quantized matrix).

Inverse DCT transforming unit 24 performs the two-dimensional DCT transform by using the two-dimensional DC coefficient of the respective blocks which are decoded and restored as the image elements.

The image signal of respective restored image elements is stored within the image memory 25 in units of blocks.

An operation of the image signal of respective image elements at image blocks into the image memory 25 is controlled by inside-block image element writing controlling unit 26 and controls the block address generating unit 27 and enables it to output an address of a block in which the image signal is to be written into the image memory 25 and performs a writing operation of the image signal of respective image elements of the present frame into the image memory 25 in units of blocks.

There is a method of coding a moving image which is subject to a continuous scene, i.e. a television conference or a television telephone system. Conventionally, the respective images are subject to the methods of coding the moving images.

FIG. 3 shows a block diagram of a basic part of the moving image coding apparatus by using an inter-frame prediction coding method of utilizing a relation between the image in reference frame and the image in the present frame.

The image of respective scenes of the moving image is inputted to difference image generating unit 32 through input terminal unit 31.

The reference image which is obtained by restoring the image in the preceding frame and is used as the image in the reference frame.

The difference generating unit 32 obtains the difference image between the reference images stored in an image memory 33 and the present image (the image in the present frame) inputted from the input terminal 31 and stores the difference image in block buffer 34. The difference image can be obtained for respective blocks comprising image elements of 8×8, for example. Therefore, the block buffer 34 stores the difference image i.e difference block image between the block in the reference frame of 8×8 image element, for example and the corresponding block in the present frame of 8×8 image elements with regard to the blocks in the same position.

The two-dimensional DCT transform 35 applies the two-dimensional DCT transform to the difference block image of 8×8 image elements stored in the block buffer 34 obtains the 8×8 DCT coefficients, and thereby outputs them to quantization unit 36.

Quantization unit 36 applies a linear quantization to 8×8 coefficients by using adequate threshold value applicable to an eyesight, thereby providing 8×8 quantized coefficients.

The 8×8 quantization coefficients are subject to zig-zag scanning and is outputted to variable length coding unit 37 in the order of the DC component, AC components with a low space frequency AC components with relatively high space frequency.

The variable coding unit 37 performs a variable length coding of the 8×8 input quantized coefficients by using huffman coding table 38 and outputs the data coded by the variable length coding from the output terminal 39.

The 8×8 quantizes coefficient matrix outputted from quantization unit 36 is inputted to the dequantization unit 39 and the dequantization unit 39 restores it into the two-dimensional DCT coefficient matrix.

Inverse two-dimensional DCT transform unit 40 performs the inverse two-dimensional DCT transform by using 8×8 two-dimensional coefficient and restores the above difference block image.

The adding unit 41 adds the restored difference block image to the preceding image of the block in the same position in the reference image as in the position in the present block image and again rewrites the image obtained by the addition into the image memory 33.

The above-recited sequential operation is applied to all the blocks of the image (the present image) of the new frame inputted from the input terminal 41, thereby enabling the coded data of the difference image regarding all the blocks of the present image to be outputted from the output terminal 39. As discussed above, the image data of the present frame is not coded as it is and a difference image between the reference frame and the present frame is coded, thereby decreasing the amount of the coding. The same image as restored from the image of the present frame, which is restored based on the coded data of the difference image on the image restoring side, is stored in the image memory 33 as the reference image to be used as the image of the reference frame when the image of the succeeding frame is inputted from the input terminal 31.

FIG. 4 shows a principle structure of a conventional restoring apparatus of the moving image for restoring the image of the coded data outputted from the conventional coding device for the moving image.

A variable length restoring unit 52 inputs the coded data obtained by applying a variable length coding to the difference image in units of block from the input terminal 51 and restores the coded data into quantization coefficients in units of blocks by using Huffman coding table 58, which is the same as the Huffman coding table 38 in the conventional coding apparatus for the moving image.

Dequantization unit 53 performs a dequantization of quantization coefficients of respective blocks by using the same matrix as used in the dequantization units 39 in the coding apparatus for the moving image, and restores the two-dimensional DCT coefficients of respective blocks. Inverse two-dimensional DCT transforming unit 54 restores the difference image of respective blocks by performing the inverse two-dimensional DCT conversion in units of blocks by using the two-dimensional DCT coefficient matrixes of respective blocks.

Adding unit 55 adds the decoded difference image of respective blocks to the image in the block in the same position in image memory 56 and the image obtained by this adding operation is rewritten in image memory 56.

A writing operation of a restored image into image memory 56 for respective blocks is controlled by intra-block image element write controlling unit 57. Intra-block image element write controlling unit 57 controls block address generating unit 59 and outputs an address of the particular block which is stored in the image memory and to which the difference image is added, to image memory 56 from block address generating unit 59, thereby writing the restoration image of respective frames in the image memory 56 in units of blocks.

The above sequential process is applied to the coded data of the difference image of all blocks of respective frames of the image and thus image memory 56 stores the restoration image of respective frames.

However, the above recited conventional technology has the following problems.

In the conventional coding technology of the static image, even respective images having small variation between continuous images are independently coded. Thus, even if the variation between the continuous images is very small such as images for a moving or a television telephone having a camera fixed, the compression ratio cannot be increased.

When the coding technology for the moving image as shown in FIG. 3 is used, the compression ratio can be raised owing to the difference coding method but it requires a larger scale of apparatuses. In the conventional coding apparatus for the moving image, the difference image between the present frame and the reference frame is calculated and the image of the reference frame to be used for obtaining the difference image is stored in the image memory 33. The variable length coding to the above ADCT is irreversible coding (information loss coding) and thus the error of the difference image from the original image becomes large when the number of accumulations exceeds a predetermined number and thus the quality of the image stored in the image memory 32 is decreased evidently. Therefore, it is necessary to refresh the image in an inter-frame mode at a predetermined number of frame intervals.

The inter-frame mode performs a variable length coding of the input image according to the ADCT in the similar manner to the conventional coding apparatus for the static image.

When the inverse two-dimensional DCT transform unit 40 used in the conventional decoding apparatus of the moving image is different from the two-dimensional DCT transform unit 54 used in the conventional coding apparatus for the moving image in respect of an operation or operation method, the errors generated in coding operations are stored and accumulated in the image memories 33 and 56, the noise caused by the accumulated errors becomes evident. Therefore, CCITT recommendation H-261 recommends that a refreshing operation should be performed at least once by using the above inter-frame mode during the period of 132 coding operations to solve the above problem of the accumulated errors generated due to a mis-match between the inverse two-dimensional DCT transform unit 40 and 54 in both apparatuses.

In the inter-frame mode, the image data of all blocks of one frame is coded as it is and the coded data of all blocks of one frame are transmitted to the receiving side. The frame in which such a coding is performed is called a refresh frame and such a coding is called refreshing. A quantity of the coding of the refresh frame in which the image data of all the blocks of one frame are coded as is, is greatly different from the quantity of coding of the ordinary frame in which only the difference image is coded. Namely, a quantity of the coding of the refresh frame is usually larger than that of the ordinary frames.

Therefore, when the image is transmitted by performing the data compression using such a high efficiency coding method as described above in television conference or a television telephone, the receiver of the coded data restores the frame after a longer time period passes upon receipt of the coded data of the refreshing frame than upon receipt of the coded data of an ordinary frame.

This difference in receiving time causes a receiver of the image to feel it naturally long.

When the image is transmitted at ten frames per second through an ISDN (Integrated Service Digital Network) with the transmission rate of 64 Kbps provided by a Japanese Telecommunication and Telephone Company, the amount of coded data of one frame should be less than 6400 bits.

Generally speaking, a quantity of coded data of one frame in the case of the ordinary frame can be compressed less than 6400 bits but the quantity of the coded data of one frame in the case of the refreshed frame is sometimes more than 6400 bits.

When a quantity of coded data per one frame exceeds the maximum quantity of coded data (which is 6400 bits in this case) of one frame which is originally assigned to one frame, the transmission processing of the refresh frame cannot be completed within the processing time assigned to the refresh frame and is extended into the processing time of the next frame.

In this case, the coding process of the next frame is not performed and the transmission process of the refresh frame will be performed. As a result, the frame which is not subject to the coding process is not transmitted to the receiving side and the monitor screen on the receiving side is displayed with one frame missing.

This example is shown in FIG. 5.

In FIG. 5, the third frame is a refresh frame and quantity of the coded data of the refresh frame exceeds 6400 bits. Therefore, the image of the third frame is not restored at time T3 when the image of the third frame should be restored on the monitor screen in the receiving side. An image of the third frame is restored at time T4, at which the image of the fourth frame should be restored. Thus, the image of the frames following the fourth frame are restored with one frame delay.

In the case of transferring the moving image, the coding side and decoding side have the coding buffers.

These code buffers are respectively provided in a succeeding stage of the variable length coding unit 37 and in a preceding stage of the variable length decoding unit 52 as shown in FIGS. 3 and 4. These code buffers have to store the data when the refreshing operation is performed, and thus the capacity of these code buffers depend on the maximum amount of the data of one frame, namely, the amount of data required for the refreshing operation. Accordingly, the decrease of the capacity of these code buffers greatly contribute to realization of a small size and inexpensive coding and decoding apparatus.

When the refreshing operation is performed, the image data of all the blocks of the refresh frame are coded without being subject to any process, as recited above and thus the amount of the coded data in the refreshing frame is greater than that in the ordinary frame which updates only the difference image. Therefore, there is a problem that a time spent to update the reference frame upon performing the refreshing operation becomes longer than that to update the reference frame upon coding the ordinary frame.

The variation between two consecutive frames in the moving image depends on the kind of the image. Therefore, upon performing the refreshing operation, the amount of the data is increased in the case of the image with a large movement and thus the refreshing operation sometimes cannot satisfy various conditions of the transmission line such as an information transmitting rate and the number of frames transmitted per unit time.

There is also a problem that the image appears strange as if it flashes at the time of the refreshing operation since a large amount of errors compared to the original image is accumulated in the image data of the reference frame before the refreshing operation is applied to the reference frame.

SUMMARY OF THE INVENTION

An object of the present invention is to provide an image data proceeding method and apparatus for coding and decoding consecutive images in which variation between two consecutive images is small by using a small scale circuit with a high efficiency apparatus performing the same.

Another object of the present invention is to display the refresh frame having a large amount of coded data by using a code buffer of a small size so that the receiver does not feel or recognize a waiting time even in the case of the refresh frame.

A further object of the present invention is to update the reference frame at a high speed when the refresh operation is performed.

A further more object of the present invention is to transmit the image in an optimum manner in accordance with various conditions such as an information transmission rate of the transmission line and the number of frames to be transmitted per unit time with regard to respective frames.

A still further object of the present invention is to enable the refreshment operation so that it can be performed without causing the refreshing frame to appear strange.

The present invention provides an image data coding method for coding image data in units of blocks by dividing a frame into a plurality of blocks comprising a step for comparing the image data in the block in the present frame corresponding to the image data in the block in the same position of the reference frame and determining the existence of change in the image in the block of the present frame compared to the corresponding image in the block in the same position of the reference frame, and a step for outputting the block information designating a valid block in which the image changes from the reference frame or an invalid block in which the image does not change from the reference frame, and a step for decoding only the image data of a valid block.

Therefore, the present invention encodes only the image data of the valid block whereby the image changes from the reference frame and thus the amount of coded data in the continuous image, such as the moving image including many background portions which does not change in the image can be decreased.

The present invention is a method for decoding the image data from the coded data of the image data generated by the above image data encoding method and the block information wherein said method comprises a step for decoding the image data of the valid block from the coded data, a step for updating the address of the image memory in which the image data of the valid block is to be written, based on the content of the block information and a step for writing the decoded image data of the valid block in the image memory in accordance with the updated address.

The present invention decodes only the image data of the valid block and writes the decoded image data to a corresponding area of the image memory, thereby enabling image data to be decoded efficiently.

The present invention provides a method for encoding the continuous image data by encoding a refresh frame, by dividing it into a plurality of portions.

The present invention provides a method for encoding the image data by a first step of comparing the image data in the block in the present frame with corresponding image data in the block in the same position in the reference frame and determining the existence of change in the image in the block of the present frame compared to the corresponding image in the block in the same position in the reference frame, a second step for encoding the valid block of the present frame which is determined as having the change in the image from the reference frame in the first step when the present frame is not a refresh frame, and the third step of encoding the valid block of the reference frame and encoding the invalid block of the present frame in which the image is determined as not having the change from the reference frame in the first step after the completion of the encoding of the valid block when the present frame is a refresh frame.

When the refresh frame is encoded, only the valid block which has great affect on the decoded image is first encoded and then all the invalid blocks are encoded after the completion of all the valid blocks. Therefore, it can decode the refresh frame in a more natural manner than in the conventional art even if the amount of the codes in the refresh frame is plentiful, thereby decreasing the capacity of both on the coding side and decoding side.

The present invention provides a method of decoding an image data to decode the continuous image data comprising a first step of determining the existence of change in the image in the block in the present frame compared to the corresponding image in the block in the reference frame, a second step of encoding only the valid block of the present frame which is determined as having the change in the image from the reference frame in accordance with the first step when the frame is not a refresh frame, a third step of encoding a valid block of the present frame and then encoding the invalid block of the present frame which is determined as not having the change in the image from the reference frame in accordance with a first step at the completion of the decoding and encoding operations, when the present frame is the refresh frame, a fourth step of updating the image data in the block in the reference frame compared to the corresponding image data in the valid block in the present frame to the valid block of the coded present frame after the completion of the second step and a fifth step of switching the image data of the present frame to the image data of the reference frame after the completion of the third step.

Therefore, the present invention switches the image frame of the present frame to the image data in the reference frame in accordance with the fifth step when the coding of the refresh frame is completed in the third step and thus can update the reference frame upon a refreshing operation at a high speed.

The present invention provides an image data coding method of coding consecutive image data comprising a first step of obtaining the amount of change of the value of the predetermined image element in the block in the present frame compared to the corresponding image element in the block in the same position of the reference frame, comparing the amount of the change with the predetermined threshold value and determining the existence of the change of the image between the block in the present frame compared to the corresponding image in the block in the same position with the reference frame, a second step of coding only the valid block of the present frame which is determined as having the change in the image from the reference frame in accordance with the first step, a third step of determining whether the threshold value obtained with the first step, a third step of determining whether the threshold value obtained in the first step is appropriate, based on the quantity of the coded data obtained by the second step and changing the threshold value to another value when the threshold value is not appropriate one, thereby repeating the first and second steps until it is determined in the third step that the threshold value is appropriate.

The present invention provides a method of encoding the image data comprising a first step of obtaining the amount of change of the value of the predetermined image element in the block in the present frame compared to the corresponding image in the block at the same position of the reference frame, comparing the amount of the change with the predetermined threshold value and determining the existence of the change of the image in the block in the present frame compared to the corresponding image in the block in the same position of the reference frame, a second step of determining whether the threshold value used in the first step is appropriate, based on the above valid block of the present frame which is determined as having the change in the frame from the reference frame in the first step or that of the invalid block in the reference frame which is determined as having the change in the reference frame in the first step or that of the invalid block in the present frame which is determined as not having the change in the image from the reference frame, and changing the threshold value to another value when the threshold value is not appropriate, a third step for decoding the block of the present frame which is determined as the valid block in the first step and whose threshold value is determined as being appropriate in the second step, thereby performing the first step when the threshold value is again determined in the second step.

The present invention repeats the process of changing the threshold value to be used to determine whether the amount of the image data of the present frame, the number of valid blocks of the present frame or the number of the invalid blocks, based on the quantity of the whole image data of the present frame which is determined as the valid block or invalid block until the quantity of the code, the number of valid blocks or that of the invalid blocks are determined as appropriate and outputs the coded data when they are determined to be appropriate by the determining step, thereby being capable of coding the appropriate quantity of the coding can be achieved in accordance with a quantity of the image corresponding to the image data and a transmission line capacity.

The present invention provides a method of encoding the image data comprises a first step of obtaining the amount of the change of the determination image element forming the reference by which the existence of the change of the image in the block in the present frame compared to the corresponding image in the block in the same position in the reference frame is determined and preparing frames of the present frame with regard to the amount of the images, a second step of determining the threshold value to be used to determine the existence of change of the image in the block in the present frame compared to the block in the same position of the reference frame, based on the histogram obtained through the first step, a third step for obtaining the amount of the change of the value of the image data predetermined in the block in the present frame compared to the corresponding image in the block in the same position of the reference frame, comparing the amount of the change with the determining threshold value provided in the second step and detecting the existence of change of the image in the block in the present frame compared to the image in the reference frame, and fourth step of encoding only the image data of the valid block which is determined as change in the image from the reference frame in accordance with the third step with regard to all the blocks of the present frame.

Therefore, the present invention can transmit an optimum image in accordance with the condition of the number of the transmitted frames are units.

The present invention provides the coding image data in units of blocks by dividing frame into a plurality of blocks comprising a step of obtaining the change of the value of the predetermined image element in the block in the present frame compared to the image in the same position of the reference frame, comparing the amount of the change of the respective blocks of the present frame determining the threshold value and determining whether block of the present frame is valid block in which the image changes from the reference frame, a step of changing the determination in accordance with the result of determination, and step of coding the image data of the blocks which are determined as the valid blocks in the above determination process.

The present invention changes the magnitude of the threshold value for detecting the change of the image depending on whether the block of the present frame changes from that of the reference frame. Therefore it can determine a starting and ending in the block image change in the consecutive region of the image change appropriately even if the amount of the change of the image is not uniform in respective blocks in the region in which the image changes continuously with regard to the reference frame. It can decode the image of the consecutive region in which the amount of the change of the image is not formed in a natural manner.

BRIEF DESCRIPTION OF THE DRAWINGS

One skilled in the art can easily understand additional features and objects of this invention from the description of the preferred embodiments and some of the attached drawings. In the drawings:

FIG. 10 shows a format of coded data output from the first image data coding apparatus;

DESCRIPTION OF THE PREFERRED EMBODIMENT

Figure 1:
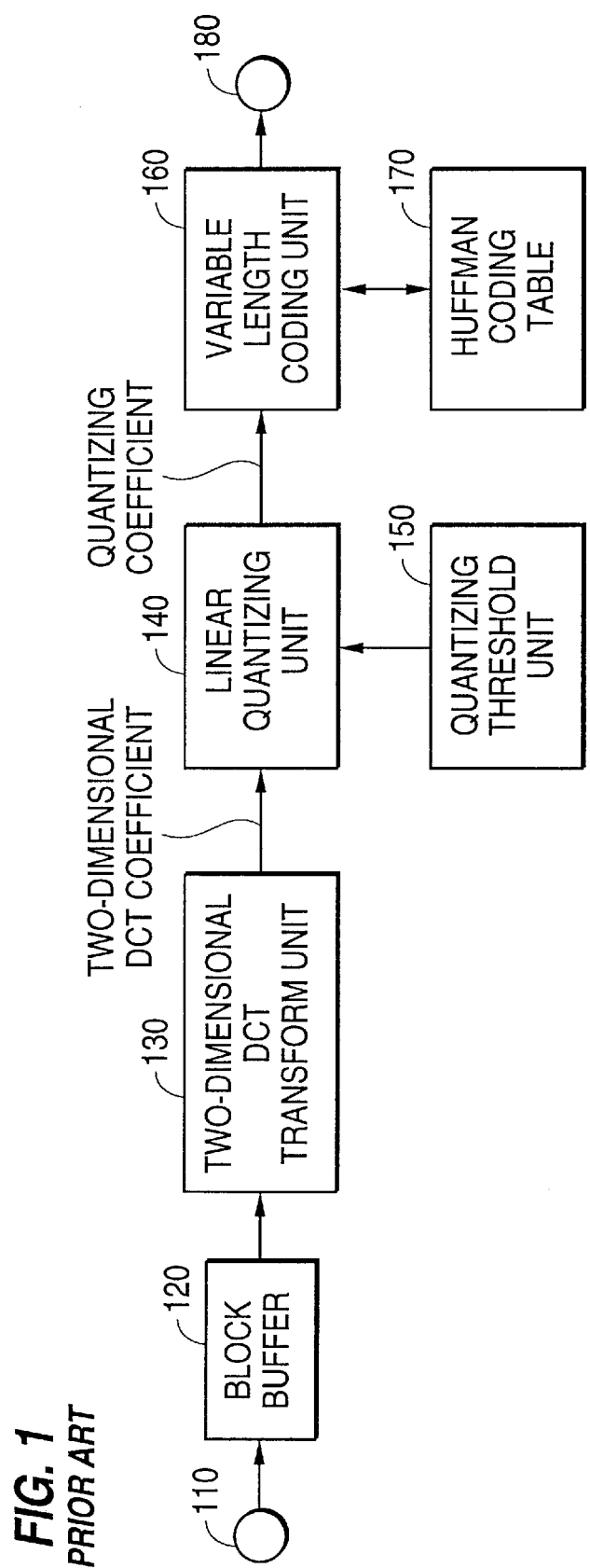
FIG. 1 shows a block diagram of a structure of the conventional coding apparatus of the static image.
Figure 2:
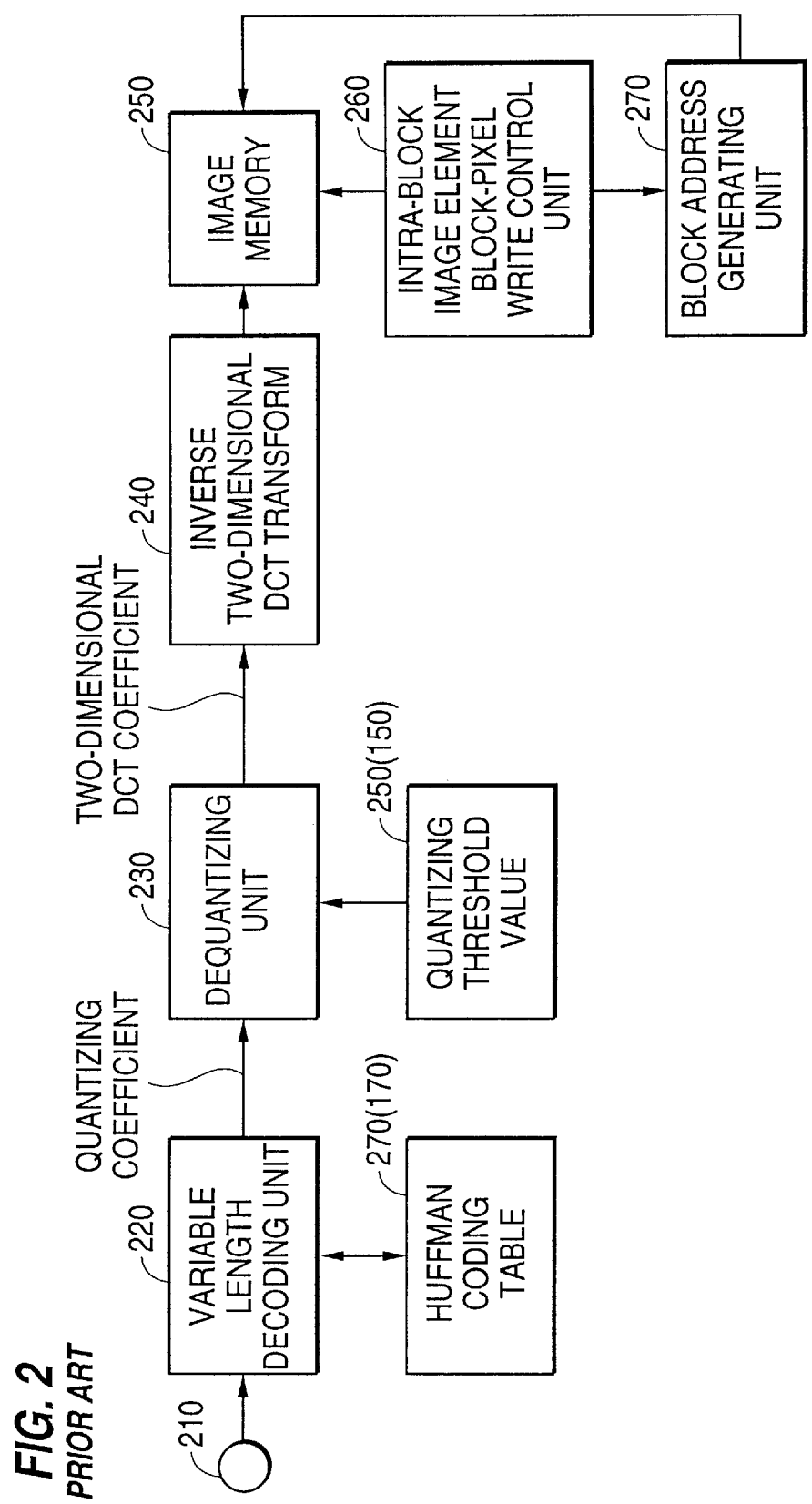
FIG. 2 shows a block diagram of a structure of conventional decoding apparatus of the static image.
Figure 3:
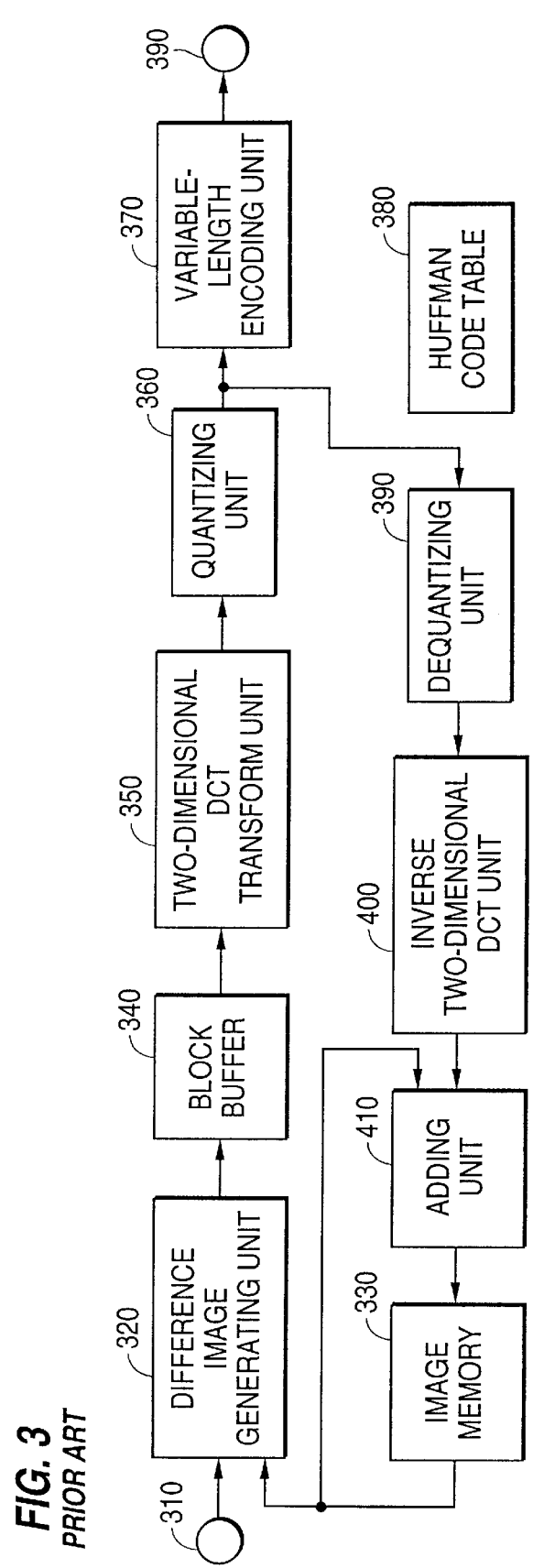
FIG. 3 shows a block diagram of a structure of a basic concept of the conventional coding apparatus for the moving image.
Figure 4:
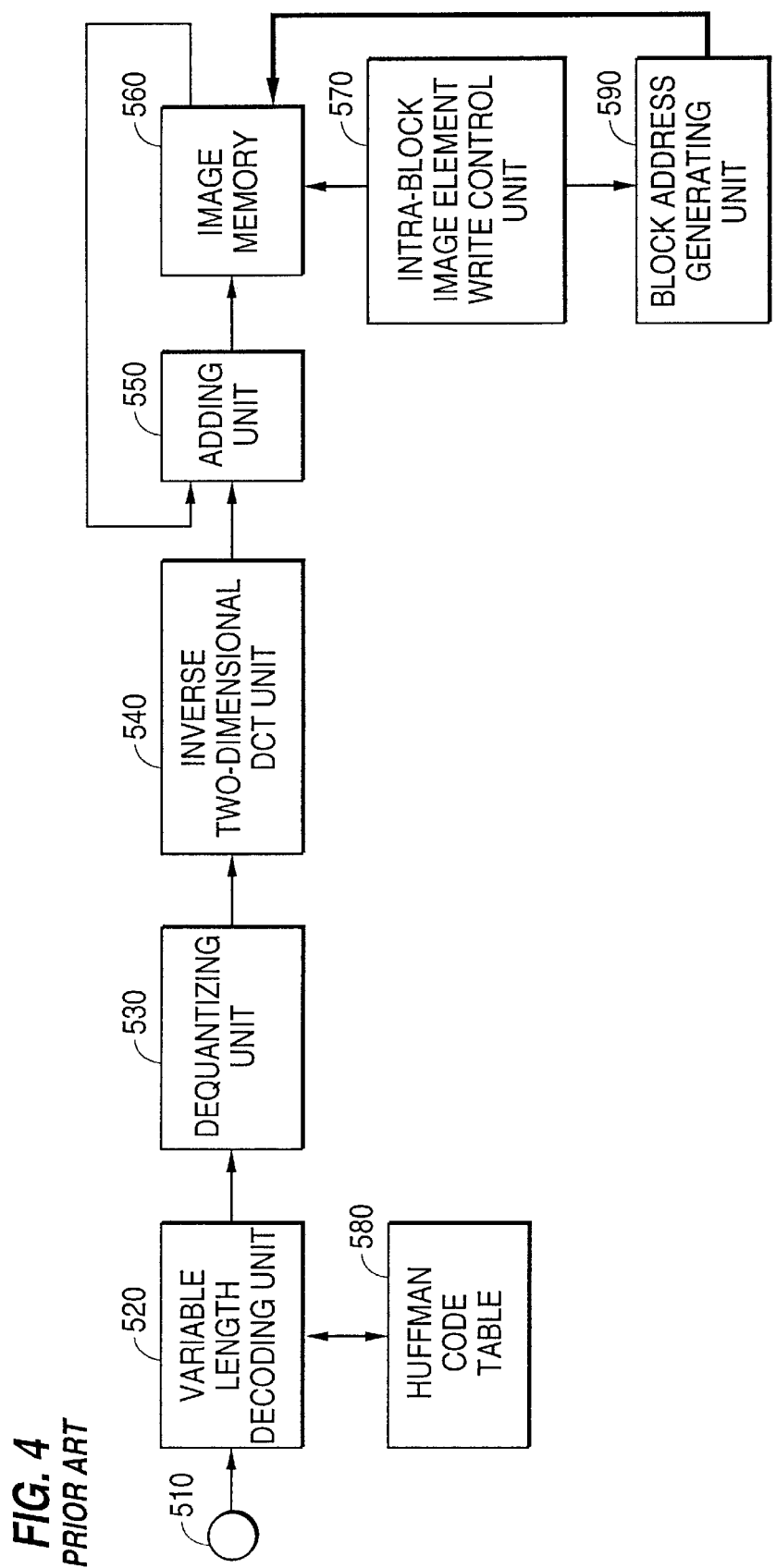
FIG. 4 shows a block diagram of a structure of the principle portion of the conventional decoding apparatus for the moving image.

The embodiment of the present invention will be explained by referring to the drawings.

Figure 6:
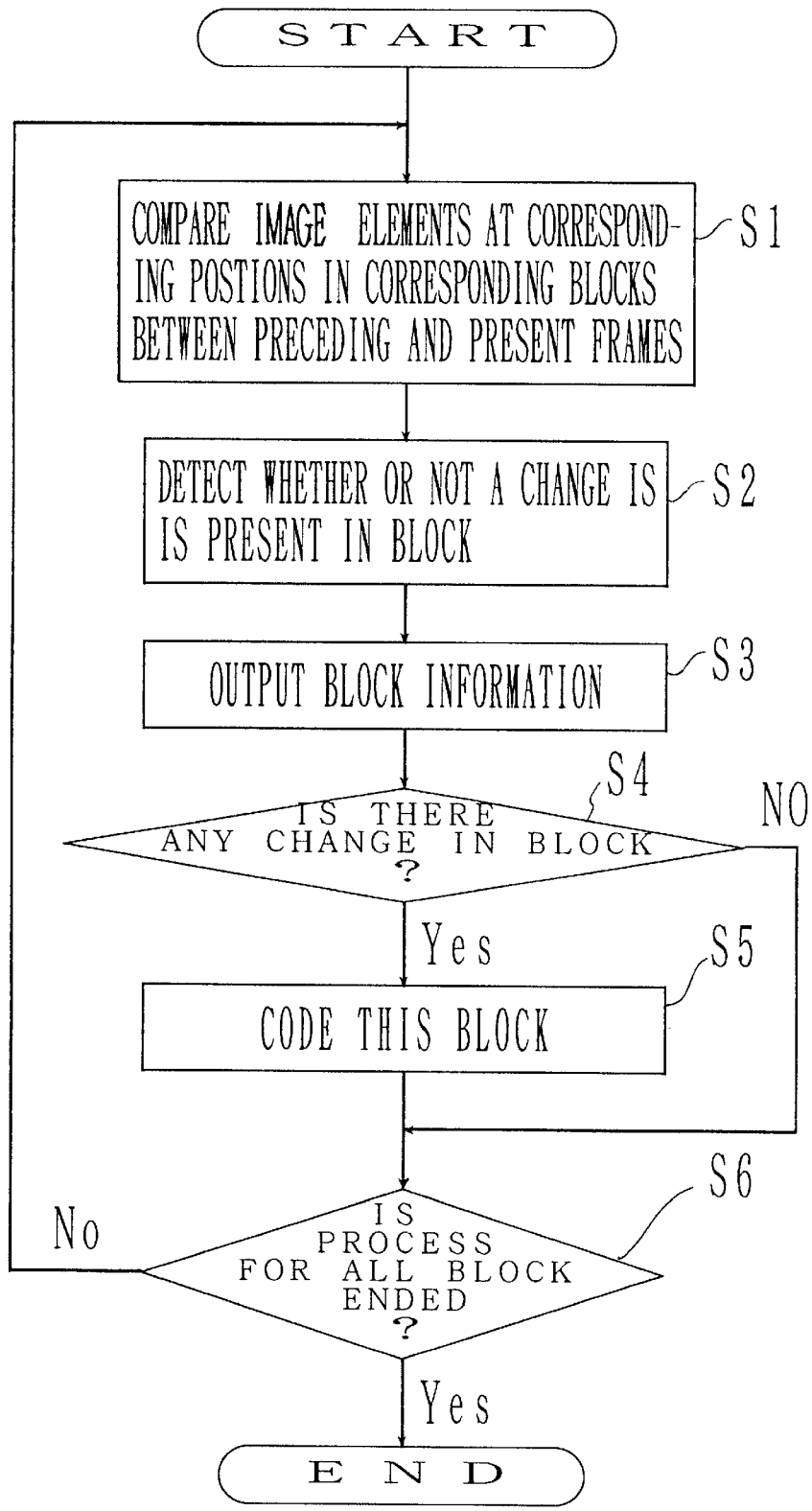
FIG. 6 shows a view for explaining the first image data coding method according to an embodiment of the present invention.

FIG. 6 shows an explanatory view of the first image data coding method according to an embodiment of the present invention. The first image data coding unit divides the image data of one frame comprising m×n image elements into a plurality of blocks (where m and n are integers), and performs a coding of the image elements of blocks.

In FIG. 6, the image element in the first block of the present frame is compared with the image element of the first block of the preceding frame with the position of the image element and block of the present frame being the same as those of the preceding frame, thereby determining whether the first block of the present frame is a valid block in which the image is different from that in the first block of the preceding frame (S1, S2).

The determination as to whether it is a valid block is performed based on using the following methods (1), (2), and (3).

(1) The sum of the absolute value of the difference between the value (for example, brightness level value) of the image element in the present frame and the present frame is obtained and the block with the sum value of the corresponding image elements in the same position in the preceding frame larger than the predetermined threshold value is deemed a "valid block". According to this method (1), the valid block is determined based on the total sum of the absolute values of the differences between the corresponding image elements and thus a variation of the whole one block can be examined.

(2) The absolute values of the difference of all the image elements are obtained for respective blocks of the present frame. The block in which the maximum value of absolute values of the difference is more than the specified value can be deemed a "valid block". This method (2) has only to detect the absolute values of the difference and thus determines the "valid value" with a simple circuit at a high rate processing.

(3) The total sum of the squares of the difference between the value of the image element in the block in the present frame and the value of the corresponding image element in the corresponding block in the same position in the preceding frame and only the block whose total sum exceeds the predetermined threshold value is deemed a "valid block". In this method (3), the variation of the image elements is based on the total sum of the squares of the difference and thus the amount of the variation is emphasized. Therefore, the variation within one block can be examined from a view point of its effect on an eyesight with accuracy.

Hereinafter, a block which is not a valid block, namely, in which the image data does not change from that of the preceding frame is expressed as an invalid block.

The result of the determination of the first block is outputted as block information representing whether the block is a valid block (S3). Sequentially, it is determined based on the determination result at step S2 whether the image data of the first block changes from the preceding frame (S4).

When the image data of the present frame changes from that of the preceding frame, the image data of the first block is coded (S5), where the first block of the present frame is determined as a valid block. If the image of the first block does not change from that of the preceding frame in step S4, the image data of the block is not coded.

The above processes S1 to S5 are repeated with regard to all the blocks following the first block of the present frame, the block information designating the valid block or the invalid block is outputted for all the blocks of the present frame and only the image data of the blocks which are determined as being a valid block in the present frame are coded.

When the above processes S1 to S5 are determined as being completed with regard to all the blocks of the present frames in step (S6, YES), the coding of the image data of the present frame is completed.

In step S5, the coding may be performed by using an orthogonal transform such as ADCT. By adopting such an orthogonal transform, a circuit scale of the coder may be made small, and the compression ratio can be increased. The block information in step S3 may be outputted to the information holding unit in the coding device. When the coding is completed for all the blocks of the present frame, the block information of all the blocks held in the information holding unit may be outputted with the coded data of the valid blocks.

When the coded data of the valid blocks is outputted, the number of continuous appearance of the invalid blocks up to the next appearance of a valid block is calculated and the number of calculated values of the continuous appearance of the invalid blocks may be outputted as the block information following the coding data, thereby decreasing the amount of the data of the block in the frame information.

The block information may be coded thereby for output after it has been compressed.

As described above, in the image data coding method according to the first embodiment, only the image data of the valid block in which the image data in the block in the present frame changes from the corresponding one in the corresponding block in the preceding frame is selected and encoded, and thus the amount of the coded data can be reduced greatly in the case of the frame including a large background portion in which the image does not change.

As the existence of the change of the image data in the block in the present frame from the corresponding image data in the preceding frame is outputted as the block information, the image data restoring side can easily determine the block in which the image changes, thereby accurately restoring the image data.

Figure 7:
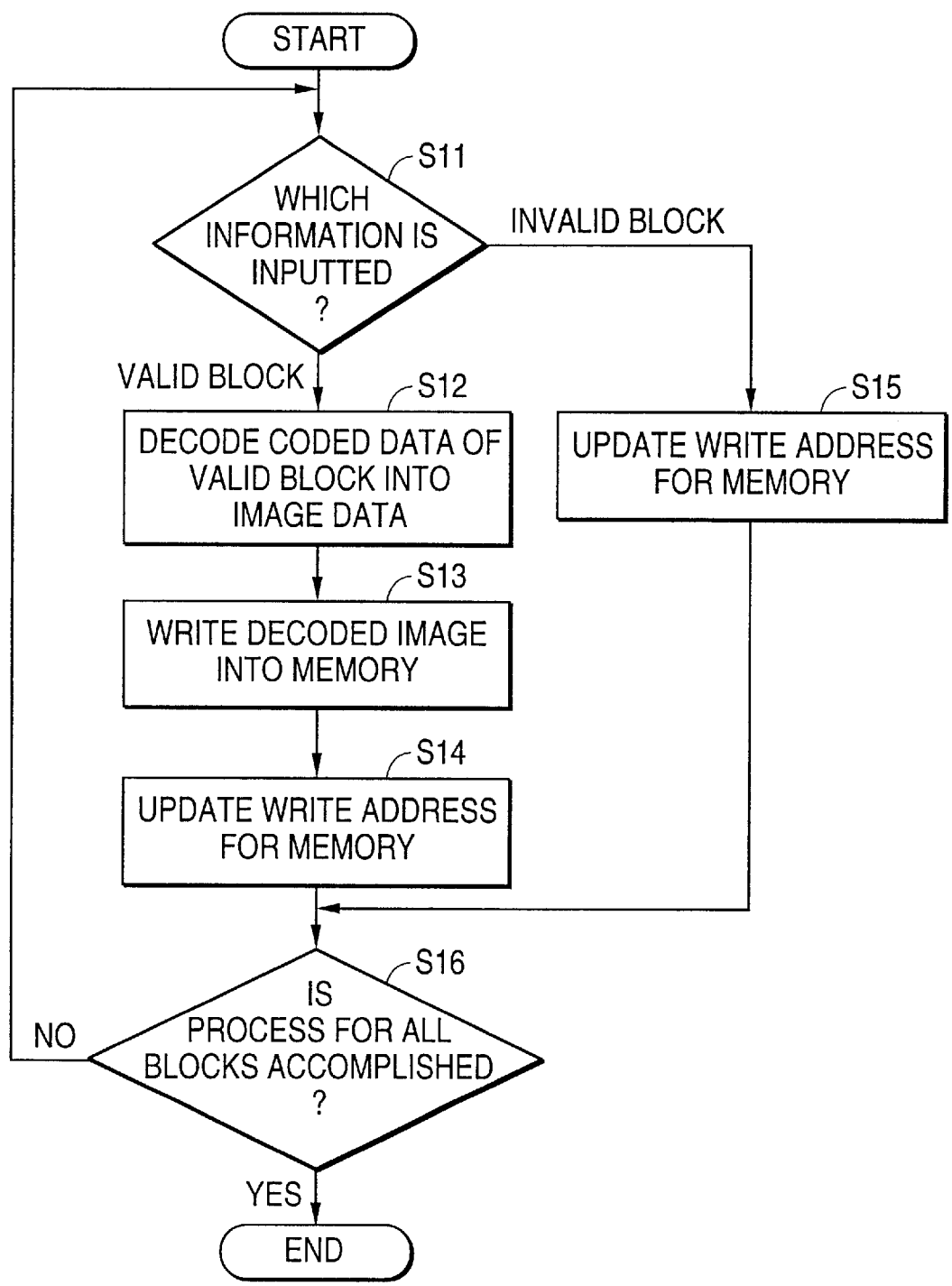
FIG. 7 shows a flow chart for explaining the first image data decoding method according to an embodiment of the present invention.

FIG. 7 shows a flow chart for explaining the first image data decoding method according to an embodiment of the present invention.

The decoding method designated by a first image data coding method decodes the coded data to the image data. According to this method, it is determined based on the block information whether each of respective blocks of the frame in which the image is to be restored is a valid block (S11).

When the block is the valid block, the coded data of the block is restored to the image data (S12). The restored image data (restored block image) is written into the predetermined block address of the image memory (S13). Then, the write address of the image memory is updated to the address of the block which should be the next subject of the restoration (S14).

In step S12, the block is determined as an invalid block, the write address for the restoration image is updated to the write address of the restoration of the next block (S15). The above steps (S11–S15) are repeated in the predetermined sequence with regard to all the blocks of the restoration frame and when it is determined yes that the restoration of the image data is completed for all the blocks (S16, YES), the restoration operation of the image data of all the blocks within one frame is completed.

According to the first image data decoding method, only the image data of the valid block is restored based on the input block information and after the restoration, the image data of the block address corresponding to the valid block in the image memory is updated to the restored image data. With regard to the invalid block whose image data does not change from that of the preceding frame, the restoration of the image data is not performed and the block address of the image memory is merely updated. Therefore, this method can restore the image data of one frame with a high efficiency at a high speed.

Figure 8:
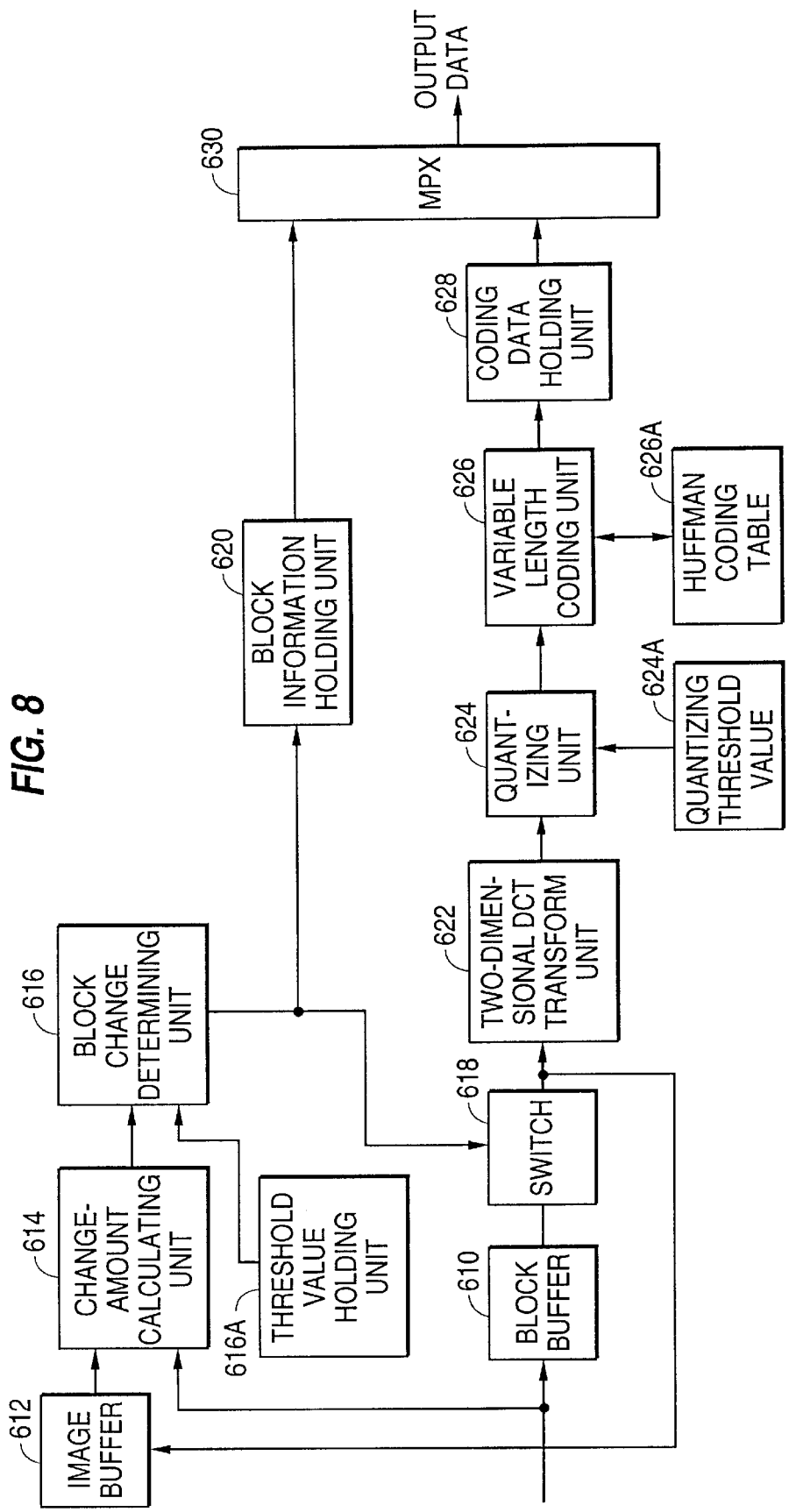
FIG. 8 shows a block diagram of a circuit of the first image data coding apparatus according to an embodiment of the present invention.

FIG. 8 shows a block diagram of a circuit of the first image data coding apparatus according to an embodiment of the present invention.

In FIG. 8, block buffer 610 sequentially stores the image data of respective blocks of the input present frame in units of blocks. Image buffer 612 stores the image data of the reference frame to be used as the image data of the preceding frame with regard to the image data of respective frames which are inputted sequentially.

Variation amount calculating unit 614 compares the image element in the block in the present frame to the corresponding image element in the blocks of the reference stored in the image buffer 612 and calculates the amount of the variation of the value of the image elements per block.

Block variation determining unit 616 compares the variation amount of the image elements of respective blocks inputted and calculated by the variation calculating unit 614 with the satisfactory value stored in the threshold value storing unit 616a and determines whether the image of respective input blocks changes from that of the reference frame. When there is a valid block whose image changes from the reference frame, the block variation determining unit 616 outputs "1" and when there is an invalid block image which does not change from the reference frame, it produces "0" as the decision determination signal.

Switch 618 outputs the image data of the present block stored in block buffer 610 to the two-dimensional DCT transform unit 620 and image buffer 612 in accordance with the determination result signal inputted from block determining unit 616. Namely, when the block determining unit 616 produces the decision result signal designating that the present block is the valid block, the image data of the present block held in the block buffer 610 is outputted to the two-dimensional DCT transform unit 622 and image buffer 612.

Image buffer 612 rewrites to the data in the present frame the image data in the block held in the reference frame which is provided in the same position as that of the present block.

Block information holding unit 620 holds variation determining information of all the blocks of the present frame inputted from the block variation determining unit 616, namely, "1" in the case of the valid block and "0" in the case of invalid block.

Two-dimensional DCT transform unit 622 performs an orthogonal transform of the image data of respective blocks of the present frame inputted from the switch 618 using the two-dimensional discrete cosine transform, thereby providing the two-dimensional DCT coefficients of the special distribution, the number of the DCT whose number is equal to the coefficients number of the image elements in the block, quantizes the two-dimensional DCT coefficient of respective blocks by using the quantizing threshold value which is obtained by visual experimentation and is adapted to the vision and is held quantization threshold value holding unit 624a.

Variable length coding unit 626 encodes the quantized coefficient obtained by quantization unit 624 by using the huffman code table stored in the huffman coding data which is obtained statistically. The coded data obtained by this variable coding method is outputted to the coded data holding unit 628.

In this variable coding method, the quantizing coefficient arranged in two-dimensional manner is converted to the one-dimensional train of numerals by a scanning process called a zigzag scan. As to the DC component, the difference between the DC component at the head of present block and that of the head of the preceding block is subject to the variable length coding. As to the AC component, the value of the valid coefficient (whose value is not zero) is combined with the length of run (run length) of the invalid coefficients whose values are zero obtained up to the next valid coefficient, thereby being subjected to a variable length coding for respective blocks. The code data holding unit 628 stores one frame of the coded data of the present frame inputted from the variable length coding unit 626.

Multiplexer MPX 630 selectively outputs the block information of the present frame held in the block information holding unit 620 and the coded data of all the blocks of the present frame are stored in the coded data holding unit 628.

Figure 9A:
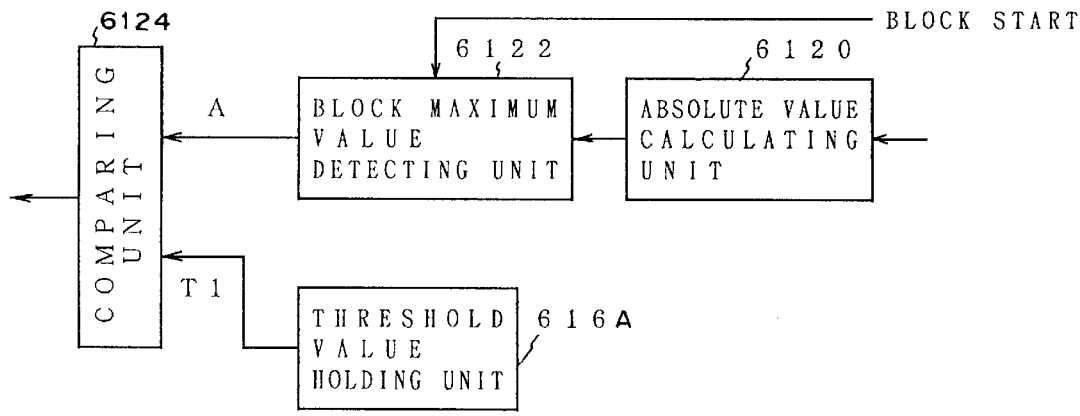
FIGS. 9A to 9C show an embodiment of the block variation determining unit.
Figure 9B:
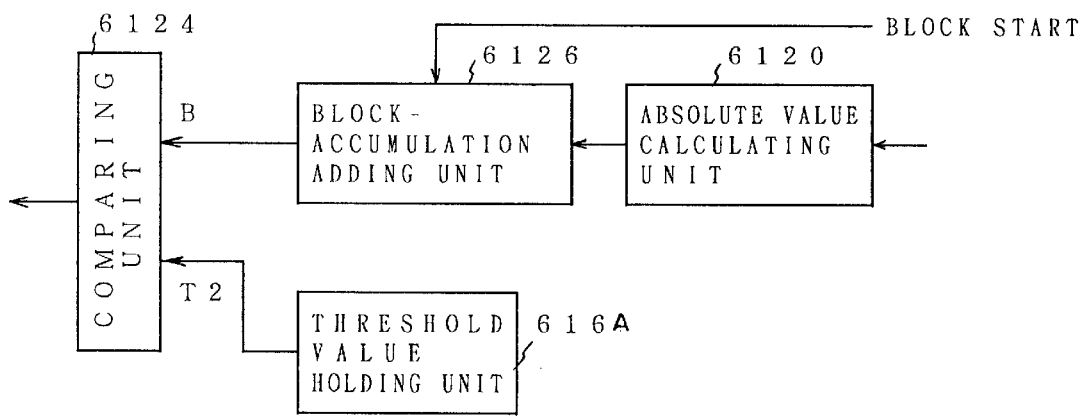
Figure 9C:
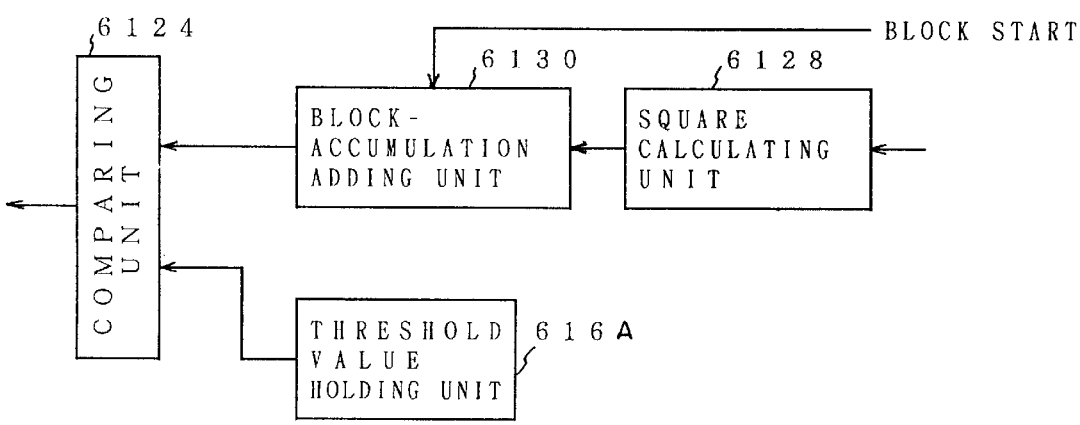

FIGS. 9A to 9C show an embodiment of the block variation determining unit 616.

FIG. 9A shows a block diagram of a circuit structure according to one embodiment of the block variation determining unit 616. Variable absolute value calculating unit 6160 calculates the absolute value of the variation of the image elements value which is inputted from the variation amount calculating unit 614 and which is determined based on the image value at the same position as that in the reference frame with regard to the respective image elements of respective blocks.

Intra-block maximum value detecting unit 6162 detects the maximum value A of the absolute value of respective blocks from the absolute value of the variation amount of the image element value of respective image elements of respective blocks inputted from the absolute value calculating unit 6160.

Threshold holding unit 616a stores the threshold value T1 for determining the invalid/valid block (existence of the variation/non-existence of the variation) with regard to respective blocks of the present frame.

When the calculation of the variation amount of the image element value regarding all the image elements of a block is completed by the absolute value calculating unit 6120, the comparing unit 6124 compares the maximum variation value A in the block which is detected by intra-block maximum value detecting unit 6122 with the threshold value T held in the threshold holding unit 616a and determines the block in which the image changes from the reference frame, namely, the valid block when the maximum variation value A is larger than the threshold value T1, thereby outputting "1". The comparing unit 6124 determines the block as the block in which the image does not change from the reference frame, namely, the invalid block if the maximum variation value A is less than the threshold value T1, thereby outputting "0" to the switch 618 and the block information holding unit 620.

The embodiment can determine whether the image has valid from the reference frame with regard to respective blocks by using a simple circuit as only the absolute value of the variation amount of respective image elements of the blocks need to be detected.

FIG. 9B shows a block diagram of a circuit structure according to the second embodiment of the block variation determining unit 616. In FIG. 9B, the absolute value calculating unit 6120 and the comparing unit 6124 are the same as those in the first embodiment.

Intra-block accumulating unit 6126 accumulates the absolute value of the variation of the image element inputted from the absolute value calculating unit 6120 and outputs the amount of the variation of the respective image element value of all the image elements in respective blocks which are obtained through the above calculation and outputted to comparing unit 6124.

Threshold holding unit 616a stores the accumulated threshold value T2 for determining the valid/invalid block (existence of change of the image/non-existence of change of the image) with regard to respective blocks of the present frame.

When the absolute value calculating unit 6120 completes the above calculation for one block and completes of the calculation of the accumulation value B, the variation of the image element value of all the image elements of the particular block is completed by the accumulating unit 6126, the comparing unit 6124 compares the accumulated value B with the accumulation threshold value T2 held by the threshold holding unit 616a. When the accumulated value B is more than the accumulation threshold value T2, the comparing unit 6124 determines that the image varies from the reference frame with regard to the block, thereby outputting "1" and when the accumulation value B is less than the accumulation threshold value T2, the comparing unit 6124 determines that the block does not carry any variation, namely, is the invalid block, thereby outputting "0" to the switch 618 and the block information holding unit 620. This embodiment determines the valid block or invalid block based on the accumulated value of the absolute variation value of all the image elements within one block, thereby checking the variation or the whole block.

FIG. 9C shows a block diagram of a circuit structure according to the third embodiment of the block variation determining unit 616. In FIG. 9C, the comparing unit 6124 is the same as that in the first and second embodiments. The second power calculating unit 6128 calculates the square of the variation of the image element value inputted from the variation and calculating unit 614.

Intra-block accumulating and adding unit 6130 accumulates the square inputted from the square calculating unit 6128 in units of blocks and calculates the accumulation value of the square for all the image elements within one block.

The threshold value holding unit 12a stores the accumulation threshold value T3 for determining the changed (i.e.valid)/unchanged (i.e. invalid) block (existence of variation in the image/non-existence of variation in the image) with regard to the respective blocks of the present frame.

Second power calculating unit 6128 completes the calculation of the square and intra-block accumulating unit 6130 completes the accumulation calculation of the square of all the image elements in a particular block, comparing unit 6124 compares the accumulation value T3 held in the accumulation holding unit 616a with the accumulation value C of the square of the variation of all the image elements in the block subject to the calculation of the intra-block accumulating unit 6130 and determines that the valid block when the accumulation value C is larger than the accumulation threshold value T3, thereby outputting "1" and determines that the block is an invalid block, when the accumulation value C is less than the accumulation threshold value T3 thereby outputting "0" to the switch 618 and the block information holding unit 620.

The third embodiment can determine the valid block or the invalid block based on the accumulation of the square of the variation of the image element value obtained in the block. Thus the variation amount is emphasized, thereby determining the variation within one block with a high precision.

FIG. 10 shows a format of coded data output from the first image data coding apparatus shown in FIG. 8. By referring to FIG. 10, the operation of the first image data coding apparatus will be explained. An original image data of one block of the present frame is written in block buffer 610 and is output to variation quantity calculating unit 11. Variation quantity calculating unit 11 compares original image data of the block with the image data of the block of the reference frame stored in image buffer 612 the block being provided in the same position as in the block of the original image data with regard to the image element provided in the same position in the corresponding two blocks, thereby outputting the variation amount of the image element value to block variation determining unit 616.

Block change determining unit 616 with the structures shown in any one of FIGS. 8 determines which block is the valid block according to the above described method and a signal representing the determination result (namely, "1" in the case of defective block and "0" in the case of invalid block) is transmitted to switch 618 and block information holding unit 620.

Block information holding unit 620, based on the above determination result signal, holds the block information which is set at "1" in the case of a valid block and at "0" in the case of an invalid block with regard to all the blocks of one frame. Switch 618 transmits the image data of the valid block held in the block buffer 610 to DCT transform unit 622 and to image buffer 612, thereby updating the reference image.

The image data of the block at the same position as the valid block in the reference frame held in the image buffer 612 is updated to the image data of the valid block when the image data of the valid block is input.

Two-dimensional DCT transform unit 622 applies the secondary discrete cosine transform to the image data of the valid block and outputs the two-dimensional DCT coefficient obtained by such transform to quantization unit 624.

The two-dimensional DCT coefficient is subject to a renewal quantization in quantization unit 624 and thereafter is subject to the variable length coding unit 626. The image data of the valid block obtained by the variable length coding is held in coded data holding unit 628.

The above operation is applied to the image data of all the blocks of the present frame and accordingly the image data of the frame is completed.

When the coding process for all the blocks (calculated by 90×72=6480 blocks per one frame where one block comprises 8×8 image elements and one frame comprises 720× 576 image elements in the case of PAL system) per one frame is completed, multiplexer (MPX) 630 outputs the block information comprising 6480 bits held in the block information holding unit in the case of the PAL system as shown in FIG. 10 and thereafter outputs the coding data of the valid block held in coded data holding unit 628.

As explained above, in the case of receipt of the image data of the new frame, the first image data coding apparatus rewrites only the image data in the block in the reference frame held in the image buffer 612 in the same position as in the block in the present or new input frame which is determined as the valid block.

As described above the first image data coding apparatus determines the valid block which valid from the image of the corresponding block of the preceding frame and encodes only the image data of the valid block, thereby greatly decreasing the coding amount. Upon performance of the coding operation, block information designating whether the block is the valid block or the invalid block with regard to all the blocks of one frame, as well as coded data of the valid block, is outputted and thus the decoding side can recognize the block position of the valid block based on the block information, thereby enabling the image of the frame to be restored correctly.

Figure 11:
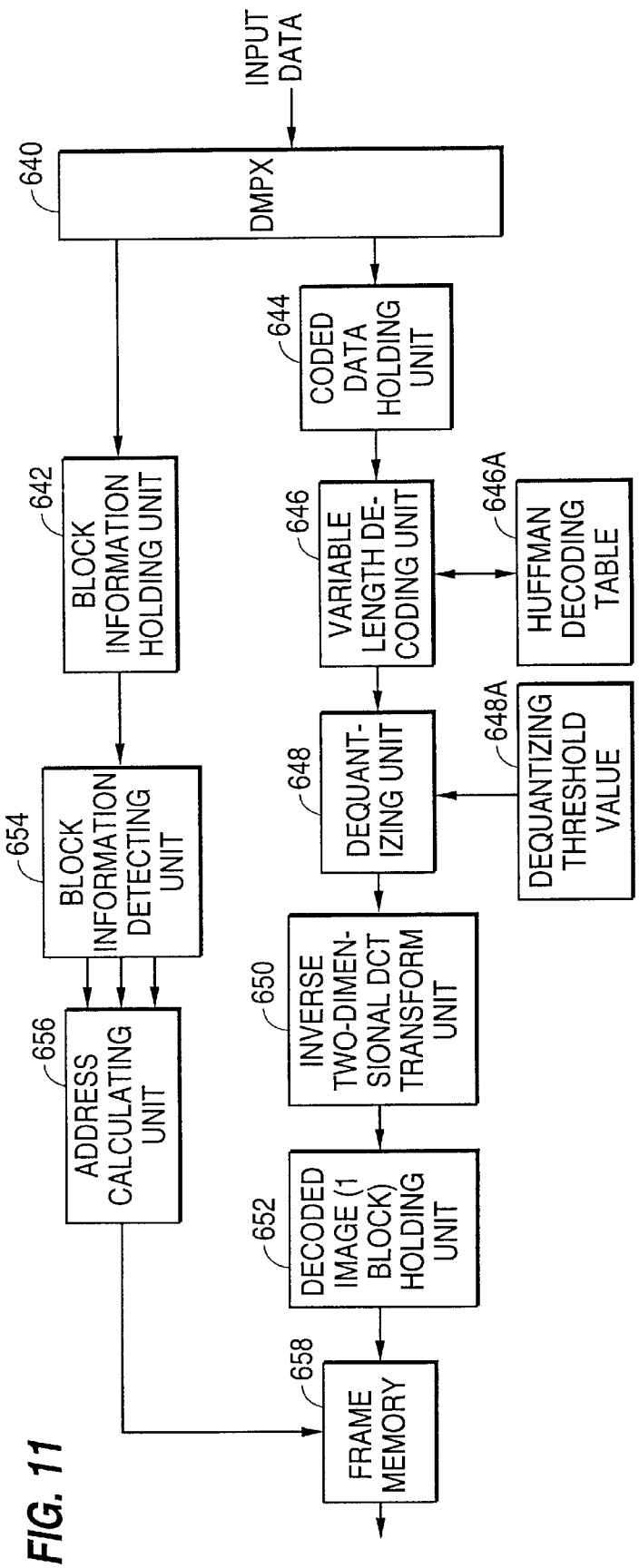
FIG. 11 shows a circuit structure of the first image data restoring unit for restoring the coded data produced by the first image data coding apparatus into the image data.

FIG. 11 shows a circuit structure of the first image data restoring unit for restoring the coded data produced by the first image data coding apparatus into the image data.

In FIG. 11, the multiplexer (DMPX) 640 separates input data into the block information and the coded data of the valid data and input them to block information holding unit 642 and coded data holding unit 644.

Block information holding unit 642 holds the information for one frame. The coded data holding unit 644 is the coded data of the valid block of one frame.

Variable length restoring unit 646 restores the variable length coded data to the quantization coefficient of the fixed length by referring to the Hoffman table obtained statistically and stored in the Hoffman decoding table holding unit 646a.

Dequantization unit 648 applies the linear dequantization to the quantization coefficient by using the threshold value stored in the dequantization threshold value holding unit 648a and transforms the quantization coefficient into two-dimensional DCT coefficients of the space frequency distribution. The inverse two-dimensional DCT transform unit 650 applies the inverse two dimensional discrete cosign transform to the two-dimensional DCT coefficient and restores the image data of respective blocks.

Restoring image holding unit 652 holds one block of the image data of the restored block.

Block information detecting unit 654 detects the number of the consecutive invalid block from the block information input from the block information holding unit 642.

Address calculating unit 656 skips the addresses of the invalid block in accordance with the continuation of the invalid blocks input from the block information detecting unit 654 and outputs only the block address of the valid block to the frame memory 658.

Frame memory 658 stores the image data of the valid block input from the restoring image holding unit 652 into the position of the block which is designated by the address signal input from the address calculating unit 656 and holds the restoration image data of one frame.

Figure 12:
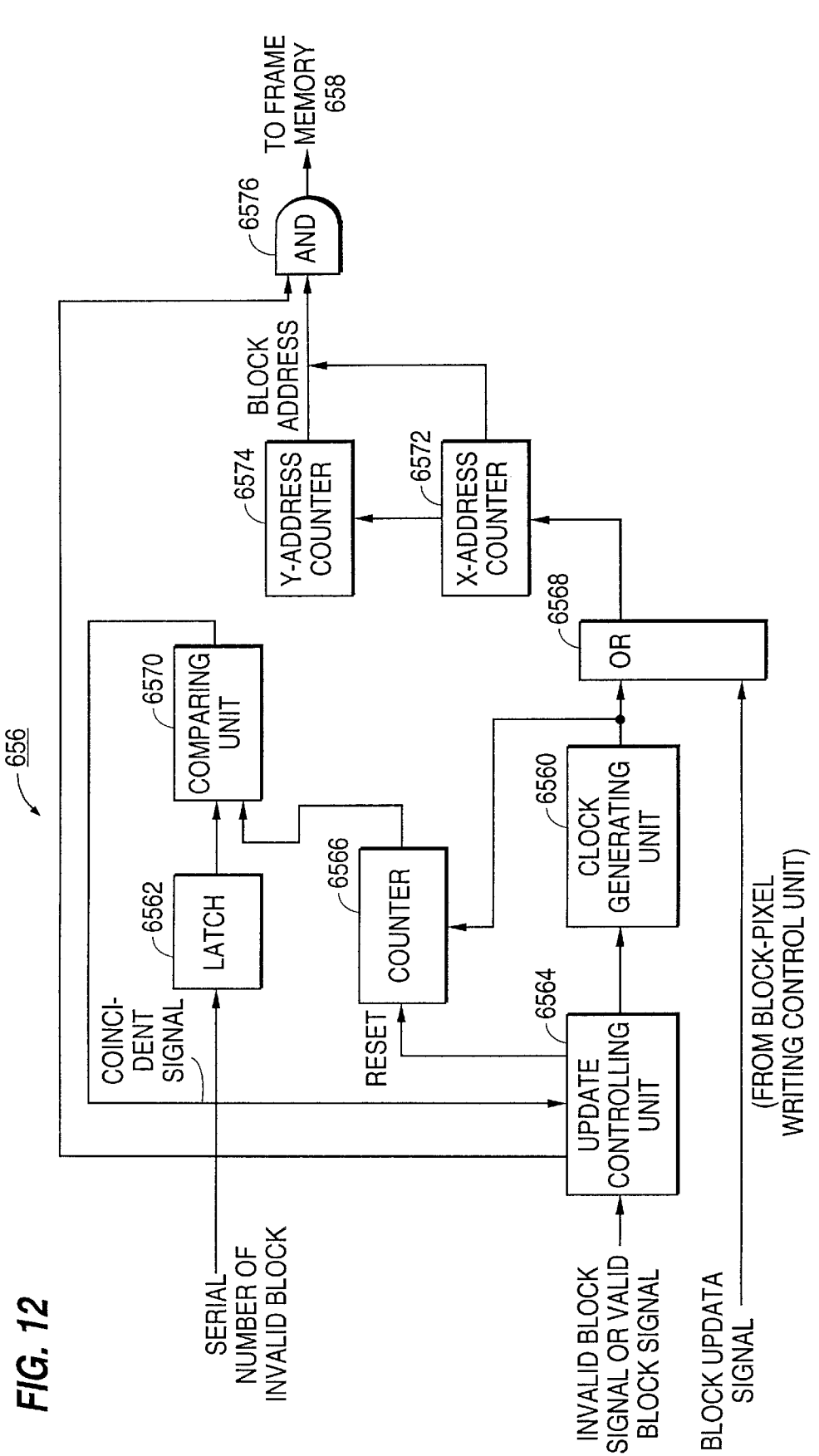
FIG. 12 shows a circuit block diagram of an internal arrangement of the above-described address calculating unit.

FIG. 12 shows a circuit block diagram of an internal arrangement of the above-described address calculating unit 656.

In this circuit of FIG. 12, a clock generating unit 6560 is operated under control of an update controlling unit 6562 to generate a clock with a longer generating period than the write cycle of the image data on the valid block to be supplied to the frame memory 658.

A latch circuit 6562 latches a serial number of invalid blocks inputted from the block information calculating unit 654.

Upon receipt of the invalid block signal supplied from the block information calculating unit 654, the update controlling unit 6564 causes the clocking operation of the clock generating unit to be commenced. Then, the clock derived from the clock generating unit 6560 is supplied to a counter 6566 and an OR gate circuit 6568.

The counter 6566 increments the count value by 1 every time the clock is entered, and then outputs the resultant count value to a comparing circuit 6570. The comparing circuit 6570 compares this count value with the serial number of invalid blocks latched in the latch circuit 6562, and outputs an incident signal to the update controlling unit 6564 when both of these values become equal to each other.

When the incident signal is inputted, the update controlling unit 6564 interrupts the clocking operation of the clock generating unit 6560.

The OR gate circuit 6568 outputs the clock inputted from the clock generating circuit 6560 to an X-address counter 6572.

This X-address counter 6572 is such a counter for counting a component value (X coordinate) of an image at a block address along the horizontal scanning direction (namely, X direction), and for outputting a count value to an AND gate circuit 6576. Then, when the X-address counter 6572 counts up the component value at the final address along the horizontal scanning direction, this counter outputs a carry signal to a Y-address counter 6574.

This Y-address counter 6574 corresponds to a counter for counting a component value (Y coordinate) of an image along the vertical direction (Y direction). This Y-address counter 6574 increments the count value by 1 every time the carry signal is supplied from the X-address counter 6572, and outputs the resultant count value to the AND gate circuit 6576 as a value of the Y coordinate.

An address of each block on the frame memory 658 may be designated by a block address (X, Y) which is defined based on both of the count value X of the X-address counter 6572 and the count value Y of the Y-address counter 6574.

When the coincident signal issued from the comparing unit 6570 is inputted, and thereafter the value block signal derived from the block information detecting circuit 654 is inputted, the update control unit 6564 outputs to the frame memory 658 as a write address of decoded block image data, both of the count value X of the X-address counter 6572 and the count value Y of the Y-address counter 6574, which are derived from the AND gate circuit 6576.

Upon completion of the writing of this decoded block image data, a block update signal is produced from a block image element writing control unit (not shown in FIG. 12), so that the count value of this X-address counter 6572 is incremented by 1 via the OR gate circuit 6568 in response to this block update signal.

As described above, based upon the block information received from the first image data encoding apparatus, in case of the invalid block, only the block address is updated at the high-speed clock generated from the clock generating unit 6560, whereas in case of the valid block, the block address data about this valid block is outputted to the frame memory 658, and also the decoded image data about this valid block is written into the frame memory 658. Then, in case that the decoded image data of this valid block is written, when this writing operation is accomplished, the block address is updated in response to the block update signal inputted from the block image element writing control unit.

In this way, in case of the invalid block, since only the updating of block address is performed, a high-speed decoding operation of the frame image data can be realized.

Referring now to the arrangement of the first image decoding apparatus shown in FIGS. 11 and 12, an image decoding operation thereof will be explained.

Input data having such a format as shown in FIG. 10, which has been transmitted from the first image data coding apparatus, is separated into coded data and block information by the multiplexer 30. The coded data is held in the coded data holding unit 32 and the block information is held in the block information holding unit 31.

The variable length coded data held in the coded data holding unit 32 is decoded into a fixed length quantizing coefficient by the variable length decoding unit 33 with employment of the Huffman decoding list 646a. The structure of this Huffman decoding list 646a is inverse to that of the precedingly explained Huffman coding list 626a which is utilized when the image data is coded by the first image data coding apparatus. This quantizing coefficient is processed by the linear dequantization with employment of the dequantizing threshold value 648a by the dequantizing unit 648, thereby to be decoded into the two-dimensional DCT coefficient.

The inverse two-dimensional DCT transforming unit 650 performs the inverse two-dimensional DCT conversion with using the two-dimensional DCT coefficient, so that the image data about the valid block is decoded.

Then, the decoded image data of this valid data is once stored in the decoded image holding unit 652.

On the other hand, the block information stored in the block information holding unit 642 is processed by the block information detecting unit 654. In other words, the block information detecting unit 654 discriminates an appearing sequence of a valid block and an invalid block based on the block information. Then, when the valid block appears, the block information detecting unit 654 outputs the valid block signal to the address calculating unit 656. To the contrary, when the invalid block appears, the block information detecting unit 654 counts the number of invalid blocks which appear consecutively, and outputs the serial number of invalid blocks counted to the address calculating unit 656. At this time, the invalid block signal is also outputted to the address calculating unit 656.

Thus, the block address of the valid block is correctly calculated based on the block information, and then the decoded image data of this valid block is written into the relevant position of the frame memory 658. As a consequence, with respect to the image data stored in the frame memory 658, only the image data about the valid blocks are updated in the respective flames.

As precedingly stated, the address calculating unit 656 outputs the write address of the decode image data about the valid block, which has been stored in the decoded image holding unit 652, into the frame memory 658 in accordance with the information and the signal inputted from the block information detecting unit 654. As a result, the decoded image data of this valid block is written into the relevant block position of the frame memory 658 by the block image element writing control unit.

Figure 13:
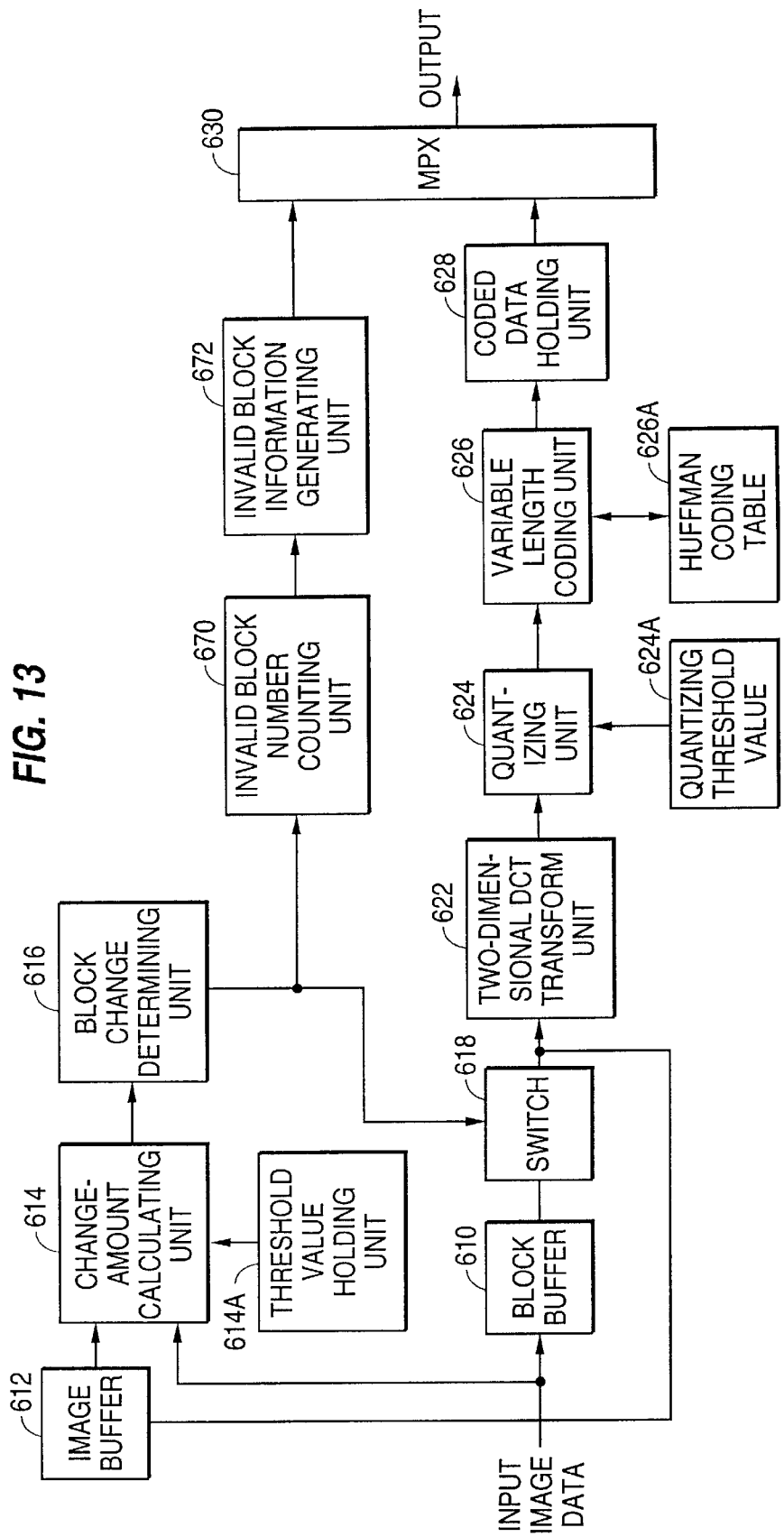
FIG. 13 shows a schematic circuit block diagram for showing an overall arrangement of a second image data coding apparatus according to another currently preferred embodiment of the present invention.

FIG. 13 is a schematic circuit block diagram for showing an overall arrangement of a second image data coding apparatus according to another currently preferred embodiment of the present invention.

It should be noted that the same reference numerals used in the first image data coding apparatus will be employed as those for denoting the same circuit blocks shown in FIG. 13.

In the second image data coding apparatus of FIG. 13, an invalid block number counting unit 670 counts the quantity of consecutive invalid blocks by receiving the judgment result as to whether or not the valid block is present, from the block change determining unit 616. When the judgment result for the valid block is inputted, the above-described count value is outputted to an invalid block information generating unit 672, and the switch 618 is controlled so as to enter the image data of the valid block temporarily stored in the block buffer 610 into the two-dimensional DCT transforming unit 622 and the image buffer 612.

The invalid block information generating unit 672 codes the serial number of the invalid blocks supplied from the invalid block number calculating unit 670 to obtain the coded data which will then be supplied to a multiplexer (MPX) 630.

Next, an operation of the second image data coding apparatus with the above-described arrangement will now be explained.

Original image data of one frame is subdivided into a plurality of blocks and the image data are inputted in unit of block. Then, the original image data of the respective blocks are written into the block buffer 610, and also are outputted to the change amount calculating unit 614. The change amount calculating unit 614 compares image elements of the original image data of the block to be inputted with the corresponding image elements of the image data of the block located at the same position of the block for the reference frame stored in the image buffer 612 to obtain a change amount of a predetermined image element value from this image element comparison, and outputs this change amount to the block change determining unit 616.

The block change determining unit 616 is arranged by, for instance, the previously explained circuit arrangement as shown in FIGS. 9A, 9B, and 9C. This block change determining unit 616 judges whether or not an inputted block corresponds to a valid block. Then, the block change determining unit 616 supplies the judgment result to the switch 618 and the invalid block number counting unit 670.

An invalid block number counting unit 670 is constructed of, for example, a counter which is reset to 0 when such a judgment result indicative of a valid block is inputted. On the other hand, when another judgment result representative of an invalid is inputted to this counter, the count value thereof is incremented by 1. Then, every time the judgment result indicative of the valid block is inputted, this counter outputs the resultant count value, namely the serial number of valid blocks to the valid block information generating unit 672.

An invalid block information generating unit 672 codes the serial number of the inputted valid blocks to produce coded number data which will then be supplied to a multiplexer 630.

Upon input of the signal representative of the valid blocks, a switch 618 causes the original image data of the block stored in the block buffer 610 to be furnished to the two-dimensional DCT transforming unit 622 and the image buffer 612.

As a consequence, an image buffer 612 updates the image data of the block located at the same position as that of the above-described block by newly entered original image data.

The image data of the valid block entered into the two-dimensional DCT transforming unit 622 is processed in a two-dimensional DCT transforming unit 622, a quantizing unit 624, and a variable length coding unit 626 by way of the DCT conversion, linear quantization, and variable length coding respectively in a similar manner to those of the above-explained first image data coding apparatus, so that this image data is converted into coded data having a variable length, which will then be inputted to the multiplexer 630.

Figure 14:
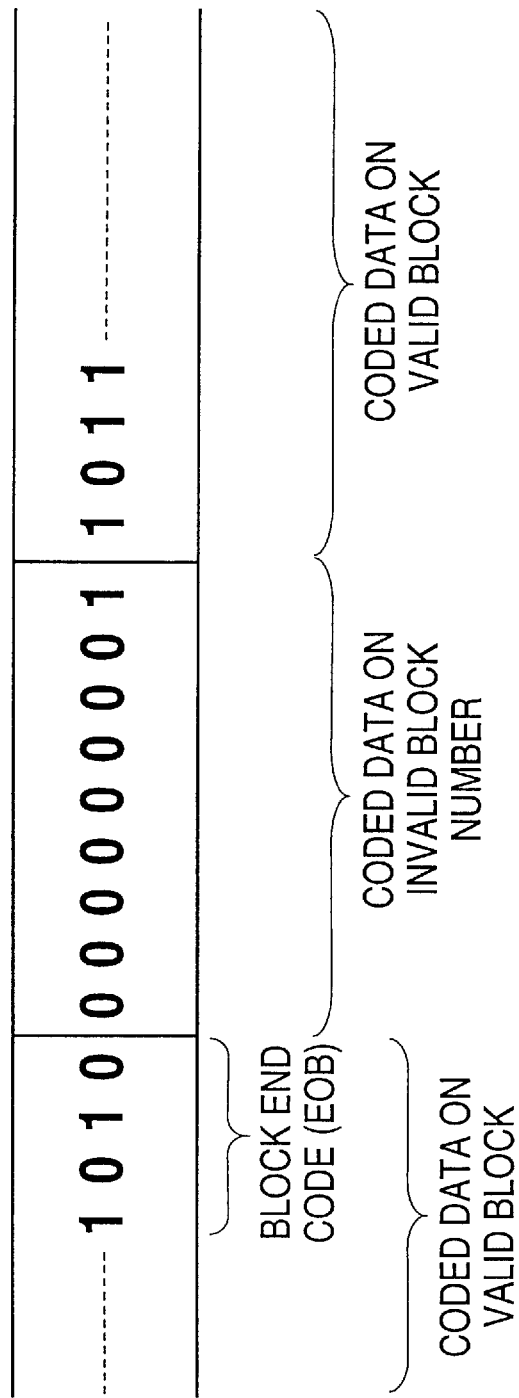
FIG. 14 shows a format of multiplexer first outputs the coded data produced by the second image data coding apparatus.

FIG. 14 shows the multiplexer 630 first outputs the coded data on the valid data stored in the coded data holding unit 19, and subsequently outputs a block end code (EOB). Furthermore, this multiplexer 630 outputs the coded data about the invalid block number supplied from the invalid block information generating unit 672.

As described above, also in the second image data coding apparatus, since the valid block whose image has been valid with regard to the preceding frame is derived based upon the image data of the reference frame, and then only the image data of this derived valid block is coded, the entire coding amount can be considerably reduced. Also, since both of the coded data about the valid block and the serial number of the invalid blocks are coded and then outputted, the block position of the valid block can be correctly recognized at the image decoding side and therefore the image can be correctly decoded.

Furthermore, as the serial number of the invalid blocks existing among the valid blocks is coded and the coded serial number is outputted among the coded data of the valid blocks, only the quantity of consecutive invalid blocks may be outputted after the valid block as the block information. As a result, a total amount of the block information can be reduced in accordance with the total number of the valid blocks. Accordingly, the data transmission amount of the second image data coding apparatus becomes smaller than that of the first image data coding apparatus.

Figure 15:
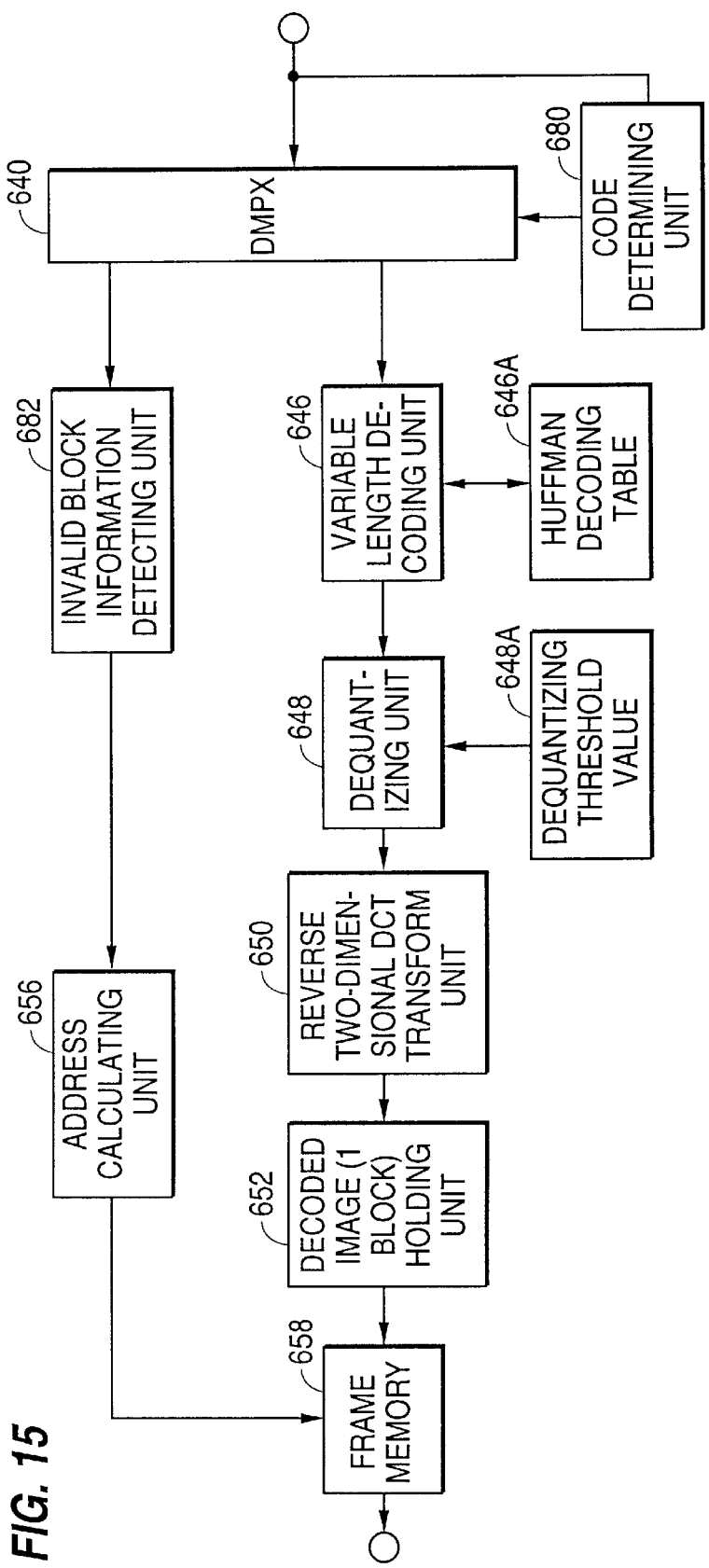
FIG. 15 shows a schematic circuit block diagram for showing an overall arrangement of a second image data decoding apparatus according to the present invention.

FIG. 15 is a schematic circuit block diagram for showing an overall arrangement of a second image data decoding apparatus according to the present invention. It should be noted that like reference numerals employed for denoting the blocks of FIG. 11 represent the same or similar blocks in FIG. 15.

This second image data decoding apparatus decodes the coded data produced from the first image data coding apparatus, into image data.

A code determining unit 680 discriminates coded data of valid data and coded data of an invalid block number from input data having a format as represented in FIG. 14, thereby controlling in FIG. 14, thereby controlling a switching operation of a demultiplexer (DMPX) 640. An invalid block information detecting unit 682 detects a serial number of invalid blocks from the coded data about the invalid block number inputted from the demultiplexer 640 and outputs the detected serial number to an address calculating unit 656.

A description will now be made of an operation of the second image data decoding apparatus with such a circuit arrangement as indicated in FIG. 15.

Under control of the code determining unit 680, the input data having the data format indicated in FIG. 14, which has been transmitted from the second image data coding apparatus, is separated into the coded data about the valid block and the coded data about the invalid block number by the demultiplexer 640. The coded data about the valid block is inputted into the variable length decoding unit 646. In this variable length decoding unit 646, this coded data is decoded into a quantizing coefficient having a fixed length with employment of a Huffman decoding list 646a having an opposite structure to that of the coding table employed at the coding side. A dequantizing unit 648 processes the entered quantizing coefficient by way of linear dequantization with employment of an dequantizing threshold value 648a to obtain a two-dimensional DCT coefficient valid which will then be furnished to an inverse two-dimensional DCT transforming unit 650. The inverse two-dimensional DCT transforming unit 650 performs the inverse two-dimensional DCT conversion with using the entered two-dimensional DCT coefficient, thereby decoding data.

These process operations are carried out in unit of 1 block, and the decoded image data about a single block is once stored in the decoded image holding unit 652.

On the other hand, the decoded data about the invalid block number separated from the input data and derived from the demultiplexer 640, is inputted to the invalid block information detecting unit 682.

The invalid block number detecting unit 682 detects the serial number of invalid blocks from the coded data and supplies the detected serial number to the address calculating unit 656. The address calculating unit 656 calculates the block address of the frame memory 658 into which the decoded image data stored in the decoded image holding unit 652 should be written in accordance with the information about the serial number of the inputted invalid blocks, and then furnishes the calculated address to the frame memory 658. In the frame memory 658, the decoded image data of the block stored in the decoded image holding unit 652 is written in the relevant block address thereof.

As previously described in detail, the second image data decoding apparatus calculates the block address of the valid block to which the coded data is sent, based on the coded data about the invalid block, and writes the decoded image data of this valid block into the corresponding block position within the frame memory 658, whereby the image data located at the same position as that of this valid block is updated.

Figure 16:
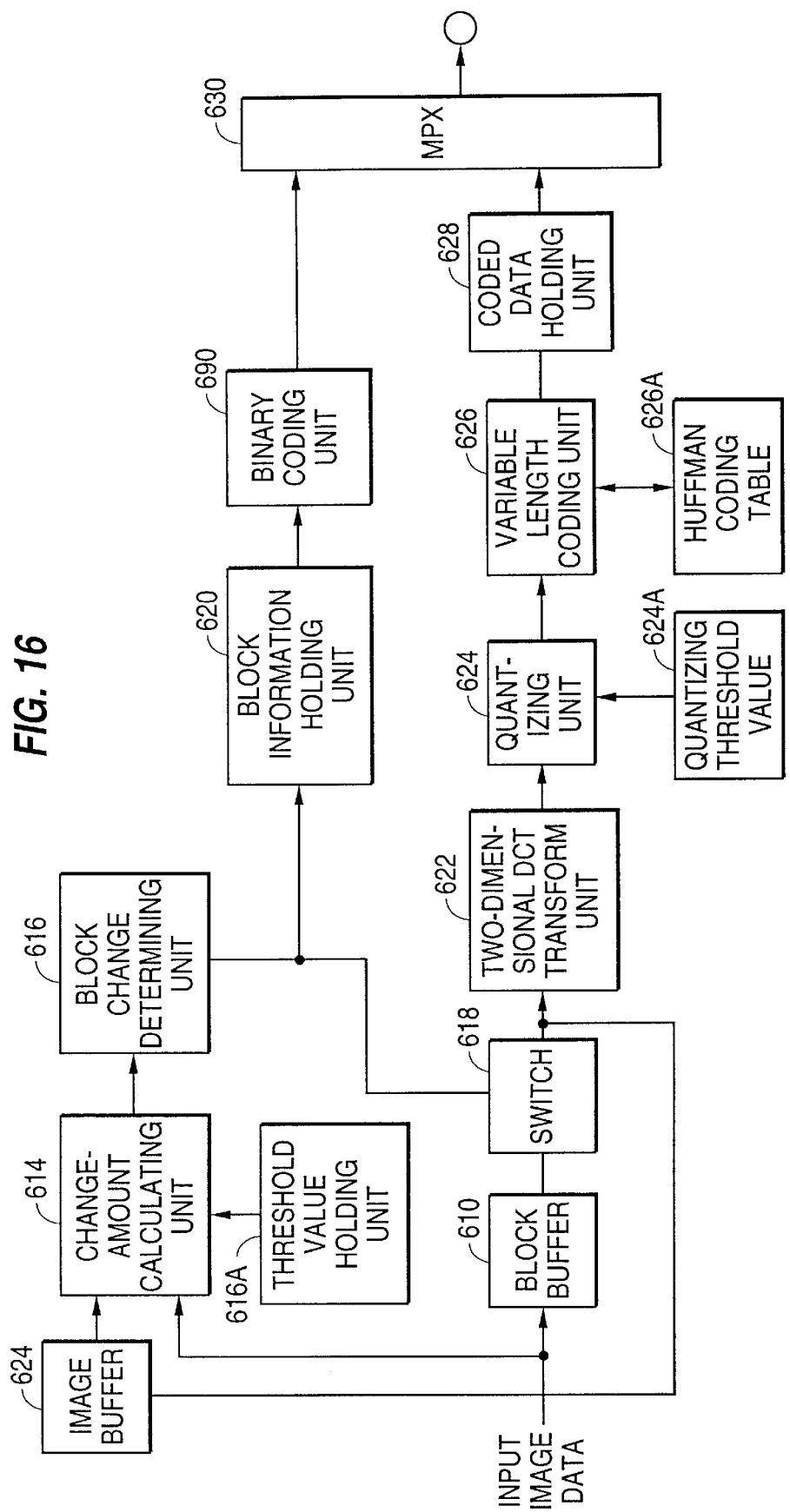
FIG. 16 shows a schematic circuit block diagram for showing an entire arrangement of a third image data coding apparatus according to the present invention.

FIG. 16 is a schematic circuit block diagram for showing an entire arrangement of a third image data coding apparatus according to the present invention.

In FIG. 16, it should be understood that the same reference numerals used to the blocks shown in FIG. 8 are employed as those for indicating the same or similar blocks.

A binary coding unit 690 binary-codes block information stored in a block information holding unit 620 by way of, for instance, a run length coding and the like to obtain binary-coded data, and outputs this binary-coded data to a multiplexer (MPX) 630.

Then, an operation of the third image data coding apparatus will now be described.

In the third image coding apparatus of FIG. 16, original data of 1 block in the present frame is written into the block buffer 610 and also supplied to the change-amount calculating unit 614. The change-amount calculating unit 614 compares the image elements of this block image data with the image elements of the corresponding image data present at the same position as that of the reference frame block stored in the image buffer 624, thereby obtaining a change amount in the image element values. Then, the change amount in the image element values is outputted from the change-amount calculating unit 614 to the block change determining unit 616.

The block change determining unit 616 with such a circuit arrangement as shown in FIGS. 8A, 8B, or 8C, will judge whether or not the relevant block is equal to the valid block based on the change amount in the image element value, and then outputs this judgment result to the switch 618 and the block information holding unit 620.

The block information holding unit 620 sets "1" when the relevant block corresponds to the valid block, and sets "0" when the relevant block corresponds to the invalid block, and furthermore holds this block information with respect to all blocks in a single frame. On the other hand, the switch 618 supplies the image data about the relevant block stored in the block buffer 610 to the two-dimensional DCT transforming unit 622 and the image buffer 624 when such a judgment result indicative of the valid block is inputted thereto. As a consequence, the image buffer 624 rewrites the image data about the block located at the same position as that of this valid block by the image data about this valid block, so that the image data of the reference frame is updated.

On the other hand, the image data of this valid block inputted into the two-dimensional DCT transforming unit 622 is sequentially processed by way of the two-dimensional DCT conversion, linear quantization and variable length coding in the two-dimensional DCT transforming unit 622, quantizing unit 624, and variable length coding unit 626 in order to be coded. Thus, the coded data of the image data about this valid data, which has been obtained by this coding operation, is held in the coded data holding unit 628.

When a series of the above-explained process operation has been completed with respect to all blocks in a single frame, the binary coding unit 690 binary-codes the block information about all blocks stored in the block information holding unit 620 to obtain binary-coded data. Thus, this binary coding unit 690 outputs the binary-coded data about the block information to the multiplexer (MPX) 630.

Figure 5:
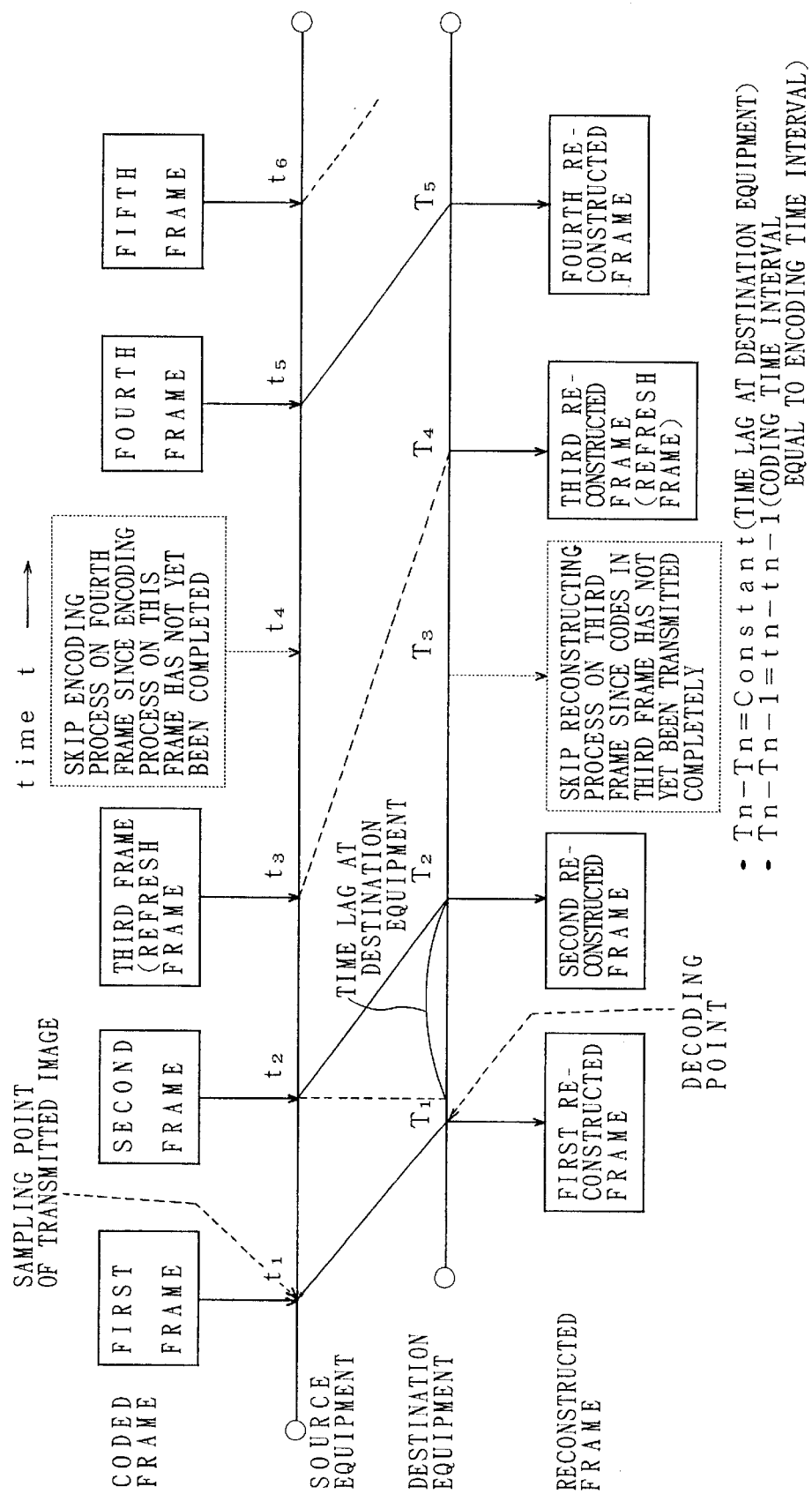
FIG. 5 shows a view for explaining the problem of the conventional data coding method.

Similar to the previous multiplexer shown in FIG. 5 which outputs the coded data, this multiplexer 630 first outputs the coded data on the block information inputted thereto from the binary coding unit 690, and thereafter outputs to coded data of the valid block held in the coded data holding unit 628.

As previously explained, since such a valid block whose image has changed with respect to the preceding frame, is extracted based on the image data about the reference frame, which has been stored in the image buffer 624, and thus only the image data of this valid block is decoded, a total coding amount can be greater reduced. Also, since together with the coded data about the valid block, the block information indicating whether all of the blocks in the frame are the valid blocks or the invalid blocks, is coded and the coded data/information are outputted, the block positions of the valid blocks can be correctly recognized at the decoding side. As a result, the original image can be correctly decoded.

As the block information is similarly decoded in this third image data coding apparatus, a total coding amount can be reduced.

Figure 17:
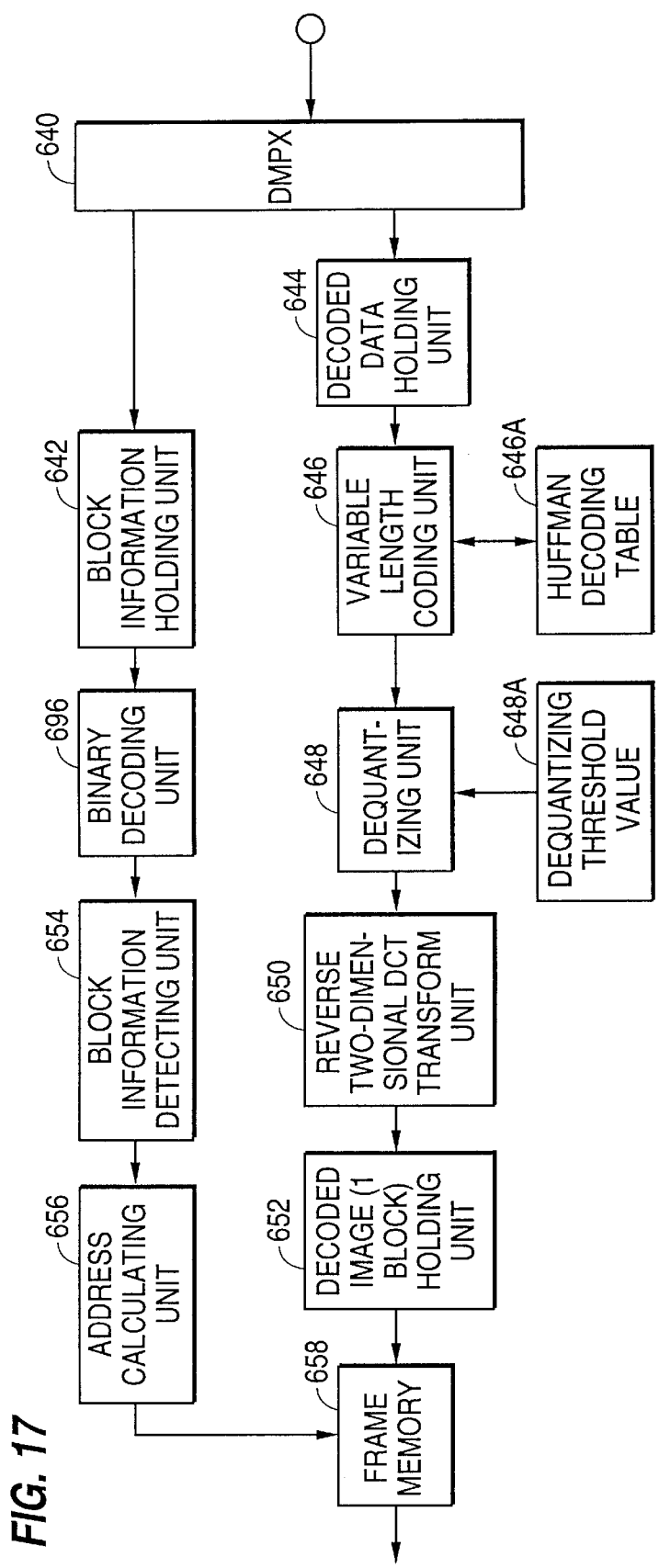
FIG. 17 shows a circuit block diagram of an overall arrangement of a third image data decoding apparatus according to another currently preferred embodiment of the present invention.

FIG. 17 shows a circuit block diagram of an overall arrangement of a third image data decoding apparatus according to another currently preferred embodiment of the present invention. The third image data decoding apparatus decodes image data from coded data produced from the above-described third image data coding apparatus. It should be noted that like reference numerals employed in the first image data decoding apparatus shown in FIG. 11 indicate the same or similar blocks in this third image data decoding apparatus.

A binary decoding unit 696 decodes the coded data about the block information, which has been stored via the demultiplexer (DMPX) 640 into the block information holding unit 642 and has been coded by the third image data coding apparatus, to obtain original information.

A description will now be made of an operation of the image data decoding apparatus shown in FIG. 17.

The coded data produced from the third image data coding apparatus shown in FIG. 16, is separated by the demultiplexer 640 into the coded data of the valid data and the coded data of the block information. Then, the coded data is stored in the coded data holding unit 642, whereas the coded data of the block information is stored in the block information holding unit 654.

The variable length coded data of the valid data stored in the coded data holding unit 644 is decoded by the variable decoding unit 646 into a quantizing coefficient having a fixed length with employment of the Huffman decoding table 646a whose structure is inverse with respect to that of the Huffman coding table 626a employed in the coding operation. The quantizing coefficient is processed by way of the linear dequantization in the dequantizing unit 648 with using the dequantizing threshold value 648a, thereby being converted into the two-dimensional DCT coefficient. The inverse two-dimensional DCT transforming unit 650 performs the inverse two-dimensional DCT conversion with employment of this two-dimensional DCT coefficient, so that the image data of the valid block is decoded.

These process operations are carried out in unit of a single block, and then the decoded image data about the decoded 1 valid block are one stored into the decoded image holding unit 652.

On the other hand, the coded data of the block information is decoded by the binary decoding unit 696 into the original block information which will then be outputted to the block information detecting unit 656. Based on this block information, the block information detecting unit 654 detects the block position of the valid block and counts the serial number of the invalid blocks among the valid blocks, and also outputs the resultant information to the address calculating unit 656. Based on the entered information, the address calculating unit 656 calculates the write address of the valid block stored in the decoded image holding unit 652, within the frame memory 658, and then supplies the calculated address data to the frame memory 658. The frame memory 658 writes the decoded image data about the decoded image data about the valid block held in the decoded image holding unit 652, into the block address designated by this address signal in accordance with the address signal.

As described above, the block address for the valid block is calculated based on the coded data of the block information, the decoded image data of this valid data is written into the corresponding position of the reference frame, and then the image data about the reference frame may be updated.

In this case, since the block information has been coded and the coded block information is transmitted, a transmission amount of the coded data may be reduced.

It should be noted that although the count value of the counter 6566 (FIG. 12) in the address calculating unit 656 is incremented by the number equal to the serial number of the invalid blocks in the address calculating unit 656 of the above-described image data decoding apparatus when the serial number of the valid block is entered, alternatively, the count value of the X-address counter 6572 may be summed with the serial number of the invalid blocks, thereby obtaining the block address.

Furthermore, although both of the image data coding apparatus and the image data decoding apparatus are arranged by the hardware in the above-described preferred embodiments, the functions of the blocks employed in these apparatus may be executed by a microprocessor and a digital signal processor in accordance with a software process.

In accordance with this preferred embodiment, as previously described in detail, a comparison is made in unit of a single block between the image data of the present frame and the image data of the reference frame utilized as the image data of the preceding frame, whereby a selection is performed only for the image data of the valid block whose image has changed with respect to the image of the preceding frame. Then, since only the image data about this valid block is coded and outputted, the data compression rate of such consecutive image data that own a small image data that own a small change among these consecutive images. As a consequence, averaged compression rates about moving images of a television telephone system where a television camera is fixedly employed, and moving images of a moving whose variations in the successive frames become small, may be increased. Also since the block information indicative of the positional information about the invalid block is outputted together with the coded data of the valid block, the correct position of the valid block can be recognized based on this block information, so that the image can be correctly decoded.

Figure 18:
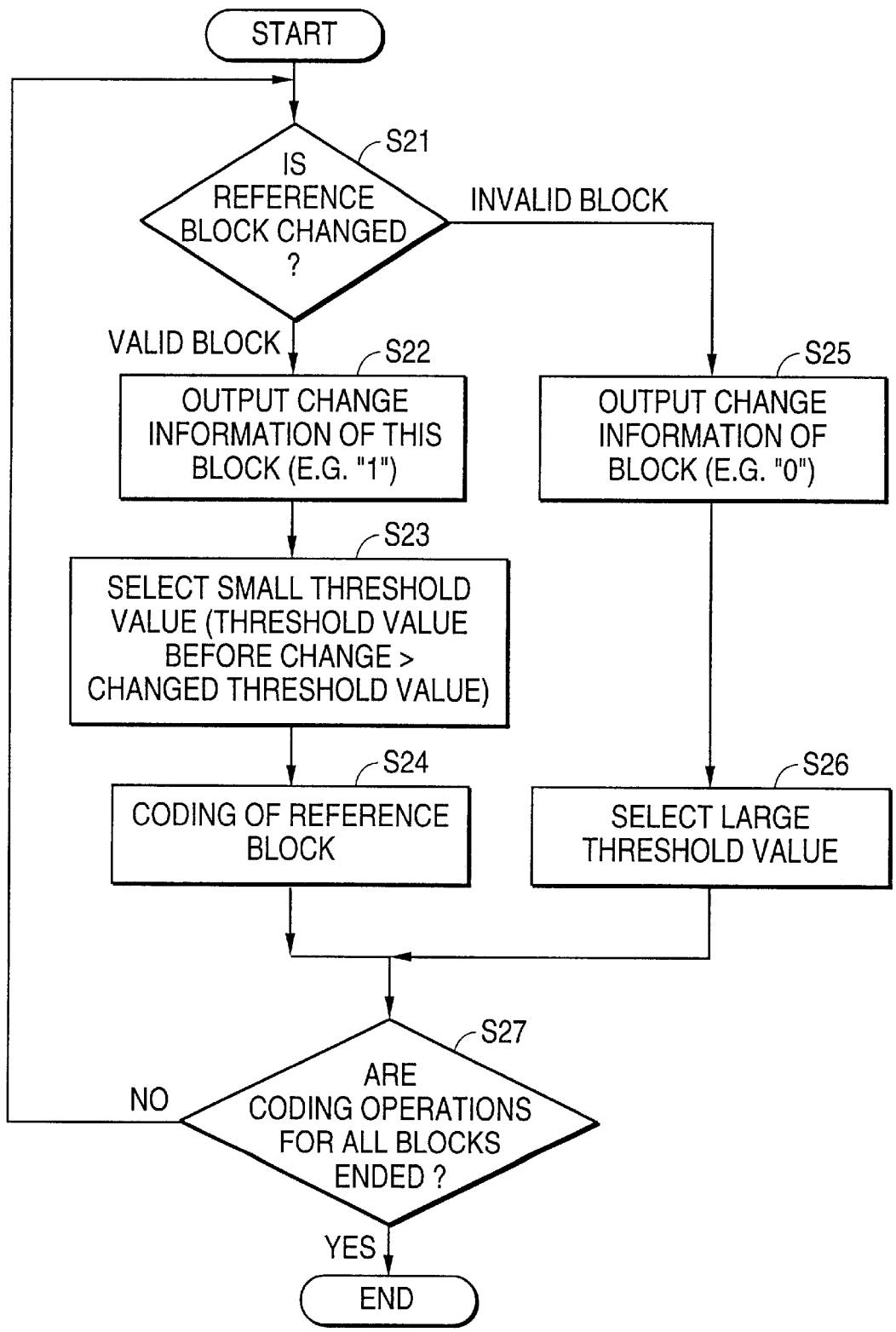
FIG. 18 is a flowchart indicating the 2nd image data encoding method according to an embodiment of the present invention.

FIG. 18 is a flow chart for explaining a second image data coding method according to a presently preferred embodiment of the present invention.

In accordance with the second image data coding method, image data about a single frame is subdivided into a plurality of sub-blocks having m×n image elements (symbols "m" and "n" denote natural numbers), and the image data are coded in unit of block. Furthermore, two threshold values different from each other are employed as a threshold value used to judge the above-described valid block.

In the image data coding method shown in FIG. 18, with regard to the first block (sub-block) in the present frame, a comparison is made between the image elements of this first block and the image elements of the corresponding block located at the same position as the reference frame (preceding frame), thereby calculating a change amount in predetermined image element values. Then, this change amount is compared with the presently selected threshold value in order to judge whether or not the first block of the present frame corresponds to the valid block (step S21).

In this case, when the change amount in the image element values becomes greater than the presently selected threshold value, it is judged that the first block corresponds to the valid block. At a step S22, when the first block is the valid block, change information (e.g., "1") indicative of such a valid block is outputted.

Subsequently, another threshold value having a small value is selected as the threshold value for determining the valid block (step S23). Then, after this first block has been processed by way of the two-dimensional DCT conversion and the quantization, the processed first block is coded, and the content of the block for the above-described reference frame located at the same position as that of the first block is updated by the content of the first block (step S24).

To the contrary, when another judgment is made that the first block corresponds to the invalid block at the previous step S21, change information (e.g., "0") representative of such an invalid block is outputted (step S25).

Next, the threshold value having a large value is selected as the threshold value used to judge the valid block (step S26).

Thereafter, the above-explained process operations as defined at the steps S21 to S26 will be repeatedly performed with regard to all of the blocks subsequent to the second block of the present frame, thereby producing the change information for indicating whether the relevant block among all blocks corresponds to the valid block or the invalid block. Also, the image data of the valid block are coded and the coded image data are outputted. Furthermore, the block located at the same position as that of such a block which has been judged as the valid block in the present frame within the block of the reference frame, is rewritten by these valid blocks to update the reference frame.

Then, when a judgment result "YES" at a step S27 is made of the above-explained process operations defined from the step S21 to the step S26 with respect to all blocks within the present frame, the coding process of the image data for the present frame is completed.

As previously described in detail, according to the second image data coding method, with respect to the block located at the same position of the preceding frame within the respective blocks of the present frame, only the block whose image has changed is selected as the valid block. Since only the image data of this valid block is coded, a total amount of such coded data as images having small movement, for instance, a consecutive image of background having a small image variation, can be considerably reduced with respect to a total amount of entire coded data.

Further, since the valid block is judged based on the result of determining whether or not the block corresponds to the valid block by changing the determining threshold value, even when the images are gently varied among the blocks, the regions over which the images start to change and stop to change can be judged as the region for the valid block, so that it is possible to prevent such a discontinuous movement of image from which the valid blocks project.

Figure 19:
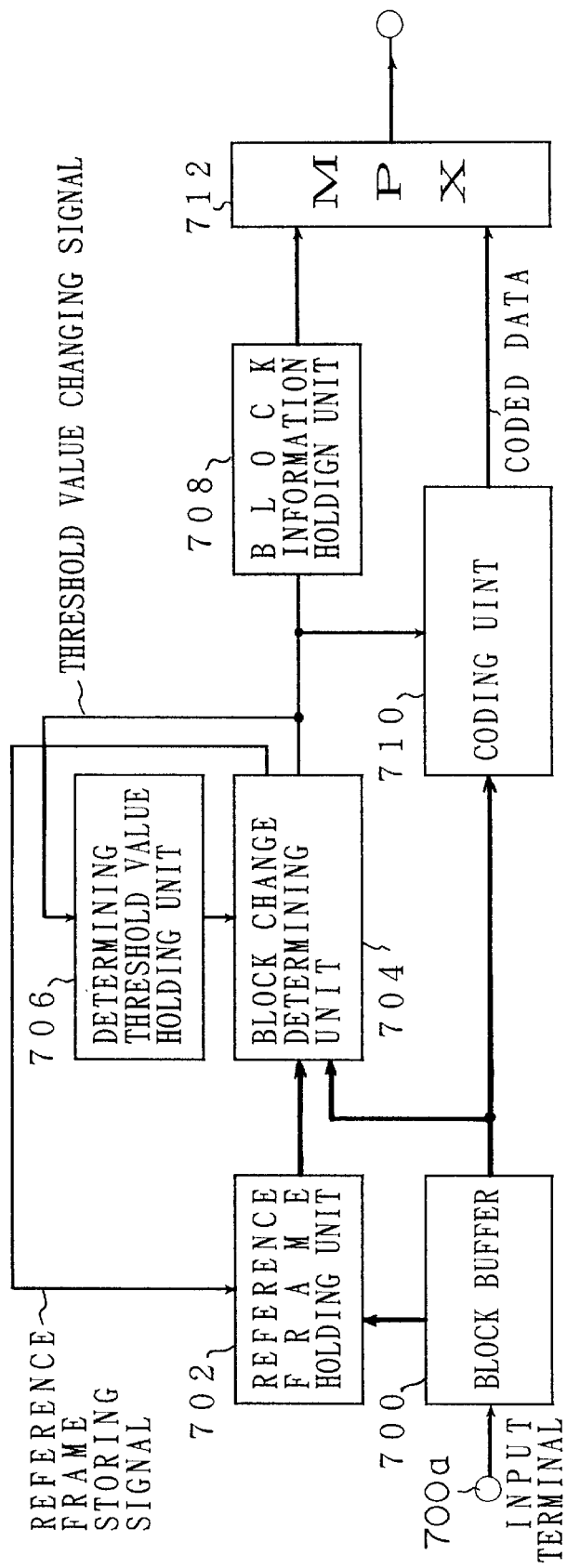
FIG. 19 is a block diagram showing the circuit configuration of the 4th image data encoding device according to an embodiment of the present invention.

FIG. 19 shows a circuit diagram of a fourth image data coding apparatus for coding consecutive image data which have been produced from the above-explained second image data coding method.

In FIG. 19, a block buffer 700 temporarily stores the image data in unit of single block, inputted from an input terminal 700a.

A reference frame holding unit 702 is a memory to store image data of a reference frame. The image data of this reference frame will be used as image data of the preceding frame.

A block-change determining unit 704 compares image elements of block image data of the present frame which has been stored in the block buffer 700 with image elements of block image data of the reference frame which has been stored in the reference frame holding unit 702 and is located at the same position as that of the first-mentioned block image data, thereby calculating change amounts of predetermined image element values for the respective blocks of the present frame with respect to the reference frame. Then, this block-change determining unit 704 further compares the change amount of the image element values with a threshold value derived from a threshold value holding unit 706, thereby determining a change in the images of the respective blocks of the present frame with respective to the reference frame, namely determining whether or not the input block is a valid block. This change amount of the image element values includes either a maximum value of an absolute value for differential image element values within the input block, or an accumulated value of absolute values for all of differential image element values within the input block, otherwise an accumulated value of squared values for absolute values of all of differential image element values within the input block.

A determining-threshold-value holding unit 7006 holds two different sorts of threshold values (will be referred to "a large threshold value and a small threshold value") and selects one of these two threshold values in accordance with a threshold-value changing signal supplied from the block-change determining unit 704 to furnish the selected threshold value to the block-change determining unit 704. A block information holding unit 708 holds change information (information indicating whether an input block corresponds to a valid block, or an invalid block) of the input block supplied from the block change determining unit 704.

Figure 20:
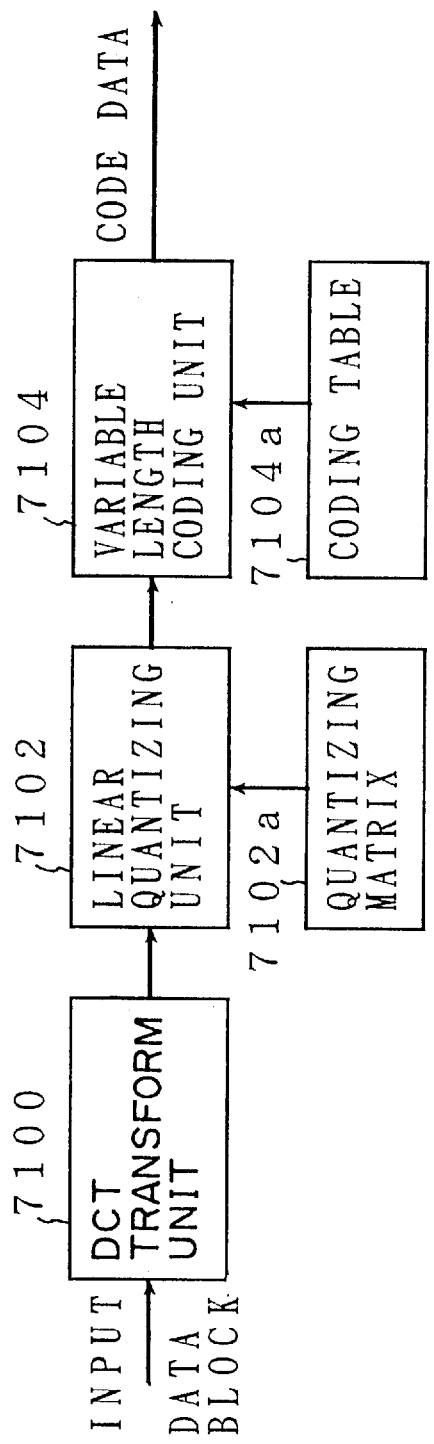
FIG. 20 is a block diagram showing an example of the circuit configuration of the encoding unit in the 4th image data encoding device.

A variable length coding unit 710 codes only the image data of the valid block stored in the block buffer 700 in accordance with the judgment result indicating whether or not the respective blocks correspond to the valid block, which are entered from the block-change determining unit 704. The variable length coding unit 710 is constructed of, as shown in FIG. 20, a two-dimensional DCT transforming unit 7100 for transforming the transmitted block image by way of a two-dimensional discrete cosine conversion into a two-dimensional DCT coefficient of a spatial frequency distraction, a quantizing unit 7102 for quantizing this two-dimensional DCT coefficient with a visually adaptive threshold value to obtain a quantizing coefficient, and a variable length coding unit 7104a for variable-length-coding the quantizing coefficient based on a statistically obtained Huffman table.

A multiplexer 710 selectively outputs the block information about all blocks of the present frame which have been stored in the block information holding unit 708, and the coded data produced from the coding unit 710.

Operations of the image data coding apparatus with the above-described arrangement will now be explained.

The image data of the each block for the present frame is inputted into the input terminal 700a, and then temporarily stored in the block buffer 700. The reference frame holding unit 702 stores therein the reference image data used to detect whether or not there is a change of the image of the present block with respect to the image of the preceding frame.

The block-change determining unit 704 compares image elements of block image data of the present frame which has been stored in the block buffer 700 with image elements of block image data of the reference frame which has been stored in the reference frame determining whether or not the input block is a valid block. This change amount of the image element values includes either a maximum value of an absolute value for differential image element values within the input block, or an accumulated value of absolute values for all of differential image element values within the input block, otherwise an accumulated value of squared values for absolute values of all of differential image element values within the input block. Then, the block-change determining unit 704 supplies the judgment result (indicating either a valid block, or an invalid block) to the block information holding unit 708 so as to be stored therein.

The block-change determining unit 704 outputs a reference frame rewriting signal to the reference frame holding unit 702 when the judgment result indicates the valid block. Upon receipt of the reference frame rewriting signal, the reference frame holding unit 702 updates the image data of the block located at the same position as that of the valid block held therein by the image data of this valid block which is now stored in the block buffer 700.

Furthermore, the block-change determining unit 704 supplies the threshold-value changing signal in accordance with the judgment result to the determining-threshold-value holding unit 706, and changes the threshold value derived from the determining-threshold-value holding unit 706 from the large threshold value into the small threshold value when the judgment result is the valid block, and conversely changes it from the small threshold value into the large threshold value when the judgment result is the invalid block. Also, the block-change determining unit 704 outputs the judgment result to the variable length coding unit 710. The variable length coding unit 710 reads out the image data of this valid block from the block buffer 700 when the input judgment result corresponds to the valid block to code this image data, and, to the contrary, does not execute the reading and coding operations for the image data of the invalid block when the judgment result corresponds to the invalid block.

The multiplexer 712 sequentially switches the block information stored n the block information holding unit 708 and the variable length coded data inputted from an ADCT coding unit 710 to successively output the switched data.

As described above, in accordance with the fourth image data coding apparatus, when it is judged that the present block is the valid block, the determining threshold value is set to the small threshold value, and then another judgment is made of the change in the image of the subsequent block with respect to the reference frame based on this small threshold value. To the contrary, when it is judged that the present block is the invalid block, the determining threshold value is set to the large threshold value, and then a check is done of the change in the image of the next block with respect to the reference frame based on the large threshold value.

As previously explained, depending upon such a fact whether or not the image in the present block is varied, the threshold value is selected which is employed to judge the image variation occurring in the subsequent block, so that the valid block regions along the block scanning direction can be consecutively extracted. As a result, it is possible to suppress an unnatural scene of the blocks displayed on the screen, which is caused when the valid blocks are interruptedly continued.

Referring now to FIGS. 21 to 23, the above-described advantages of the preferred embodiment will be described more in detail. As represented in FIG. 21A, when the image of the block is gradually changed, as compared with that of the preceding block, in accordance with the method for determining the valid block by comparing the change amount of the block with a single threshold value, the following difficulties may be produced. That is, as shown in FIG. 21B, both of the change starting portion "A" of the image and the change ending portion "C" thereof within the regions A, B, C would be judged as the "invalid blocks", and only the change peak portion "B" would be judged as the "valid block". As a consequence, since only the region B is reproduced, or decoded during the image decoding operation, this region B may give such an impression that this region is projected from the adjoining regions A, C.

Figure 21A:
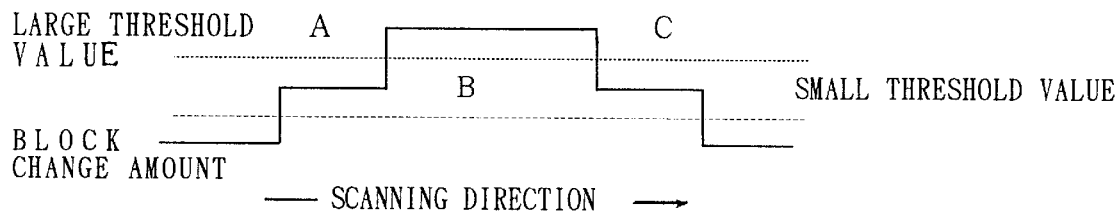
FIGS. 21A to 21E show an explanatory view of a practical operation of the 4th through 7th image data encoding devices according to an embodiment of the present invention.
Figure 21B:
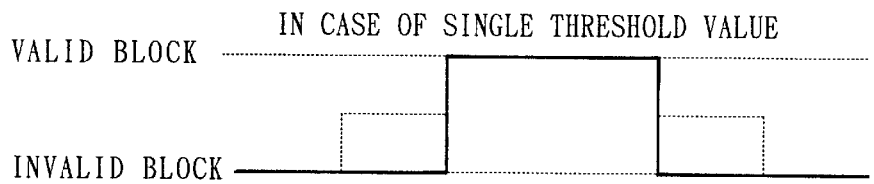
Figure 21C:
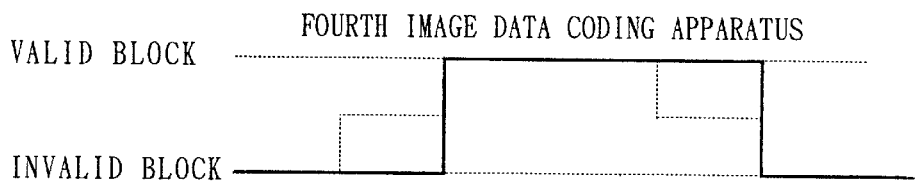

To the contrary, in accordance with the fourth image coding apparatus of the present invention, as represented in FIG. 21C, when a judgment is made that the image change peak portion B is the valid block, since the determining threshold value for the valid block is selected to be a low threshold value, the region C can also be judged as the valid block, so that the valid block region may be continued.

Figure 22A:
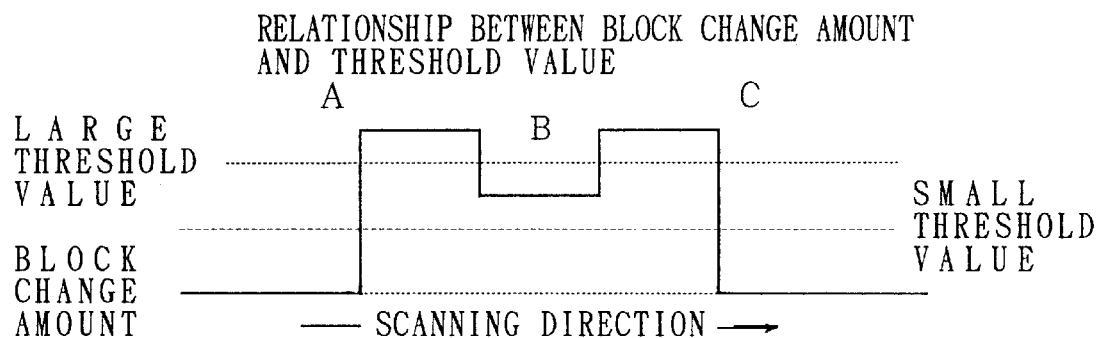
FIGS. 22A to 22D show an explanatory view of an operation of the 4th through 7th image data encoding devices according to an embodiment of the present invention.

As indicated in FIG. 22A, when the block B having a small image change is solely present within the valid block region, if only one threshold value would be employed as the determining threshold value of the valid block, judgments could be made of the valid block A, invalid block B and valid block C (see FIG. 22B), so that the valid blocks would be interrupted, resulting in an unnatural decoded image. To the contrary, in case of the fourth image data coding apparatus, as illustrated in FIG. 22C, when the block A is judge as the valid block, the small determining threshold valid is selected, so that the block B is also judged as the valid block, resulting in a natural decoded image. Thus, the valid block region may be continued from the change starting region A to the change ending region C.

Figure 23A:
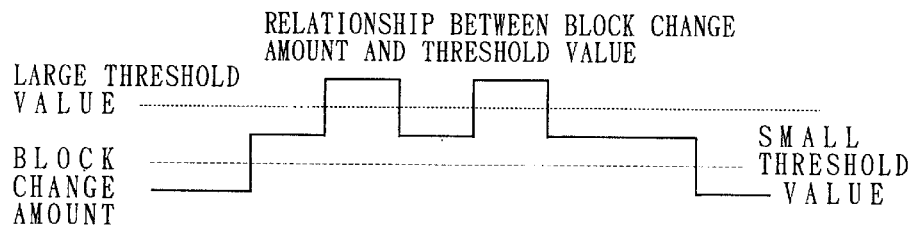
FIGS. 23A to 23F show an explanatory view of another operation of the 4th through 7th image data encoding devices according to an embodiment of the present invention.
Figure 23B:
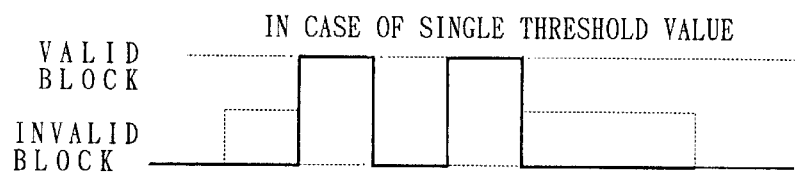
Figure 23C:
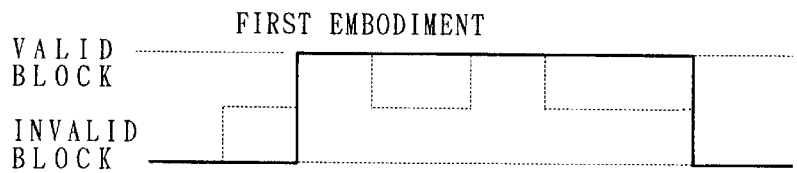

Similarly, as indicated in FIG. 23A, in case of images whose block change amounts are not constant, if only one determining threshold value is employed, then the valid blocks appears intermittently (see FIG. 23B). If the fourth image data coding apparatus is employed, as represented in FIG. 23C, the valid blocks are continued and therefore the image quality of the decoded image can be improved.

Figure 24:
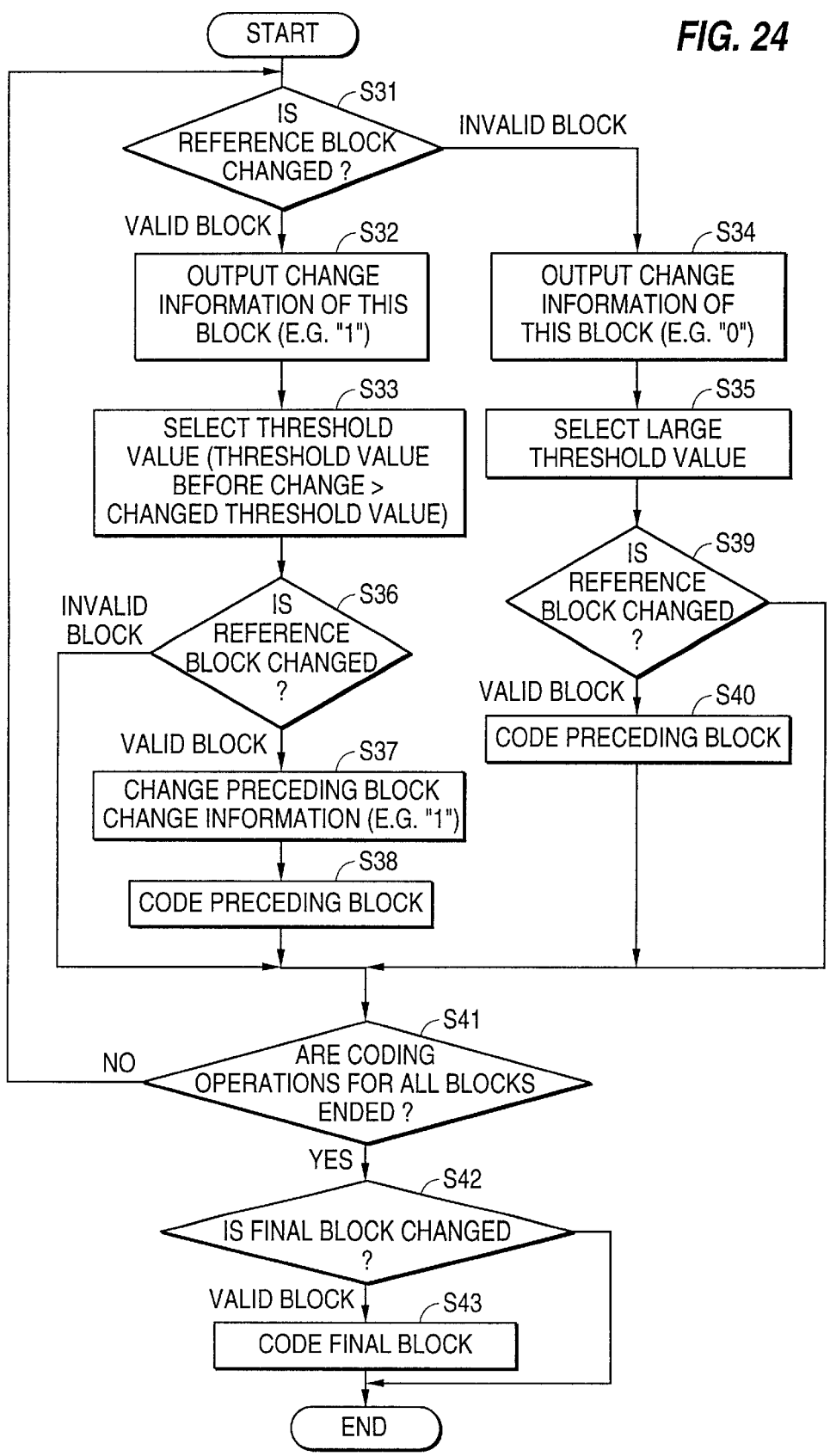
FIG. 24 shows a flowchart indicating the 3rd image data encoding method according to an embodiment of the present invention.

FIG. 24 is a flow chart for explaining a third image data coding method according to another preferred embodiment of the present invention.

Also in this third image data coding method, the image data of each block for the present frame is compared with the image data of the block for the preceding frame, which is located at the same position of the first-mentioned block, whereby a judgment is made as to whether or not each block of the present frame is the valid block (step S31). Then, in case of the valid block, for instance, the change information of "1" is outputted (step S2), and one threshold value having a small value is selected as the determining threshold value of the valid block (step S33).

On the other hand, in case of the invalid block, for example, the change information of "0" is outputted (step S34), and thereafter the other threshold value having a large threshold value is selected as the threshold value for the valid block (step S35).

The featured process of this third image data coding method is processes defined after the step S36. That is, when it is judged that the present block corresponds to the valid block, after the process operation of the previous step S33 has been performed, another judgment is again made as to whether or not the preceding block is the valid block by employing the small threshold value selected at the step S33.

Then, when the preceding block is the valid block, the change information of this preceding block is set to, for instance, "1" (step S37). As a result, if the preceding block has been judges as the invalid block at the previous step S31, then the change information thereof is changed from, for example, "0" to "1". In other words, the preceding block is changed from the invalid block into the valid block. Then, this preceding block which has been judged as the valid block is coded (step S38).

On the other hand, subsequent to the above step S35, another judgment is made whether or not the preceding block corresponds to the valid block (step S39). Then, if the preceding block is the valid block, then the image data of the preceding block is coded (step S40).

As described above, when a judgment is made that the present block corresponds to the valid block, the threshold value used for determining the valid block is reduced, and a check is done whether or not the preceding block corresponds to the valid block. Then, as a result of this judgment, when such a judgment is made that the preceding block is the valid block, the change information of the preceding block is set to "1" indicative of being the valid block, and the image data of this preceding block is coded.

On the other hand, when the present block corresponds to the invalid block, the threshold value for determining the valid block is increased. Then, if the preceding block is the valid block, then the image data of this preceding block is coded.

When a series of process operations as defined from the step S31 to S40 have been accomplished as to the present frames of all blocks (step S41), a check is done as to whether or not the final block of the present frame corresponds to the valid block (step S42). If the final block corresponds to the valid block, then the image data of this final block is coded (step S43).

Figure 25:
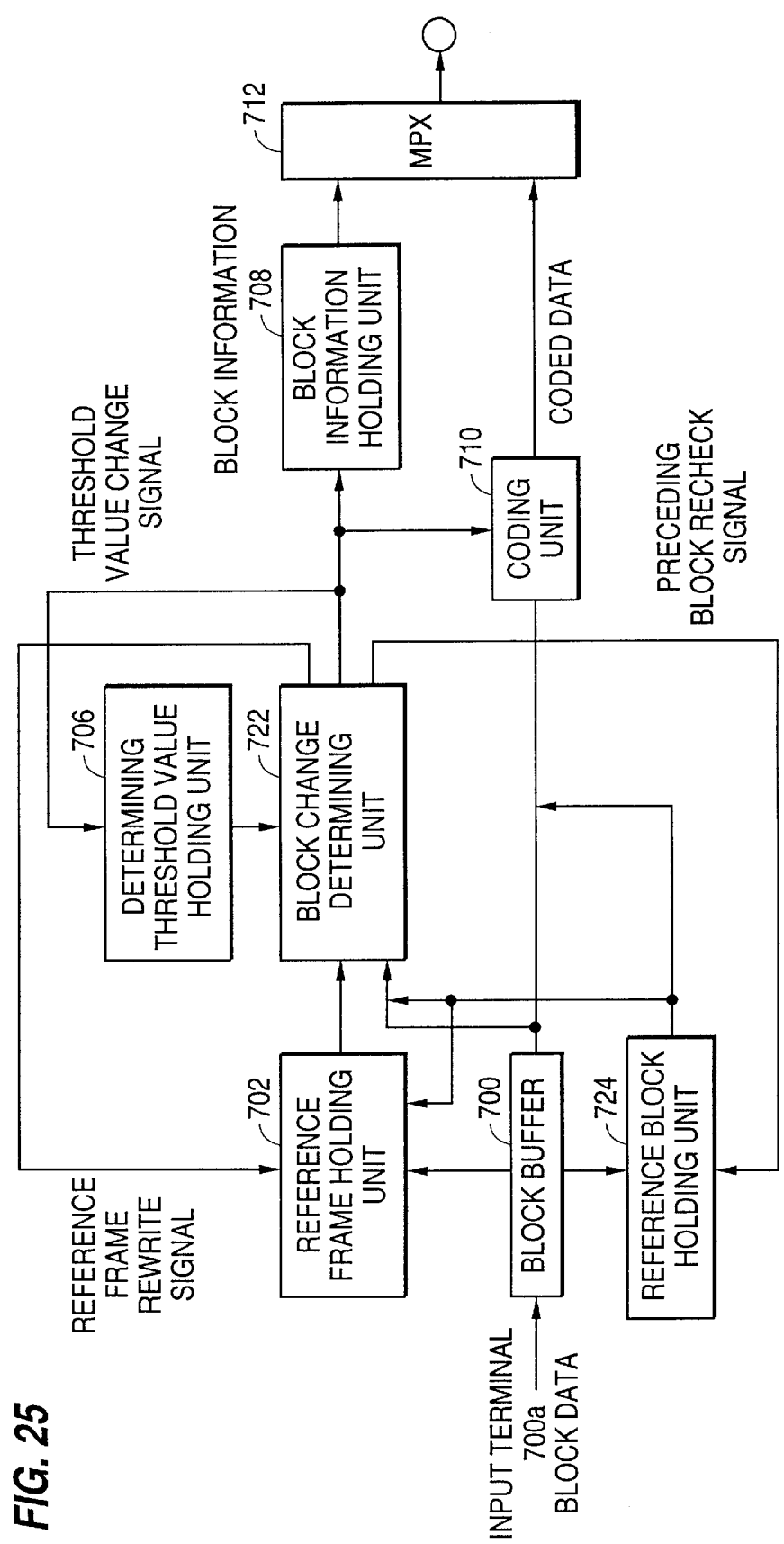
FIG. 25 is a block diagram showing the circuit configuration of the 5th image data encoding device according to the embodiment of the present invention.

FIG. 25 is a schematic block diagram for indicating a circuit arrangement of a fifth image data coding apparatus for coding a consecutive image by way of the above-described third image data coding method. It should be understood that the same reference numerals used to represent the circuit blocks in the fourth image data coding apparatus shown in FIG. 19 are employed to indicate the same or similar circuit blocks in FIG. 25.

In the fifth image data coding apparatus of FIG. 25, a preceding block holding unit 242 holds the image data of the block (namely, preceding block) prior to the image data of the present block which has been stored in the block buffer 700. Similar to the block change determining unit 704 employed in the fourth image data coding apparatus, a block change determining unit 722 corresponds to such a circuit for determining whether or not each of the blocks in the present frame is a valid block. When this block change determining unit 72 judges that the present block stored in the block buffer 700 is the valid block, the determining unit 72 outputs a preceding block rechecking signal to the preceding block holding unit 724.

Next, a description will now be made of operations of the fifth image data coding apparatus with the above-described circuit arrangement.

The image data of the respective blocks in the present frame are entered from the input terminal 700a into the block buffer 700 so as to be temporarily stored therein. The reference frame holding unit 702 holds the image data of the reference frame which is used to detect whether or not there is a change in the image of the block in the present frame with respect to the image of the corresponding block in the preceding frame. The blocks in the present frame are stored in the block buffer 700.

The block change determining unit 722 reads out the image data of the relevant block of the reference frame from the reference frame holding unit 702. The relevant block is located at the same position as that of the present block stored in the block buffer 700. Furthermore, the block change determining unit 722 compares image elements of the image data of the relevant block in the reference frame with image elements of the image data of the present block, which are located at the same positions, and then calculates a change amount of the block based on change amounts in these image elements, namely a so-called "a block change amount" (for example, a maximum value of absolute values for the above-explained change amount, an accumulated amount of absolute values for all image elements, an accumulated amount of squared values of the change amounts for all image elements. Furthermore, the block change determining unit 722 compares this block change amount with the threshold value outputted from the determining threshold value holding unit 706, thereby determining whether or not the present block corresponds to the valid block (namely, a block whose change amount is greater than the threshold value).

Then, when the present block corresponds to the valid block, the block change determining unit 722 outputs a reference frame rewriting signal to the reference frame holding unit 702. Upon receipt of this reference frame rewriting signal, the reference frame holding unit 702 updates the image data of the block in the reference frame held therein, located at the same position as that of the present block, by the image data of the present block stored in the block buffer.

In addition to the above operation, the block change determining unit 722 outputs a threshold value changing signal corresponding to the judgment result to the determining threshold value holding unit 706, and performs such a control that when the judgment result is the valid block, the threshold value derived from the determining threshold value holding unit 706 becomes a small threshold value, whereas when the judgment result is the invalid block, the threshold value derived from the determining value holding unit 706 becomes a large threshold value.

Moreover, the block change determining unit 722 reads out the image data of the preceding block from the preceding block holding unit when the judgment result is the valid block, and compares the image data of this preceding block with the image data of the block in the reference frame in the above-described manner, the block of the reference frame being located at the same position as the block of the preceding block held in the reference frame holding unit 702, whereby a recheck is made as to whether or not the preceding block corresponds to the valid block.

Then, when the block change determining unit 722 judges that the preceding block is the valid block, the determining unit 722 sets the judgment result (change information) of this preceding block to the valid block (for instance, "1"), and outputs the set change information to the block information holding unit 708 and the coding unit 710. On the other hand, when the block change determining unit 722 judges that the preceding block is the invalid block, this determining unit 722 outputs the judgment result (change information) of the preceding block held therein to the block information holding unit 708 and the coding unit 710.

When the judgment result of the valid block is derived from the block change determining unit 722, the variable length coding unit 710 codes the image data of the preceding block held in the preceding block holding unit 724 and then outputs the coded image data to the multiplexer (MPX) 712. Conversely, when the judgment result of the invalid block is derived from the block change determining unit 72, the variable length coding unit 72 does not execute the above-described coding operation.

The multiplexer 712 sequentially switches the change information about the respective blocks held in the block information holding unit 708 and the variable code data about the respective blocks inputted from the variable length coding unit 15, and successively outputs the above-described two sorts of information.

As described above, in the fifth image data coding apparatus, when a judgment is made that the present block is the valid block, the determining threshold value of the valid block is set to the small threshold value, and the image change of the preceding block is rechecked based on this small threshold value. Then, when another judgment is made that the preceding block is the valid block during this rechecking operation, the change information of the preceding block is set to the valid block. On the other hand, when a judgment is done that the present block is the invalid block, the determining threshold value of the above-explained valid block is set to the large threshold value in order to judge the image change of the next block.

As described above, a selection is made of the determining threshold values for the valid block based on such a fact whether or not the present block is the valid block, namely whether or not there is an image change in the present block. When it is judged that the present block is the valid block, the preceding block is rechecked based on the small threshold value whether or not this preceding block corresponds to the valid block. As a result, even when the image is gradually changed within a certain region, the valid block can be properly judged.

Such an effect will now be explained with reference to FIGS. 21 to 23.

First, as represented in FIG. 21A, if the image of the block like a portion constructed of the regions A, R, C is gradually varied, when the judgment of the valid block would be carried out based on a single threshold value, both of the change starting region A and the change ending region B would be judged as the invalid blocks, and only the image change peak region B would be judged as the valid block (see FIG. 21B). As a result, it may be felt that the region B corresponding to the valid block is projected from the adjacent regions A and C.

Figure 21D:
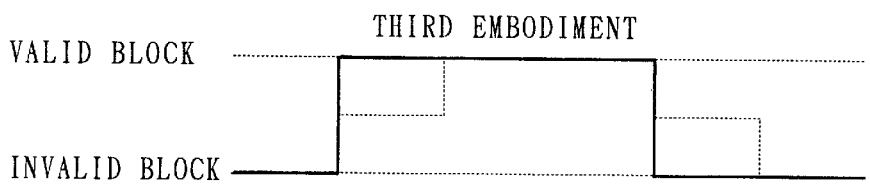
Figure 21E:
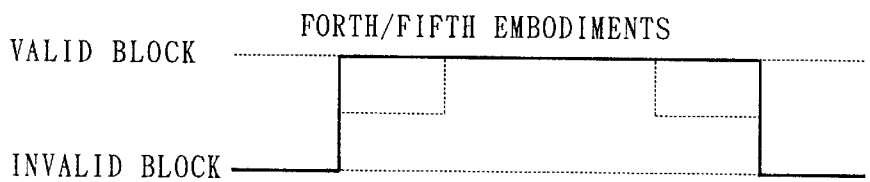

To the contrary, in case of the fifth image data coding apparatus, as illustrated in FIG. 21E, when a judgment is made that the image change peak region B is the valid block, the determining threshold value of the valid block is changed into the small threshold value. Thereafter, since the region A is again checked as to whether or not this region A is the valid block based on this small threshold value, it can be judged that this region A corresponds to the valid block. As a consequence, as shown in FIG. 21E, the consecutive region from the image change starting region A to the image change ending region B may be judged as the valid block region. Therefore, since the images of the regions A, B, C are varied together during the image decoding operation, a natural image reproduction could be realized.

Further, as represented in FIG. 22A, when a region B having a small image variation is solely present within a consecutive region whose image has been changed with respect to the image of the preceding frame, in case that only one determining threshold value of the valid block is employed, the following judgment result is obtained. The region A is the valid block, the region B is the invalid block, and the region C is the valid block, so that the regions of the valid block are interrupted, which gives such an impression that an unnatural decoded image is observed during the image is observed during the image decoding/representing operations. However, in accordance with the fifth image data coding apparatus, as illustrated in FIG. 22C, since the region B is also judged as the valid block, a consecutive region from the image change starting region to the image change ending region can be judged as the valid block. As a consequence, since any of the regions A, B and C are varied during the decoding/displaying operations, a natural decoded image can be obtained.

Figure 23D:
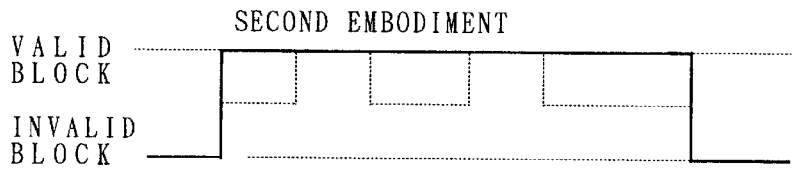
Figure 23E:
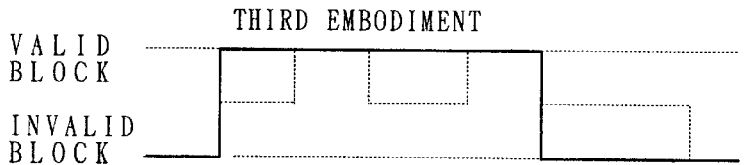

Similarly, as illustrated in FIG. 23A, in such a consecutive region whose block change amount is not constant, when only one determining threshold value for the valid block is utilized, the regions judged as the valid block are interrupted (see FIG. 23A). To the contrary, in accordance with the fifth image data coding apparatus, as shown in FIG. 23D, since a judgment is made that a consecutive region from the image change starting region to the image change ending region is the valid block, the image quality of the decoded image thereof can be improved.

Figure 26:
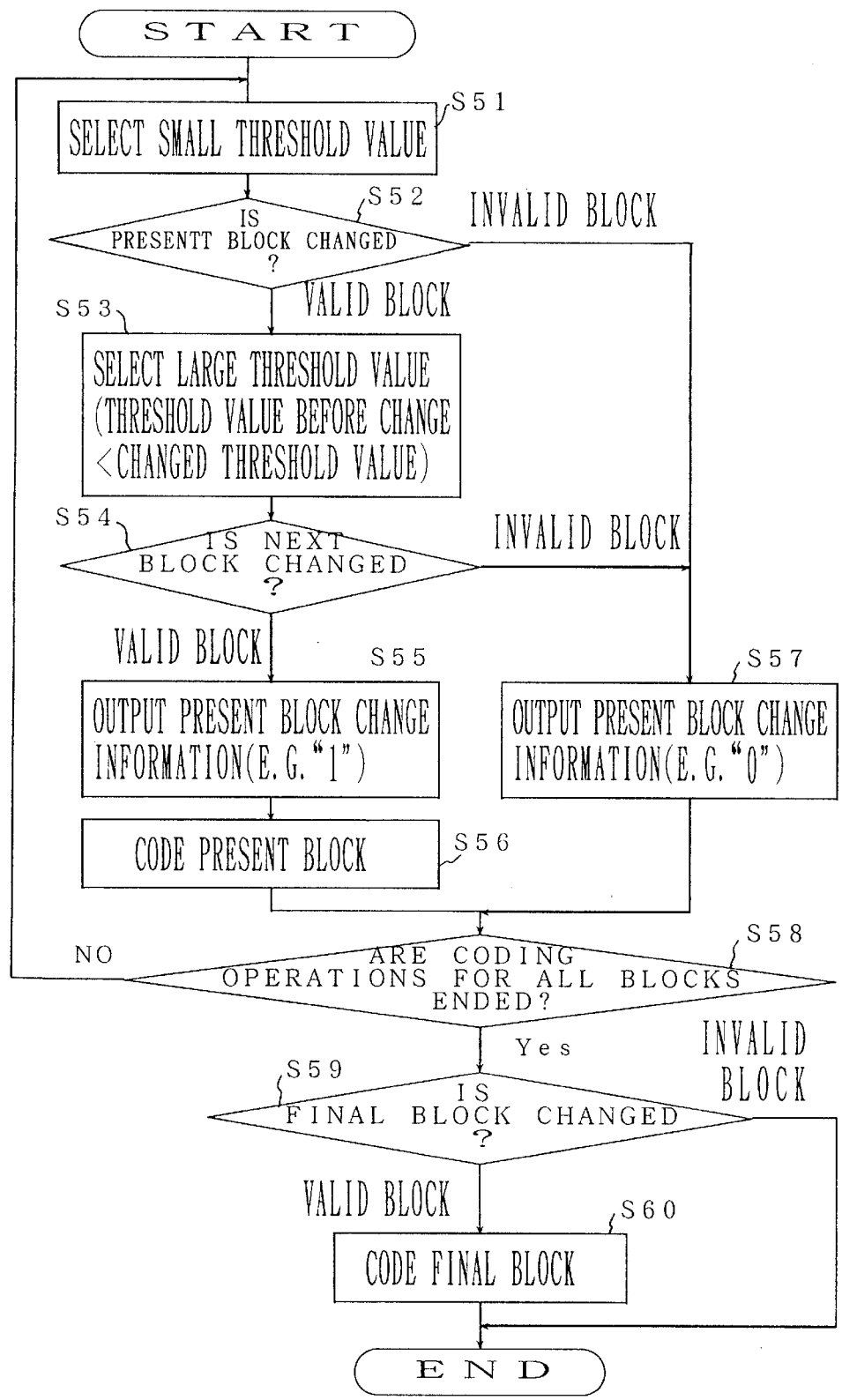
FIG. 26 is a flowchart indicating the 4th image data encoding method according to an embodiment of the present invention.

FIG. 26 is the flowchart indicating the 4th image data encoding method according to the embodiment of the present invention.

In this encoding method, two thresholds each having a different value are used as a valid or block determination threshold.

According to this encoding method, a threshold having a smaller value (a smaller threshold) is selected as a valid block determination threshold (S51).

First, it is determined using the smaller threshold whether or not the present block is valid or (S52). If yes, a threshold having a larger value (a larger threshold) is selected as a valid or block determination threshold (S53).

Then, it is determined using the larger threshold whether or not the succeeding block is valid (S54). If yes, a value indicating that the present block is valid ("1", for example) is outputted to change information on the present block (S55). Next, the image in the present block are encoded (S56).

If it is determined that the succeeding block is invalid in step S54, then a value indicating that the present block is invalid ("0", for example) is outputted as change information on the present block (S57). In this case, the image data in the present block are not encoded.

The processes in steps S51 through S57 are performed on all blocks in a frame. If the change information has been outputted for the second block from the last ("Yes" in S58), then it is determined using a smaller threshold whether or not the last block is valid (S59). Only if it is determined that the block is valid, the image data in the last block are encoded (S60).

Thus, in this encoding method, it is determined using the smaller threshold whether or not the present block is valid. If yes, it is determined using the larger threshold whether or not the succeeding block is valid. Only if it is determined that the succeeding block is valid, it is determined that the present block is valid, a value indicating that the present block is valid is set and outputted to the change information on the present block, and the image data in the present block are encoded. That is, also in this encoding method, the data in a valid block can be encoded.

Figure 27:
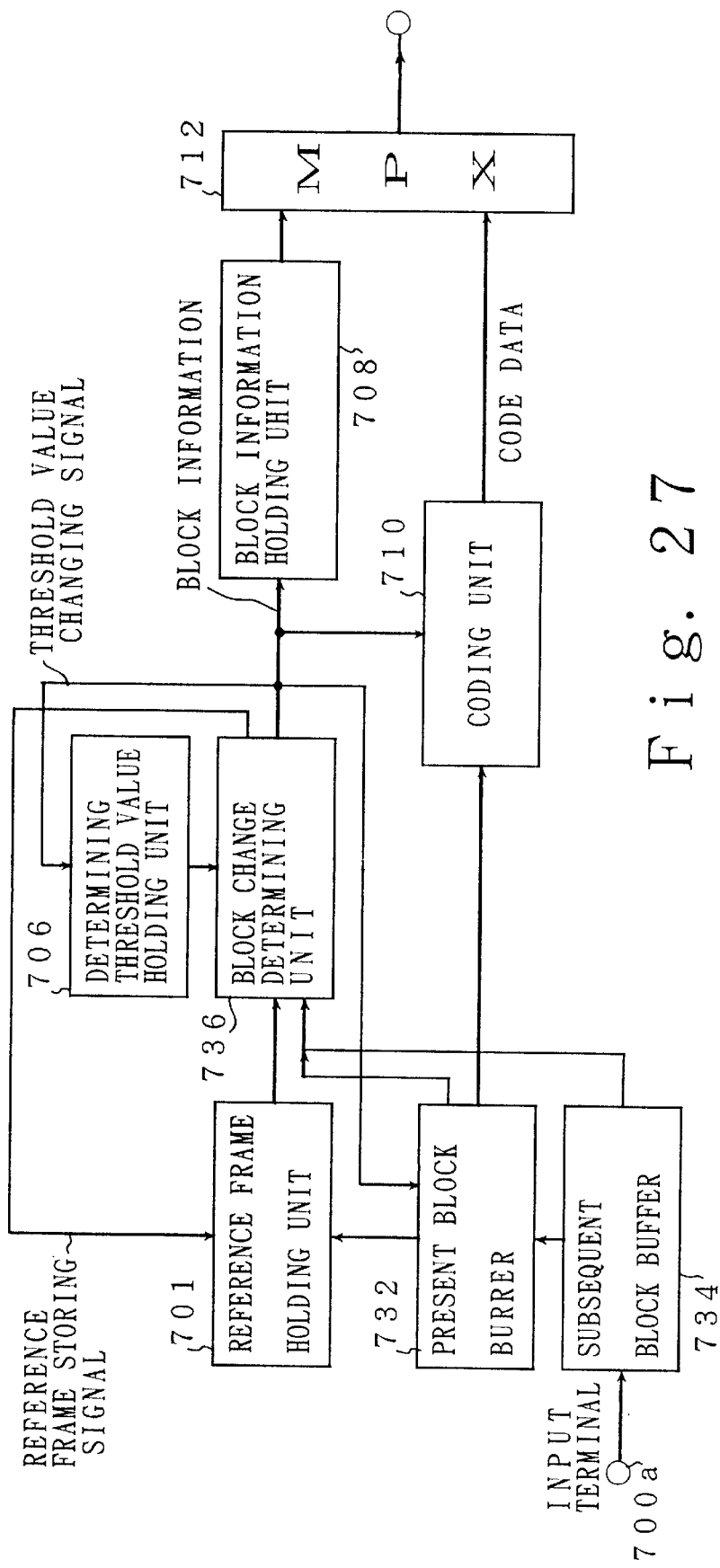
FIG. 27 is a block diagram showing the circuit configuration of the 6th image data encoding device according to the embodiment of the present invention.

FIG. 27 is the block diagram indicating the circuit configuration of the 6th image data encoding device for encoding image data in a frame in block units according to the 4th image data encoding method.

In FIG. 27, a block which also appears in the block diagram indicating the 4th image data encoding device shown in FIG. 19 is given the number assigned therein.

A present block buffer 732 stores image data in the present block whose data are to be encoded.

A succeeding block buffer 734 stores image data in the succeeding block applied through input terminal 700a.

A block change determining unit 736 determines using a smaller threshold applied by the determination threshold value storing unit 706 whether or not the above described present block is valid according to the image data in the present block stored in the present block buffer 732 and to the image data in the reference frame stored in the reference frame storing unit 701. If the determination indicates that the present block is valid, then the block change determining unit 736 determines using a larger threshold applied by the determination threshold value storing unit 706 whether or not the succeeding block is valid according to the image data in the succeeding block stored in the succeeding block buffer 734 and to the image data in the reference frame stored in the reference frame storing unit 701. If the determination indicates that the succeeding block is valid, then the determination result is outputted to the block information storing unit 708 and the encoding unit 710 as the change information on the present block.

That is, the block change determining unit 736 reads from the reference frame storing unit 732 the image data in the block, located at the position corresponding to that of the present block stored in the present block buffer, in the reference frame, compares picture elements in the image data in the present block with those in the block in the reference frame, obtains a variation in a block according to the variation of each picture element (for example, the maximum value in a block, an accumulative value of absolute values of the above described variations of all picture elements, an accumulative value of square numbers of the variation of all picture elements, etc.), compares the block variation with a smaller threshold applied by the threshold storing unit 706, and determines whether or not the present block is valid after determining whether or not the block variation is larger than the smaller threshold.

Then, if the determination result indicates a valid block, then the block change determining unit 736 internally stores change information indicating a valid block, outputs a threshold change signal to the determination threshold storing unit 706, and switches thresholds outputted by the determination threshold storing unit 706 from a smaller threshold to a larger threshold.

The block change determining unit 736 reads image data in the succeeding block from the succeeding block buffer 734, reads from the reference frame storing unit 701 the image data in the block, located at the position corresponding to that of the succeeding block, in the reference frame, and then calculates the block variation as described above. The block variation is compared with a larger threshold applied by the determination threshold storing unit 706, and it is determined whether or not the succeeding block is valid.

Then, if the block change determining unit 736 determines that the succeeding block is valid or valid, then it determines that the present block is valid, and outputs the determination result of the present block (indicating a significant block) to the block information storing unit 708 and the encoding unit 710. If the block change determining unit 736 determines that the succeeding block is invalid, then it turns the determination result of the present block to "an invalid block", and outputs it to the block information storing unit 708 and the encoding unit 710.

When the block change determining unit 736 determines that the present block is a valid or valid block, then it outputs a reference frame rewrite signal to the reference frame storing unit 701. On receiving the signal, the reference frame storing unit 701 updates the image data in the block in the reference frame to the data in the corresponding block in the present block.

On receiving a determination result from the block change determining unit 736, the encoding unit 710 reads the image data in the present block from the block buffer 732, encodes the image data in the present block, and outputs them to the multiplexer (MPX) 712. However, if the determination result indicates an invalid block, the encoding unit 710 encodes no image data in the present block.

The multiplexer 712 sequentially switches and outputs change information on each block applied from the block information storing unit 708 and variable-length encoded data of a valid block received from the encoding unit 710.

Thus, with the 6th image data encoding device, when the present block is determined using a smaller determination threshold that it is a valid block, it is further determined using a larger determination threshold whether or not the succeeding block is valid. If yes, it is determined that the present block is valid. If no, it is determined that the present block is invalid.

The operation of the 6th image data encoding device is explained by referring to FIGS. 21 through 23.

As described above, if a block image indicates a moderate change from its preceding frame, and if a valid block determination is made using a single threshold for areas A, B, and C, then an image change starting area A and an image change ending area C where a change in images from its preceding frame is relatively moderate are determines to be invalid blocks, and only an image change peak area B is determined to be a valid block as shown in FIG. 21B. Therefore, the only valid block B is displayed conspicuously when an image is reconstructed, resulting in an unnatural image.

With the 6th image data encoding device, if area A is determined to be valid using a smaller threshold as shown in FIG. 21D, then it is determined using a larger threshold whether or not area B, that is, the succeeding block, is valid. Therefore, an area indicating a change in images from the preceding frame can be appropriately detected, and the adjacent areas A and B can be determined to be valid. As a result, a natural image is obtained after an original image is reconstructed.

Furthermore, as shown in FIG. 22A, if adjacent areas indicates a change in images from the preceding frames, and if the image changes moderately at the central portion of the areas, then determining a valid block using a single threshold determines that area A is valid, area B invalid, and area C valid or valid. Then, the reconstructed image looks unnatural at area B.

On the other hand, with the 6th image data encoding device, area B is determined to be valid using a smaller threshold, and area C is determined to be valid using a larger threshold. Therefore, area B is determined to be valid. As a result, as shown in FIG. 22D, the adjacent areas B and C can be determined to be valid, thereby reconstructing a more natural image.

Figure 28:
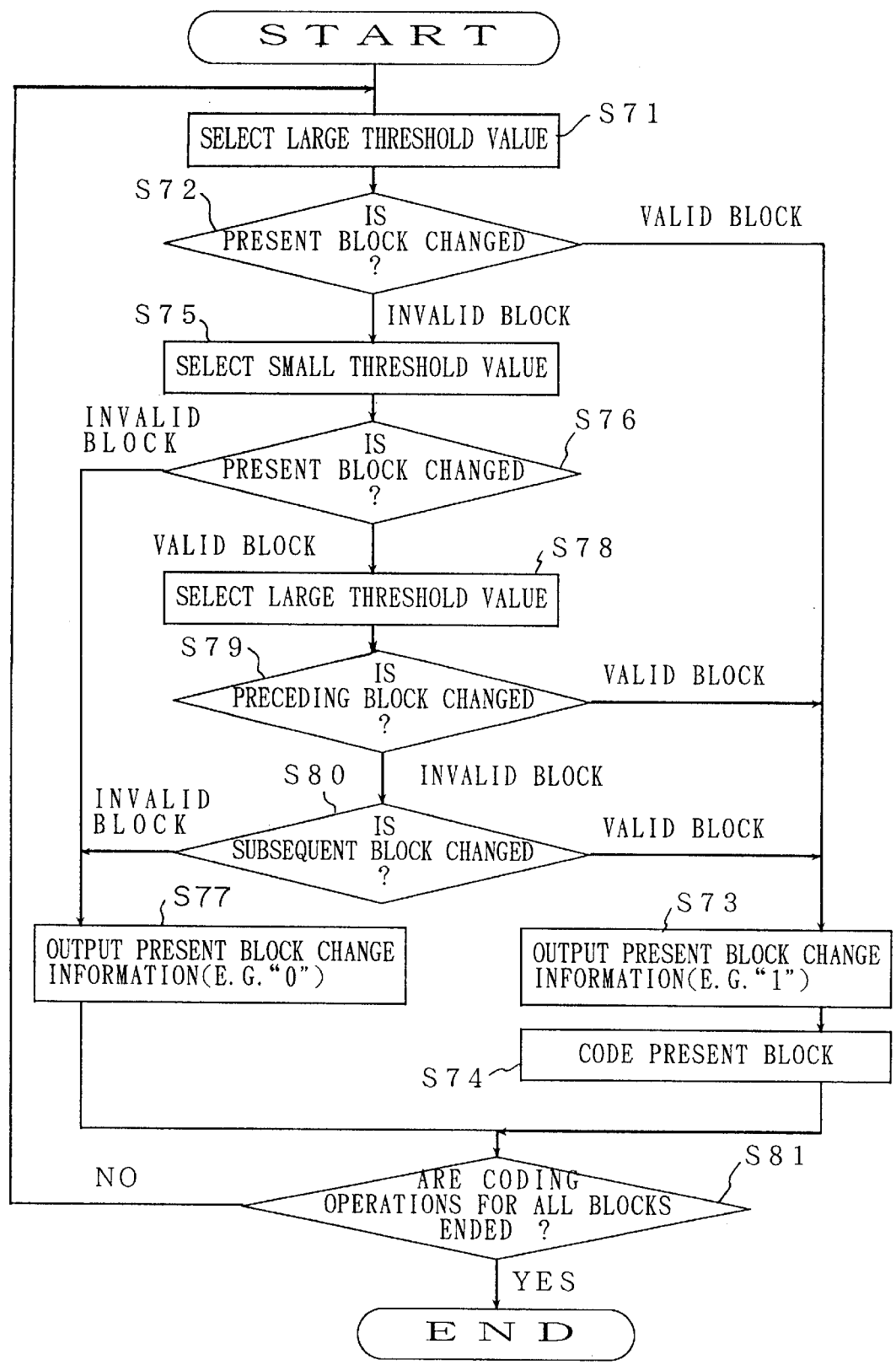
FIG. 28 is a flowchart indicating the 5th image data encoding method according to an embodiment of the present invention.

Next, FIG. 28 is the flowchart indicating the 5th image data encoding method.

In this encoding method, two thresholds are used to determine whether or not a block is valid.

That is, first, a threshold having a larger value (a larger threshold) is selected as a valid block determination threshold (S71). Using the larger threshold, it is determined whether or not the present block is valid (S72). If yes, a value indicating that the present block is valid ("1", for example) is set and outputted as change information on the present block (S73), and the image data in the present block are encoded (S74).

If it is determined that the present block is valid in step S72, then a smaller threshold is selected as a valid block determination threshold (S75). Then, it is determined using the smaller threshold whether or not the present block is valid (S76). If no, a value indicating that the present block is invalid ("0", for example) is set and outputted as change information on the present block (S77), and the image data in the present block are not encoded.

In step S76, if it is determined that the present block is a valid block, then the larger threshold is selected as a valid block determination threshold (S78), and it is determined whether or not the preceding block is valid (S79).

If it is determined that the preceding block is valid in the determination, it is determined that the present block is valid, and the processes in steps S73 and S74 are performed.

On the other hand, if it is determined that the preceding block is invalid in step S78, then it is determined using the larger threshold whether or not the succeeding block is valid (S80). If yes, it is determined that the present block is valid, and the processes in step S73 and S74 are performed.

If it is determined that the succeeding block is valid in step S80, then the present block is considered to be valid, and only the process in step S77 is performed.

If the processes in steps S71 through S80 are performed on all blocks in one frame, and if the processes in steps S71 through S80 have been completed for all blocks ("Yes" in S81), then the image data in the frame are performed.

If it is determined in step S79 that the preceding block is invalid during the determination of the last block in a frame, then it is determined that the last block is invalid, and the process in step S77 is performed immediately.

If it is determined in step S76 that the present block is valid during the determination of the leading block, then the process in step S80 is performed immediately after step S78.

Figure 29:
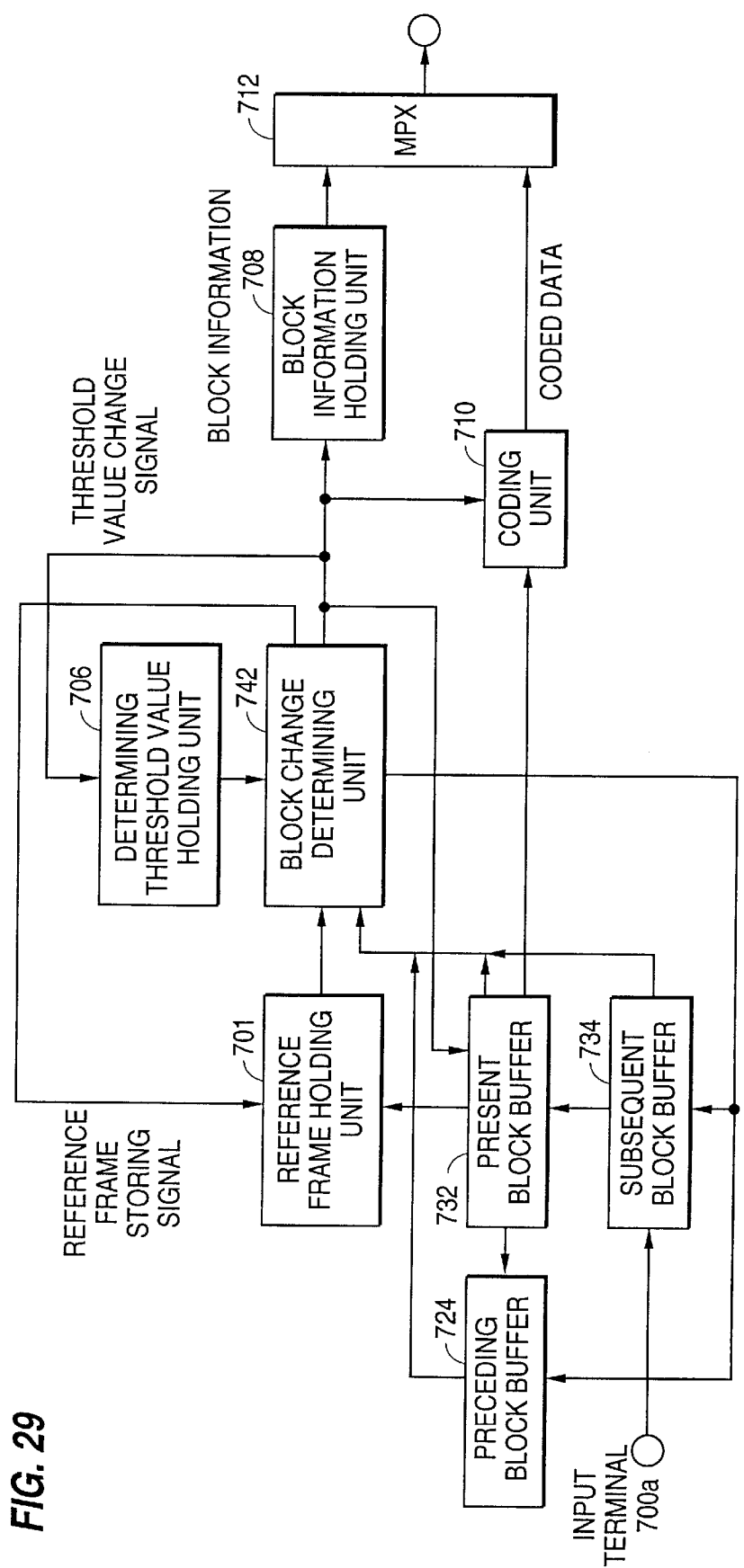
FIG. 29 is a block diagram showing the circuit configuration of the 7th image data encoding device according to the embodiment of the present invention.

FIG. 29 is the block diagram indicating the general configuration of the 7th image data encoding device for encoding a series of images by the above described 5th image data encoding method.

In FIG. 29, if a block also appears in the diagrams of the 5th and 6th image data encoding devices shown in FIGS. 25 and 27 respectively, then the block is given the number assigned in these figures.

A block change determining unit 742 receives the image data in the present block from the present block buffer 732, the image data in the preceding block from the preceding block buffer 724, and the image data in the succeeding block from the succeeding block buffer 734. The block change determining unit 742 sequentially reads from the reference frame storing unit 701 image data in the blocks located at the positions of the above described present, preceding, and succeeding blocks. Then it determines using a larger and/or smaller thresholds received from the determination threshold value storing unit 706 and according to the procedure shown in the flowchart shown in FIG. 28 whether or not the present block indicates a difference from that in the reference frame, and is valid.

Next, the operation of the 7th image data encoding device shown in FIG. 29 is explained.

Image data in each block in a frame are applied through input terminal 700a and temporarily stored in the succeeding block buffer 734, and then stored in the present block buffer 732. When the image data in the present block have been encoded, they are transferred to the present block buffer 732, and stored therein as the image data in a new present block. The image data in the present block stored in the present block buffer 732 are transferred to the preceding block buffer 724 immediately after being encoded, and stored as the image data in a new preceding block.

When determining whether or not the present block whose image data are stored in the present block buffer 732 is valid, the block change determining unit 742 reads from the reference frame storing unit 701 the image data in the block, located at the position corresponding to that of the present block, of the reference frame, compares the image data in the block in the reference frame with the image data in the present block stored in the present block buffer 732 by collating picture images at the corresponding positions, and obtains the difference in picture element value for each image picture element. Then, the difference in block units (for example, the maximum absolute value of the difference in a block, the accumulative value of absolute values of differences for all picture elements in a block, the accumulative value of square numbers of differences for all picture elements in a block, etc.) is obtained. Then, the difference in a block is compared with a larger threshold provided by the determination threshold storing unit 706, and then it is determined whether or not the present block is valid. That is, if the above described difference in a block is equal to or larger than the larger threshold, then it is determined that the present block is valid.

Thus, if the block change determining unit 742 determines that the present block is valid, then it outputs the determination result to the block information storing unit 708 and the encoding unit 710. Then, the encoding unit 710 encodes the image data in the present block stored in the present block buffer 732, and outputs the encoded data to the multiplexer (MPX) 712.

On the other hand, the block information storing unit 708 sets a value indicating that the present block is valid ("1", for example) as block information on the present block, and stores it as present block information (change information).

If the block change determining unit 742 determines that the present block is invalid, it outputs a threshold change signal to the determination threshold storing unit 706. Then, the determination threshold storing unit 706 switches thresholds from the larger to the smaller and outputs the smaller threshold.

The block change determining unit 742 determines again using the smaller threshold according to the above described procedure whether or not the present block is valid.

If the block change determining unit 742 determines that the present block is invalid, then it outputs the determination result to the block information storing unit 708 and the encoding unit 710.

Then, the block information storing unit 708 sets and stores a value indicating that the present block is invalid ("0", for example) as present block information (change information). If the block change determining unit 742 determines using the smaller threshold that the present lock is valid, then it outputs a threshold change signal again to the determination threshold storing unit 706, and has the determination threshold storing unit 706 output the larger threshold again.

Then, the block change determining unit 742 reads the image data in the preceding block from the preceding block buffer 724, reads from the reference frame storing unit 701 the image data in the block, located at the position corresponding to that of the present block, in the reference frame, and then determines using the larger threshold whether or not the preceding block is valid as in the determination of the present block.

If the block change determining unit 742 determines that the preceding block is valid, it is determined that the present block is valid, and the unit outputs the determination result to the block information storing unit 708 and the encoding unit 710. Then, the encoding unit 710 encodes the image data in the present block stored in the present block buffer 732.

The block information storing unit 708 sets and stores a value indicating that the present block is valid as block information on the present block (change information).

If the block change determining unit 742 determines that the preceding block is invalid, then it reads the image data in the succeeding block from the succeeding block buffer 734, compares the image data in the succeeding block with the image data in the block, located at a position corresponding to that of the succeeding block, in the reference frame, and determines using the larger threshold whether or not the succeeding block is valid.

Thus, if the block change determining unit 742 determines the succeeding block is valid, then it determines that the present block is valid, and outputs the determination result to the block information storing unit 708 and the encoding unit 710.

Thus, the block information storing unit 708 and the encoding unit 710 perform the above described processes.

If the block change determining unit 742 determines that the succeeding block is invalid, then it determines that the present block is invalid, and outputs the determination result to the block information storing unit 708 and the encoding unit 710.

As a result, the block information storing unit 708 sets and stores a value indicating that the present block is invalid as present block information (change information). The encoding unit 710 does not encode the image data in the present block stored in the present block buffer.

If the block change determining unit 742 determines that the present block is valid, then it outputs a reference frame rewrite signal to the reference frame storing unit 701. The reference frame storing unit 701 updates the image data in its block located at the position corresponding to that of the present block to the image data in the present block.

If the update has been completed, the image data of the present block stored in the present block buffer 732 are transferred to the preceding block buffer 724, and then the image data of the succeeding block stored in the succeeding block buffer 734 are transferred to the present block buffer 732. Next, the image data in a new block are entered through input terminal 700a, and applied to and stored in the succeeding block buffer 734.

The multiplexer 712 alternately switches block information of each block stored in the block information storing unit 708 and variable-length encoded data of a valid block applied from the encoding unit 710, and sequentially outputs them. Thus, with the 7th image data encoding device, it is determined using a larger threshold that the present block is valid if its image is considered to have been changed from that of the preceding frame (reference frame).

If it is determined using a larger threshold that the present block is invalid, then it is determined using a smaller threshold whether or not the image in the present frame has been changed from that in the preceding frame (reference frame). If, according to the determination, it is determined that the present block is valid, then it is determined using a larger threshold whether or not the preceding or succeeding block is valid. If according to the determination, the preceding or the succeeding block is valid, then it is finally determined that the present block is valid.

Since the present block is thus considered to be valid, blocks can be validly set at the area where an image indicates a moderate change from that in the preceding frame, or at a series of areas where differences in images are not constant.

Next, the operation of the 7th image encoding device is explained concretely by referring to FIGS. 21 through 23.

First, as shown in FIG. 21A, if it is determined whether or not a block is valid in a series of areas A, B, and C where a change in an image raises moderately from that in the preceding frame and then reduced moderately, it is determined that both image change starting area A and image change ending area C refer to invalid blocks, while it is determined that only area B where the image change indicates its peak refers to a valid block as shown in FIG. 21B. Therefore, when the series of areas are reconstructed and displayed, images are changed in area B only, while the same images are displayed for the present and preceding frames, thereby displaying unnatural images totally.

On the other hand, with the 7th image data encoding device, it is determined using a larger threshold that area A is invalid and then using a smaller threshold that it is a provisional valid block. Since it is determined using a larger threshold that the succeeding block, that is, area B, is valid block, it is determined that area A is valid finally. Likewise, although it is determined using a larger threshold that area C is invalid, it is determined using a smaller threshold that it is valid provisionally. Then, since it is determined using a larger threshold that the preceding block, that is, area B, is valid, it is determined that area C is valid finally. Thus, with the 7th image data encoding device, images change in areas A and C where images change moderately from those in the preceding frame, and it is determined that all series of areas A, B, and C are valid as shown in FIG. 21E. As a result, when images are reconstructed, all data in areas A, B, and C are reconstructed, thereby displaying more natural images.

Figure 22B:
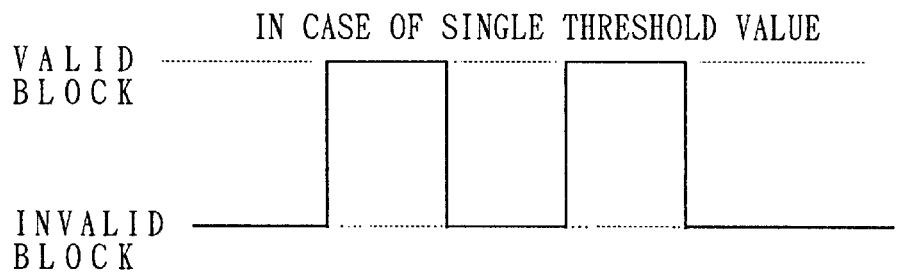
Figure 22C:
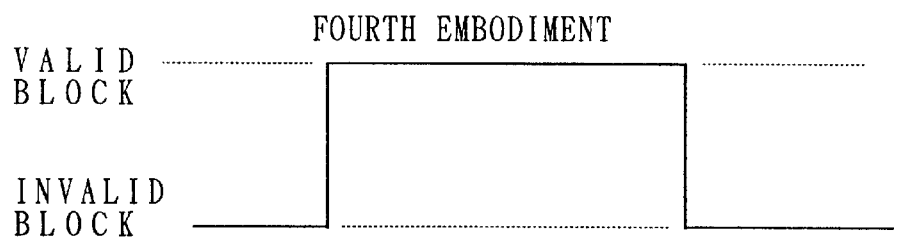
Figure 22D:
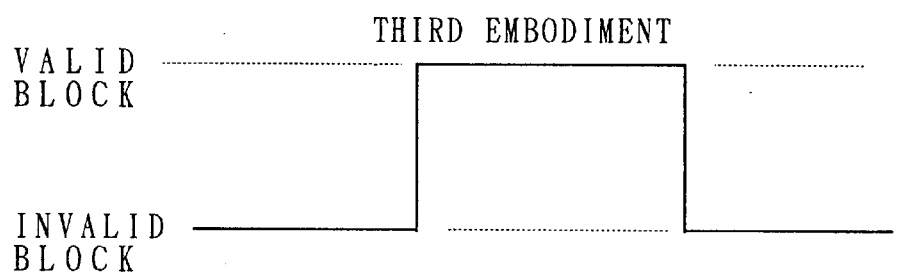

As shown in FIG. 22A, if a change in an image is more moderate in the central portion than in its adjacent end portions A and B, it is determined that only the above described central area B is invalid when a valid block determination is made using a single threshold as shown in FIG. 22B. Therefore, the original image cannot be naturally displayed in smooth lines because image-changed areas are intercepted by an image-unchanged area when the original image is reconstructed and displayed.

On the other hand, with the 7th image data encoding device, it is determined using a larger threshold that area B is invalid, but that it is valid when a smaller threshold is used. Since it is determined using a larger threshold that area A, that is, the preceding block of area B, is valid, it is determined that area B is finally valid. As a result, as shown in FIG. 22C, it is determined that all areas A, B, and C are valid. Therefore, images are changed in all adjacent areas A, B, and C when the original image is reconstructed and displayed. Thus, a naturally reconstructed image can be displayed.

As shown in FIG. 23A, in the series of areas where the variation in image between preceding and present frames (variation in block) is not constant, and the image variation is interceptedly detected, when valid block determination is made using a single threshold, it is determined that all blocks are invalid if an image changes moderately as shown in FIG. 23B. Therefore, when the image in the serial areas is reconstructed, image-changed areas appear as being intercepted by another area, thereby displaying an unnatural image.

Figure 23F:
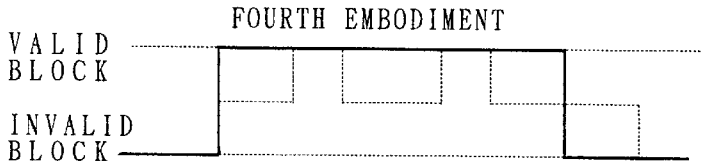

On the other hand, with the 7th image data encoding device, in the above described areas where images changes moderately, it is determined using a larger threshold that the preceding or succeeding block is valid. Therefore, as shown in FIG. 23F, it is determined that the above described series of areas are all valid. As a result, all these areas are changed in image when the original image is reconstructed and displayed, thereby outputting a naturally reconstructed image.

The above described 7th image encoding device is realized by hardware. However, the function can be realized by software such as microprocessors and digital signal processors.

The function can also be realized by reducing the amount of encoded transmission data by encoding block information (change information) indicating whether each block in a flame is valid or invalid.

A rate of data compression can be greatly raised for a series of images where a small change can be detected between adjacent frames by selectively encoding and outputting only blocks considered to have been changed in image from the preceding frame. Using this effect, an average rate of compression of moving data such as TV telephones images, moving images, etc. for which a camera is fixed can be greatly raised.

When image data in a block are encoded, valid block determination is made flexibly by using two thresholds. Accordingly, the reconstruction of an unnatural image can be prevented by determining a series of areas from the start to the end of a change to be valid block areas even when a change in image is made moderately.

Figure 30:
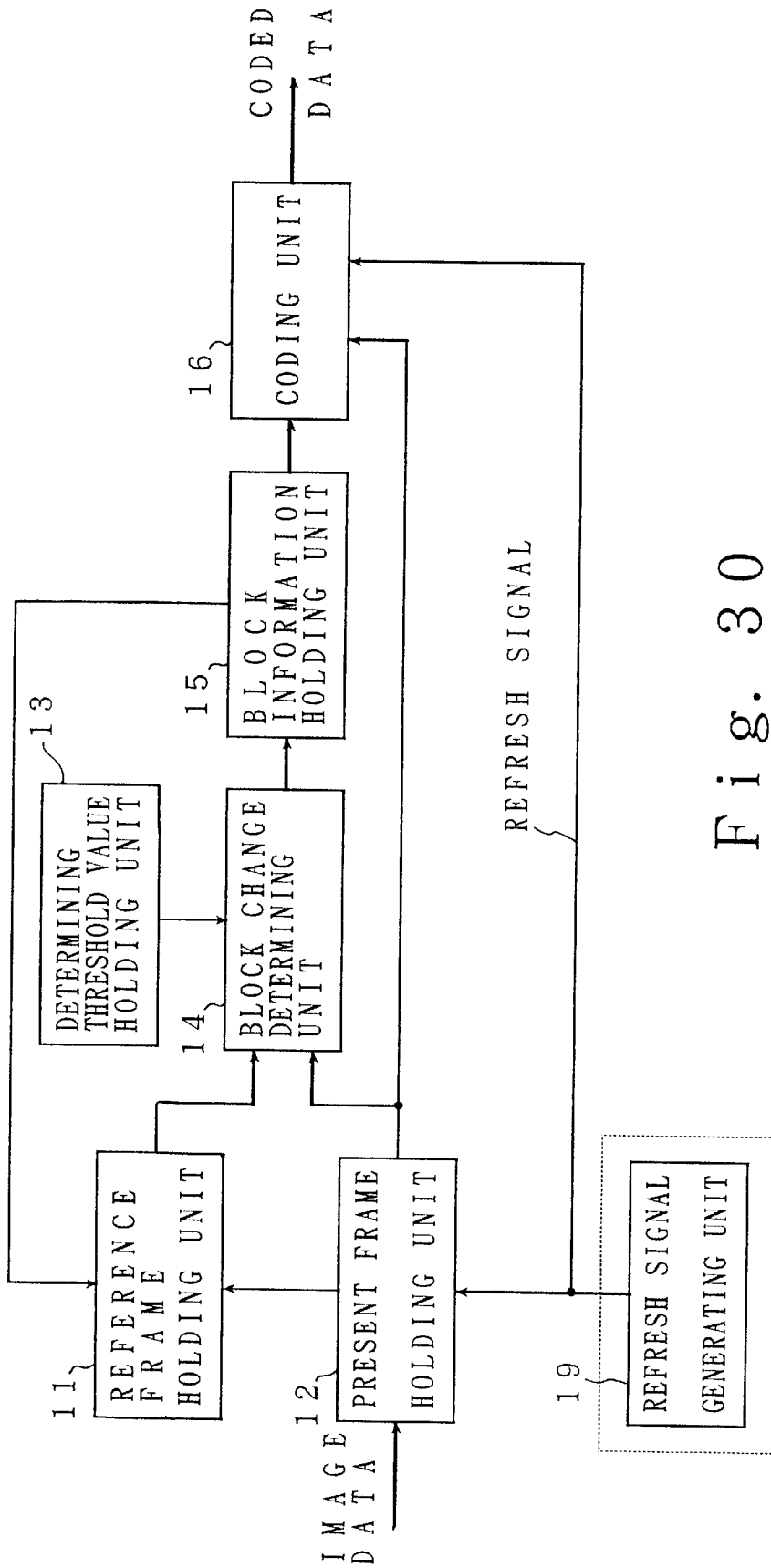
FIG. 30 shows a block diagram indicating the configurations of the 8th and 9th image data encoding devices according to the present invention.

FIG. 30 is the block diagram indicating the configurations of the 8th and 9th image data encoding devices according to the present invention. Each of the devices relates to an image data encoding device for encoding a series of image data, and comprises the following units.

A reference frame storing unit 811 stores image data in a reference frame.

A present frame storing unit 812 stores image data in the present frame (the latest frame whose data are to be encoded).

A determination threshold storing unit 813 stores a threshold used in determining the existence of a change in image in each block of the present frame located at the position corresponding to that in the reference frame.

A block change determining unit 814 obtains the variation of picture element value of a block located at a position corresponding to that of the reference frame stored in the reference frame storing unit 811, compares the variation with the threshold stored in the determination threshold storing unit 813, and determines the change in image in each of all blocks in the present frame from the image in the block located at the position corresponding to that in the reference frame.

A block information storing unit 815 stores determination results of all blocks in the present frames obtained by the block change determination unit 814 as block information.

An encoding unit 816 encodes data in a valid block which is determined to be an image-changed block compared with the corresponding block in the reference frame if the present frame is not a refresh frame, and encodes data after dividing all blocks in the present frame into valid blocks and invalid blocks which are determined to be image-unchanged blocks compared with the reference frame if the present frame is a refresh frame according to the block information on each block in the present frame stored in the block information storing unit 815.

The reference frame storing unit 811 updates in the reference frame the image data in the block, located at the position corresponding to that of the block whose data are encoded by the encoding unit 816 in the present frame, to the encoded image data in the block in the present frame.

The 9th image data encoding device according to the present invention further comprises, in addition to the units 811, 812, 813, 814, 815, and 816, a refresh signal generating unit 819 for outputting a refresh signal indicating that the present frame is a refresh frame to at least the encoding unit and the reference frame storing unit 811 each time the number of frames data-encoded by the encoding unit 816 reaches a predetermined value.

In the 8th and 9th image data encoding device, if the present frame is a refresh frame, then the encoding unit 816 divides the present frame into valid blocks and invalid blocks to encode data in two steps. Therefore, the encoding unit 816 first encodes all valid blocks, and then all invalid blocks.

Thus, since data in refresh frames are encoded in plural times of encoding processes, image encoded data in refresh frames having a large amount of codes can be transmitted and reconstructed in plural steps.

Therefore, a reconstructing equipment can start its reconstructing process at time intervals at which framed data are normally reconstructed, and reduce the capacity of a code buffer at both encoding and reconstructing equipments.

When data in a refresh frame are encoded, those in valid blocks are encoded first because they have a larger influence on the quality of a reconstructed image. After the data in all valid blocks have been encoded, data in invalid blocks are encoded.

Thus, in a reconstructing equipment, data in a refresh frame can be reconstructed more naturally than in a conventional method and the capacity of a buffer can be reduced in both encoding and reconstructing equipments although the refresh frame has a large amount of codes.

Figure 31:
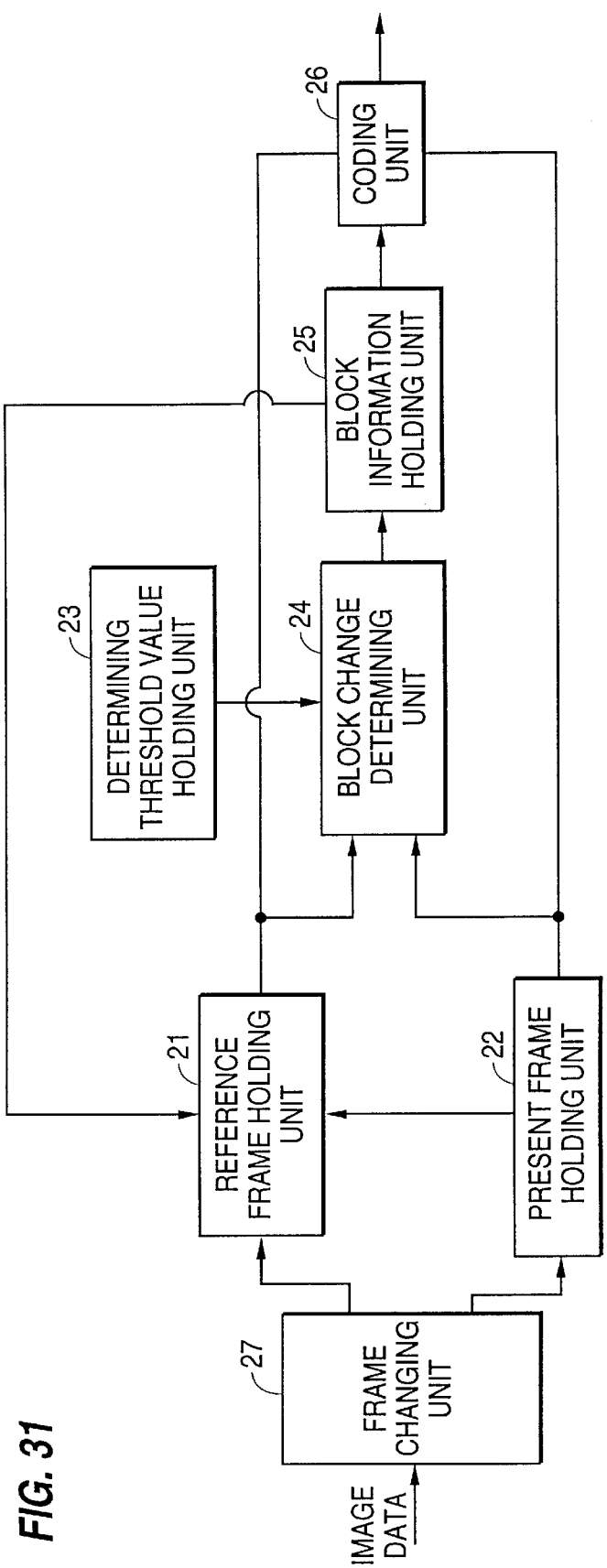
FIG. 31 shows a block diagram showing the configuration of the 10th image data encoding device.

FIG. 31 is the block diagram showing the configuration of the 10th image data encoding device. The device refers to an image data encoding device for encoding a series of image data, and comprises the following units.

A reference frame storing unit 821 stores image data in a reference frame.

A present frame storing unit 822 stores image data in the present frame (the latest frame whose data are to be encoded).

A determination threshold storing unit 823 stores a threshold used in determining the existence of a change in image in each block of the present frame located at the position corresponding to that in the reference frame.

A block change determining unit 824 obtains the variation of picture element value of a block located at a position corresponding to that of the reference frame stored in the reference frame storing unit 821, compares the variation with the threshold stored in the determination threshold storing unit 823, and determines the change in image in each of all blocks in the present frame from the image in the block located at the position corresponding to that in the reference frame.

A block information storing unit 825 stores determination results of all blocks in the present frames obtained by the block change determination unit 824 as block information.

An encoding unit 826 encodes data in a valid block which is determined to be an image-changed block compared with the corresponding block in the reference frame if the present frame is not a refresh frame, and encodes data after dividing all blocks in the present frame into valid blocks and invalid blocks which are determined to be image-unchanged blocks compared with the reference frame if the present frame is a refresh frame according to the block information on each block in the present frame stored in the block information storing unit 825.

A frame switching unit 827 switches the present reference frame storing unit 821 to the present frame storing unit 822, and the present frame storing unit 822 to the reference frame storing unit 821 when the present frame whose data are encoded by the encoding unit 826 is a refresh frame.

The reference frame storing unit 821 updates in the reference frame the image data in the block, located at the position corresponding to that of the block whose data are encoded by the encoding unit 826 in the present frame, to the encoded image data in the block in the present frame if the present frame is not a refresh frame.

With the encoding device, the frame switching unit 827 switches the present reference frame storing unit 821 to the present frame storing unit 822, and the present frame storing unit 822 to the reference frame storing unit 821 when the present frame whose data are encoded by the encoding unit 826 is a refresh frame. Therefore, in a refreshing process, data in a reference frame can be updated at a higher speed than in a conventional method.

Figure 32:
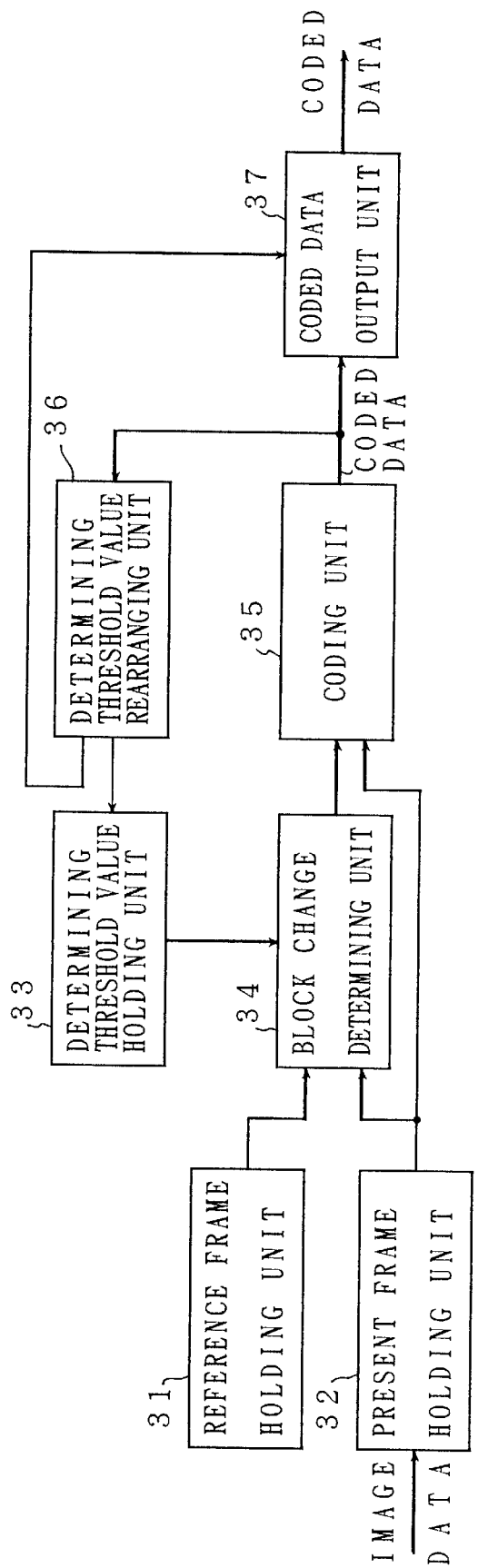
FIG. 32 shows a block diagram showing the configuration of the 11th image data encoding device.

FIG. 32 is the block diagram showing the configuration of the 11th image data encoding device. The device refers to an image data encoding device for encoding a series of image data, and comprises the following units.

A reference frame storing unit 831 stores image data in a reference frame.

A present frame storing unit 832 stores image data in the present frame (the latest frame whose data are to be encoded).

A determination threshold storing unit 833 stores a threshold used in determining the existence of a change in image in each block of the present frame located at the position corresponding to that in the reference frame.

A block change determining unit 834 obtains the variation of picture element value of a block located at a position corresponding to that of the reference frame stored in the reference frame storing unit 831, compares the variation with the threshold stored in the determination threshold storing unit 833, and determines the change in image in each of all blocks in the present frame from the image in the block located at the position corresponding to that in the reference frame.

An encoding unit 835 encodes data in the valid blocks whose data have been determined to have changed from data in the reference fame by the block change determination unit 834.

A determination threshold setting unit 836 determines whether or not a threshold presently stored in the determination threshold storing unit 833 is an appropriate value according to the amount of codes of data encoded by the encoding unit 835. If not, the unit sets the determination threshold storing unit 833 to a value different from the threshold.

If the determination threshold reassigning unit 836 determines that the threshold presently stored in the determination threshold storing unit 833 is an appropriate value, then an encoded data output unit 837 outputs data encoded by the encoding unit 835.

Figure 33:
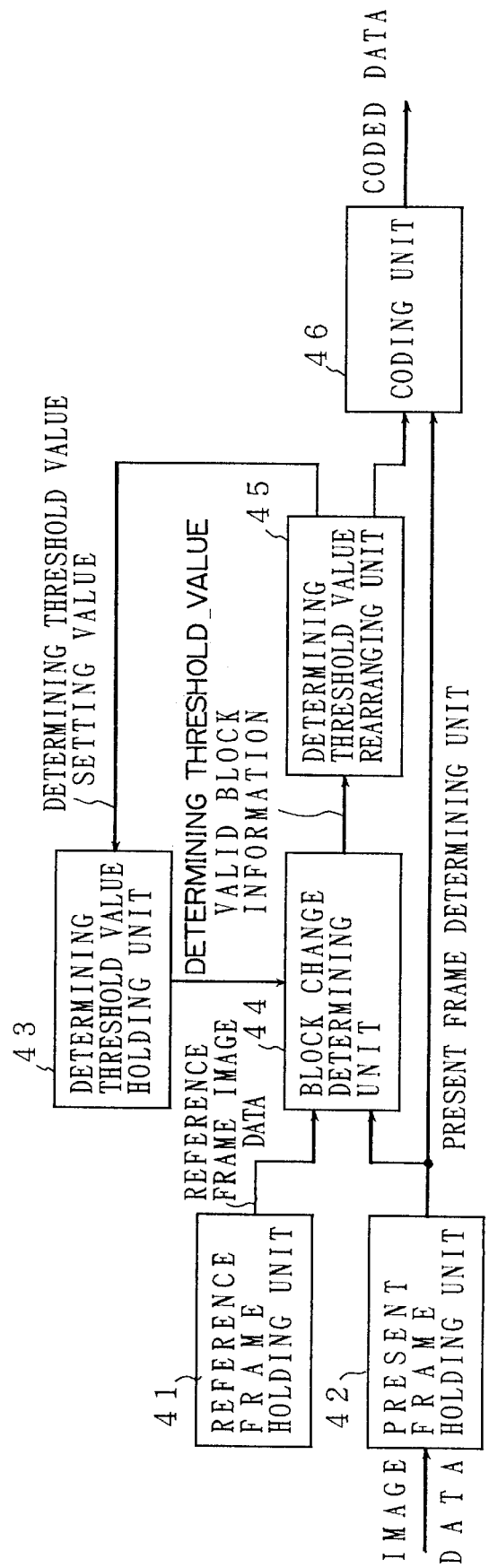
FIG. 33 shows a block diagram showing the configuration of the 12th image data encoding device.

FIG. 33 is the block diagram showing the configuration of the 12th image data encoding device. The device refers to an image data encoding device for encoding a series of image data, and comprises the following units.

A reference frame storing unit 841 stores image data in a reference frame.

A present frame storing unit 842 stores image data in the present frame (the latest frame whose data are to be encoded).

A determination threshold storing unit 843 stores a threshold used in determining the existence of a change in image in each block of the present frame located at the position corresponding to that in the reference frame.

A block change determining unit 844 obtains the variation of picture element value of a block located at a position corresponding to that of the reference frame stored in the reference frame storing unit 841, compares the variation with the threshold stored in the determination threshold storing unit 843, and determines the change in image in each of all blocks in the present frame from the image in the block located at the position corresponding to that in the reference frame.

A determination threshold reassigning unit 845 counts the number of valid blocks which are determined to have changes in image from a reference frame, or the number of invalid blocks which are determined to have no changes in image from the reference frame. Then the unit determines whether or not the threshold stored in the determination threshold storing unit 843 is an appropriate value according to the number of the valid blocks or the invalid blocks. If no, the unit sets the determination threshold storing unit 843 to a value different from the threshold.

An encoding unit 846 encodes data in the blocks in the present frame stored in the present frame storing unit 842 and determined to be valid by the determination threshold storing unit 843 if the determination threshold reassigning unit 845 determines that the threshold stored in the determination threshold storing unit 843 is an appropriate value.

According to the 11th and 12th image data encoding devices, each of the determination threshold reassigning units 836 and 845 determines whether or not a threshold presently stored in the determination threshold storing units 833 and 843 is an appropriate value according to the amount of data encoded by the encoding unit 835 (in the invention according to claim 12) or according to the number of blocks determined to be valid or invalid by the block change determining unit 844 (in the invention according to the claim 13). If no, the units repeatedly perform a process of reassigning another value to the determination threshold storing units 833 and 843 until it is determined that the threshold is an appropriate value. When the units determine that the threshold is an appropriate value, they output encoded data of images in the present frame.

Therefore, image data in each frame can be encoded to refer to an appropriate amount of codes according to the characteristics of images and a transmission rate of a transmission line.

Figure 34:
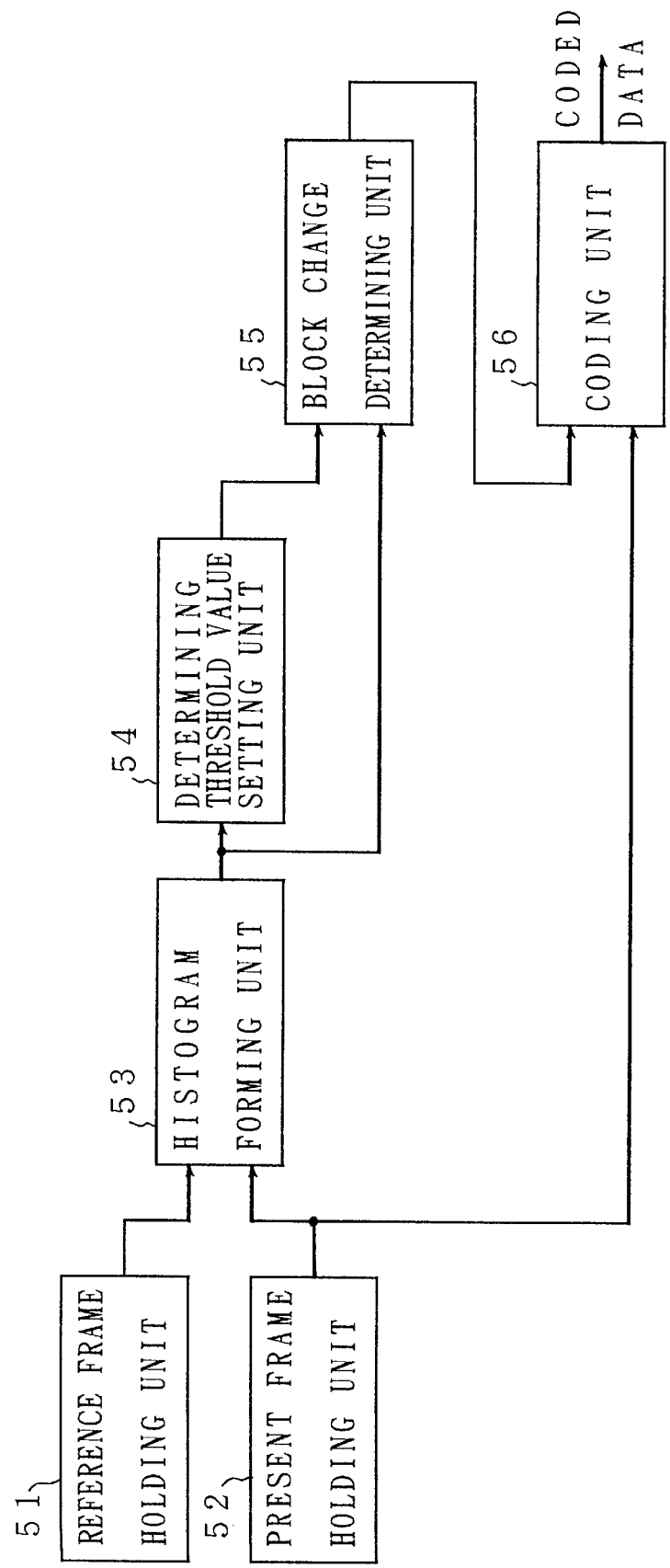
FIG. 34 shows a block diagram showing the configuration of the 13th image data encoding device.

FIG. 34 is the block diagram showing the configuration of the 13th image data encoding device. The device refers to an image data encoding device for encoding a series of image data, and comprises the following units.

A reference frame storing unit 851 stores image data in a reference frame.

A present frame storing unit 852 stores image data in the present frame (the latest frame whose data are to be encoded).

A histogram generating unit 853 obtains the variation of a predetermined picture element value used as a scale in detecting an image change in each block in the present frame against the block located at a position corresponding to the image-changed block according to the image data in the reference frame stored in the reference frame storing unit 851 and the image data in the present frame stored in the present frame storing unit 852, thereby generating a histogram for the variation in the entire present frame.

A determination threshold setting unit 854 sets a determination threshold used to determine the existence of a change in image in each block in the present frame against the block, located at a position corresponding to the image-changed block in the present block, in the reference frame according to the histogram generated by the histogram generating unit 853.

A block change determining unit 855 compares the variation of the predetermined picture element value in each block of the present frame generated by the histogram generating unit 853 with a determination threshold set by the determination threshold setting unit 854 so as to determine the existence of a changed image in all blocks in the present frame against the blocks, located at a position corresponding to an image-changed block in the present frame, in the reference frame.

An encoding unit 856 encodes data only in valid blocks determined by the block change determining unit 855 to have changed images in all blocks in the present frame.

The histogram generating unit 853 can also be designed to obtain the absolute value of the difference in a predetermined picture element value between picture elements in the present frame and the reference frame at the corresponding position in the corresponding block, obtain the maximum absolute value of the difference in each block in the present frame as the variation in a predetermined block, and to generate a histogram based on the variation.

According to the 13th image data encoding device, the histogram generating unit 853 obtains the variation of a predetermined picture element value used as a scale in detecting an image change in each block in the present frame against the block located at a position corresponding to the image-changed block according to the image data in the reference frame stored in the reference frame storing unit 851 and the image data in the present frame stored in the present frame storing unit 852, thereby generating a histogram for the variation in the entire present frame.

The determination threshold setting unit 854 sets a determination threshold used to determine the existence of a change in image in each block in the present frame against the block, located at a position corresponding to the image-changed block in the present block, in the reference frame according to the histogram generated by the histogram generating unit 853. The block change determining unit 855 compares the variation of the predetermined picture element value in each block of the present frame generated by the histogram generating unit 853 with a determination threshold set by the determination threshold setting unit 854 so as to determine the existence of a changed image in all blocks in the present frame against the blocks, located at a position corresponding to an image-changed block in the present frame, in the reference frame. The encoding unit 856 encodes data only in valid blocks determined by the block change determining unit 855 to have changed images in all blocks in the present frame.

Therefore, since a threshold can be set such that the number of valid blocks refers to a constant value based on the above described histogram, the optimum encoding process in which an appropriate amount of codes can be obtained for each frame depending on various conditions such as the information transmission speed of a transmission line, the number of transmitted frames, etc. can be performed.

Figure 35:
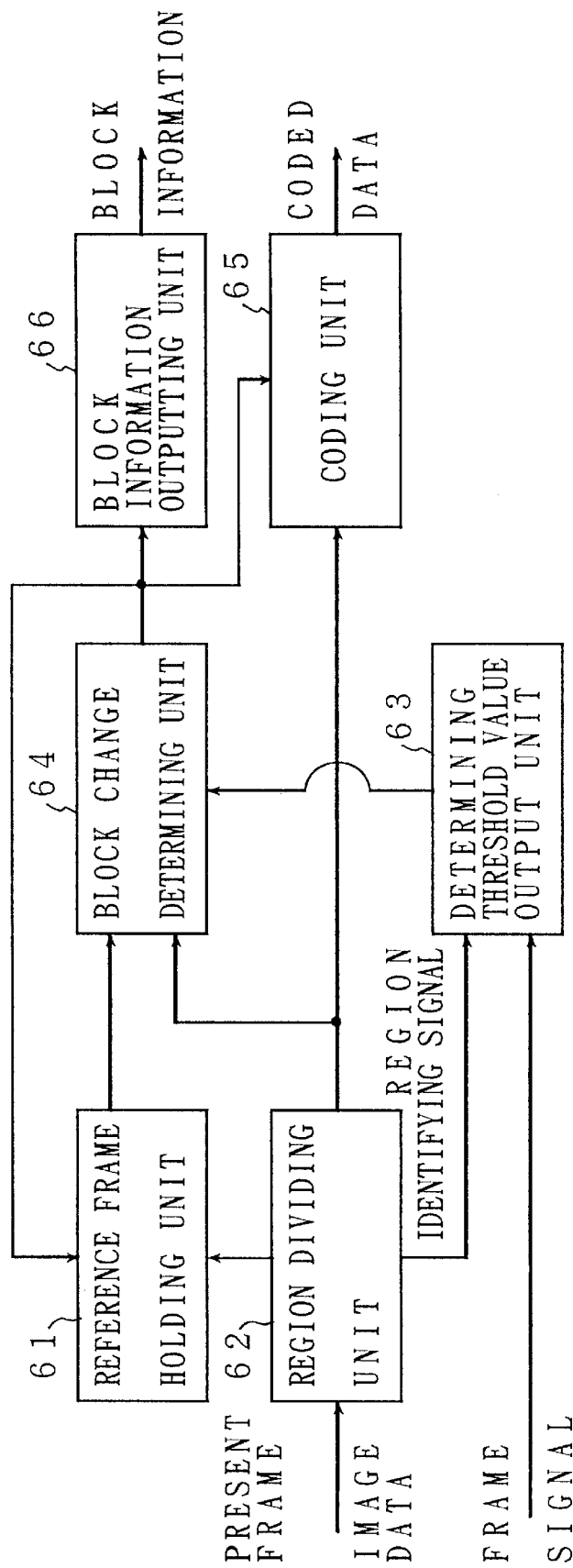
FIG. 35 shows a block diagram showing the configuration of the 14th image data encoding device.

FIG. 35 is the block diagram showing the configuration of the 14th image data encoding device. The device refers to an image data encoding device for encoding a series of image data, and comprises the following units.

A reference frame storing unit 861 stores image data in a reference frame.

An area dividing unit 862 divides image data in the present frame into a plurality of areas.

A determination threshold output unit 863 outputs individually a threshold used to detect the existence of a change in image in a plurality of blocks in each area habited by the area dividing unit 862 in the present frame against the block at the corresponding position in the reference frame.

A block change determining unit 864 obtains the variation of a predetermined picture element value for each block in each area obtained by the area dividing unit 862 in the present frame against the corresponding block in the reference frame stored in the reference frame storing unit 861, compares the variation with the threshold applied by the determination threshold output unit 863, and determines whether or not a change in image is detected between blocks in each area in the present frame and the corresponding blocks in the reference frame.

An encoding unit 865 encodes only valid blocks determined by the block change determining unit 864 to have changed images against the reference frame.

A block information output unit 866 outputs the determination result of the block change determining unit 864 as block information.

A reference frame storing unit 861 replaces a block in the reference frame located at the position corresponding to that of a valid block in the reference frame with the valid block.

Figure 36:
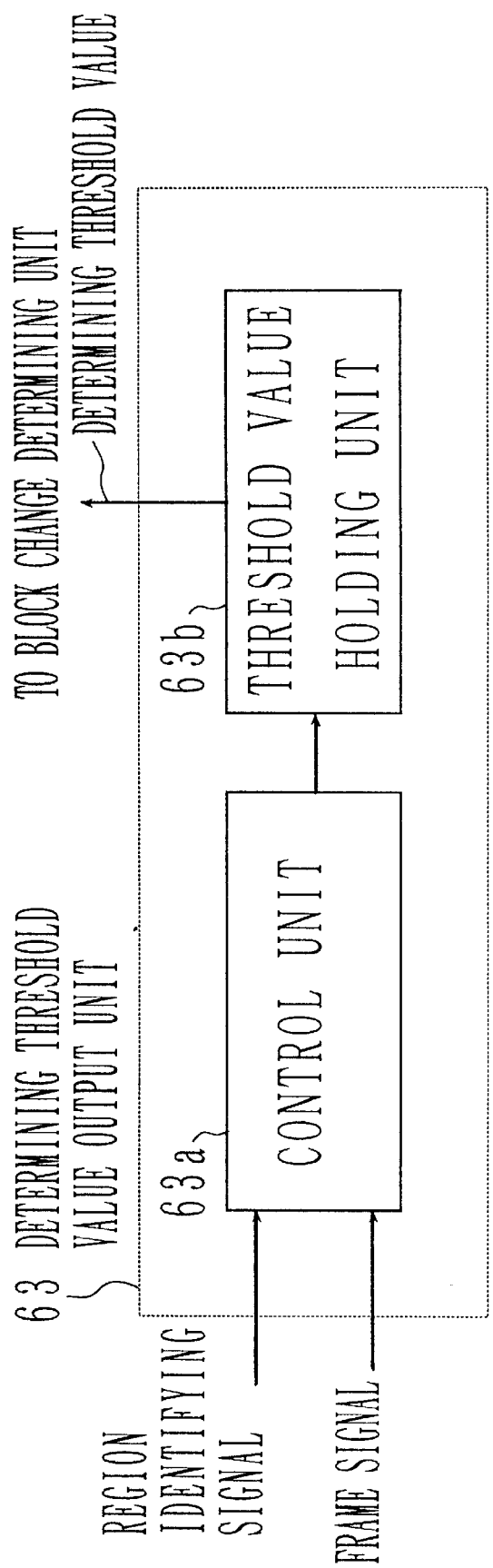
FIG. 36 shows a block diagram indicating an aspect of the determination threshold output unit in the 14th image data encoding device.

FIG. 36 is the block diagram indicating an aspect of the determination threshold output unit 863.

In FIG. 36, a threshold storing unit 863a is a memory for storing a plurality of thresholds.

A control unit 863b switches at predetermined intervals a threshold outputted by the threshold storing unit 863a to the block change determining unit 864 for each area in the present frame.

Figure 37:
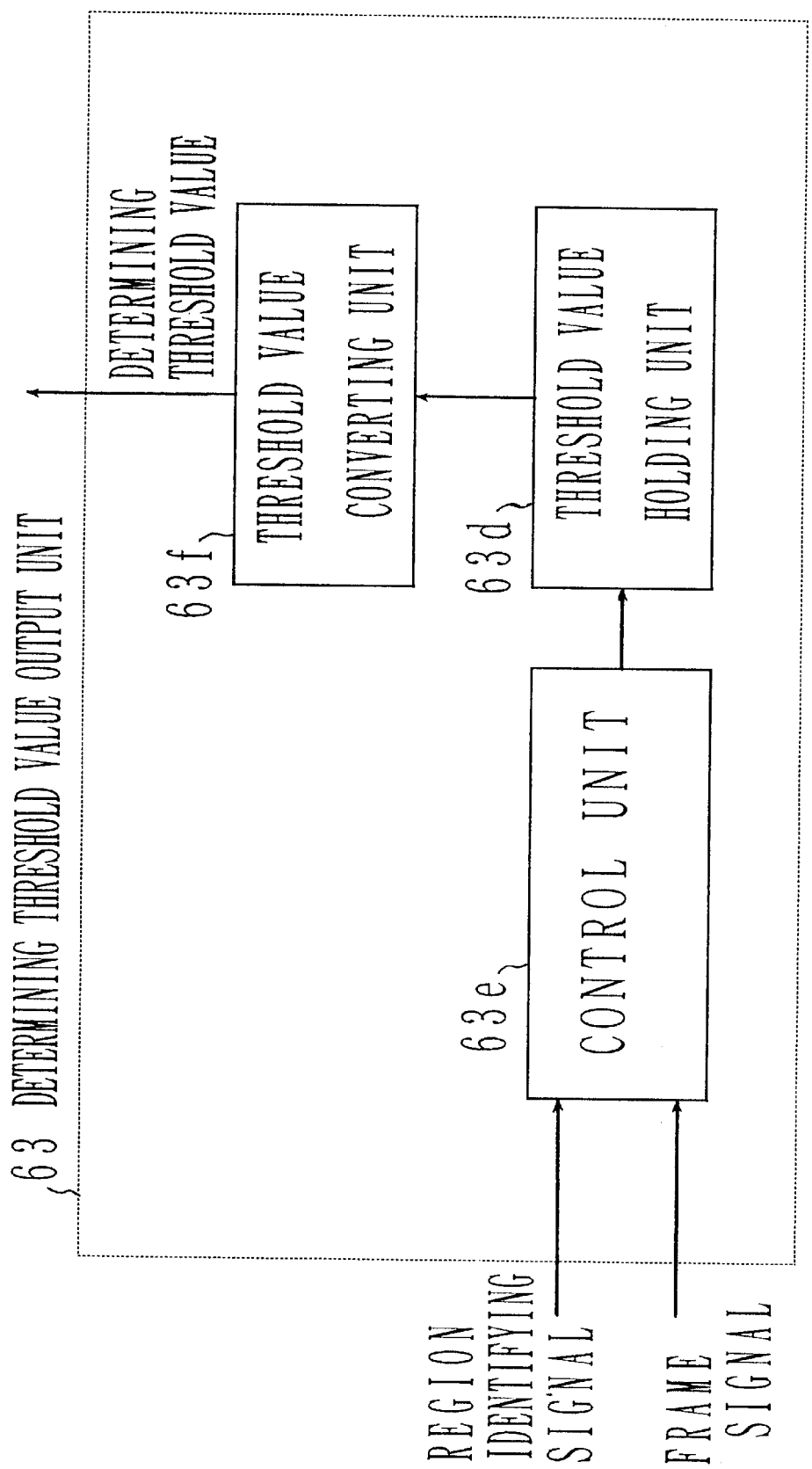
FIG. 37 shows a block diagram indicating another aspect of the above described determination threshold output unit in the 14th image data encoding device.

FIG. 37 is the block diagram indicating another aspect of the above described determination threshold output unit 863.

In FIG. 37, a threshold storing unit 863d is a memory for storing a plurality of thresholds for a plurality of areas in the present frame.

A control unit 863e outputs a threshold for each area in the present frame from the threshold storing unit 863d.

A threshold transforming unit 863f outputs a threshold for each area in the present frame from the threshold storing unit 863d to the block change determining unit 864 after modifying the threshold at a predetermined frame interval. The threshold modifying process is performed by, for example, an arithmetic operation.

According to the 14th image data encoding device, the area dividing unit 862 divides the image data in the present frame to a plurality of areas. Then, the block change determining unit 864 determines the change in image against the data in the corresponding block in the reference frame using a threshold for each area inputted by the determination threshold output unit 863 for each block in each area. According to the above described determination result, the encoding unit 865 encodes only valid blocks determined to have an image changed against the data in the reference frame. The block information output unit 866 outputs the above described determination result as block information. Furthermore, the reference frame storing unit 861 replaces a block in the reference frame with the valid block located at the corresponding position in the present frame.

Therefore, the determination threshold output unit 863 refreshes image data in each area in the reference frame and solves the image deterioration problem due to the above described error by modifying the threshold outputted for each area in the present frame at predetermined frame intervals. In the refreshing process, since only valid blocks are encoded, the increment of the amount of codes can be minimized.

Furthermore, a process of reducing an error in each area in the reference frame against the original image can be performed after dividing a frame into a plurality of frames and performed on them in a predetermined order. Thus, the error can be gradually reduced. That is, the entire areas are not simultaneously refreshed as in the conventional method, but the refreshing process can be performed in area units over a plurality of frames. Therefore, an unnatural image in which the image flashes during the refreshing process can be prevented.

That is, according to the determination threshold output unit 863 with the configuration shown in FIG. 36, the control unit 863b controls the correlation between a plurality of thresholds stored by the threshold storing unit 863 and each area in the present frame such that the correlation is changed at predetermined frame intervals. Therefore, a threshold outputted for each area in the present frame can be modified at predetermined frame intervals. For example, according to the determination threshold output unit 863 with the configuration shown in FIG. 37, the control unit 863e outputs a predetermined threshold to each area in the present frame from the threshold storing unit 863d, and the threshold transforming unit 863f outputs to the block change determining unit 864 a threshold outputted corresponding to each area after modifying it at predetermined frame intervals. Thus, a threshold outputted corresponding to each area in the present frame can be modified at predetermined frame intervals, thereby successfully obtaining the above described effect.

Figure 38:
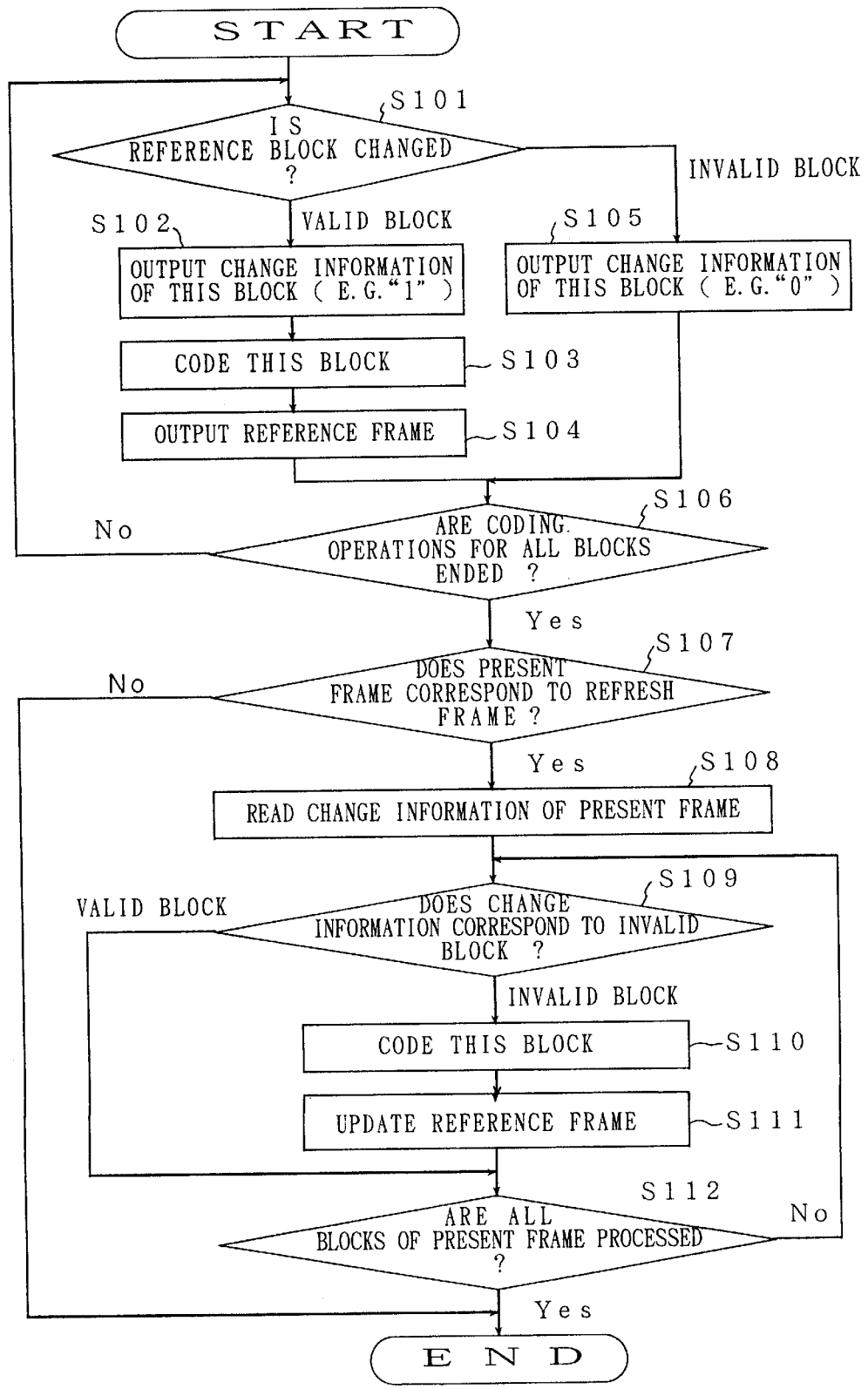
FIG. 38 shows a flowchart indicating the 6th image data encoding method as an embodiment of the present invention.

FIG. 38 is the flowchart indicating the 6th image data encoding method as an embodiment of the present invention.

According to this encoding method, as shown in FIG. 38, a picture element in the first block in a frame applied to and stored in an image buffer (hereinafter referred to as a present frame) is compared with that in the corresponding block in the reference frame so that the first block in the present frame is a valid block having a change in image against the present frame (S101).

A valid block determination can be made through each of the following methods (1), (2), and (3), etc.

(1) The sum of absolute values of differences between picture elements (gradation values, for example) in each block in the present frame and those in the corresponding block in the reference frame is obtained, and a block having a total value larger than a predetermined threshold is considered to be a valid or block. According to this method, a determination is made based on a total value. Thus, a change in an entire block can be checked.

(2) The above described absolute value of difference is obtained for each block in the present frame. If the maximum value in these absolute values of differences is larger than a predetermined threshold, the block is considered to be valid. Since only an absolute value of a difference must be detected in this method, the detecting process can be performed at a high speed with a relatively simple circuit.

(3) The sum of square numbers of differences between picture elements (gradation values, for example) in each block in the present frame and the corresponding block in the reference frame is obtained. If the sum is larger than a predetermined threshold, the block is considered to be valid. Since a block is determined according to the sum of square numbers of differences in picture elements in this method, the variation is emphasized. Therefore, a change in one block can be visually checked exactly.

If the first block is a valid block, change information indicating a valid block is written to a corresponding position in the block information storing unit ("1" for example) (S102).

Then, the image data in the first block are encoded through the ADCT, etc. (S103), and the data in the first block in the reference frame are updated to the contents of the first block in the present frame (S104).

If it is determined that the first block in the present frame is invalid, that is, has no change in image in the determining process in step S1, change information indicating an invalid block ("0", for example) is written in the corresponding position in the block information storing unit (S105).

Then, the processes in steps S1–S5 are repeated on all blocks in and after the 2nd block in the present frame, change information indicating a valid block or an invalid block is written in the block information storing unit for all blocks in the present frame, and the data in the reference frame are updated by rewriting the data in the blocks to the data in the corresponding block in the present frame if the corresponding blocks in the present frame are determined to be valid.

If it is determined that the processes in steps S101 through S105 have been performed for all blocks in the present frame ("Yes" in S106), then it is determined whether or not the present frame is a refresh frame (S107). If yes, the change information for all blocks in the present frame stored in the block information storing unit is sequentially read from the first block (S108), and it is determined whether or not each block is valid or invalid (S109). Then, the data in invalid blocks only are encoded as in the above described valid blocks (S110), and then the reference frame is updated by rewriting the data in the blocks to the contents of the blocks in the present frame if the corresponding blocks in the present frame are invalid (S111).

If it is determined that the processes in steps S109 through S111 have been performed ("Yes" in S112), then the image data encoding process is completed for the present frame.

Thus, first in the encoding method, image data in valid blocks are encoded, and then image data in invalid blocks are encoded if the present frame is a refresh frame. If blocks are encoded, the corresponding blocks in the reference frame are replaced with the encoded blocks in the present frame.

Therefore, in a normal frame other than a refresh frame, data in a valid block are encoded. Only when a frame is a refresh frame, all blocks are encoded in the order of valid blocks and invalid blocks.

Figure 39:
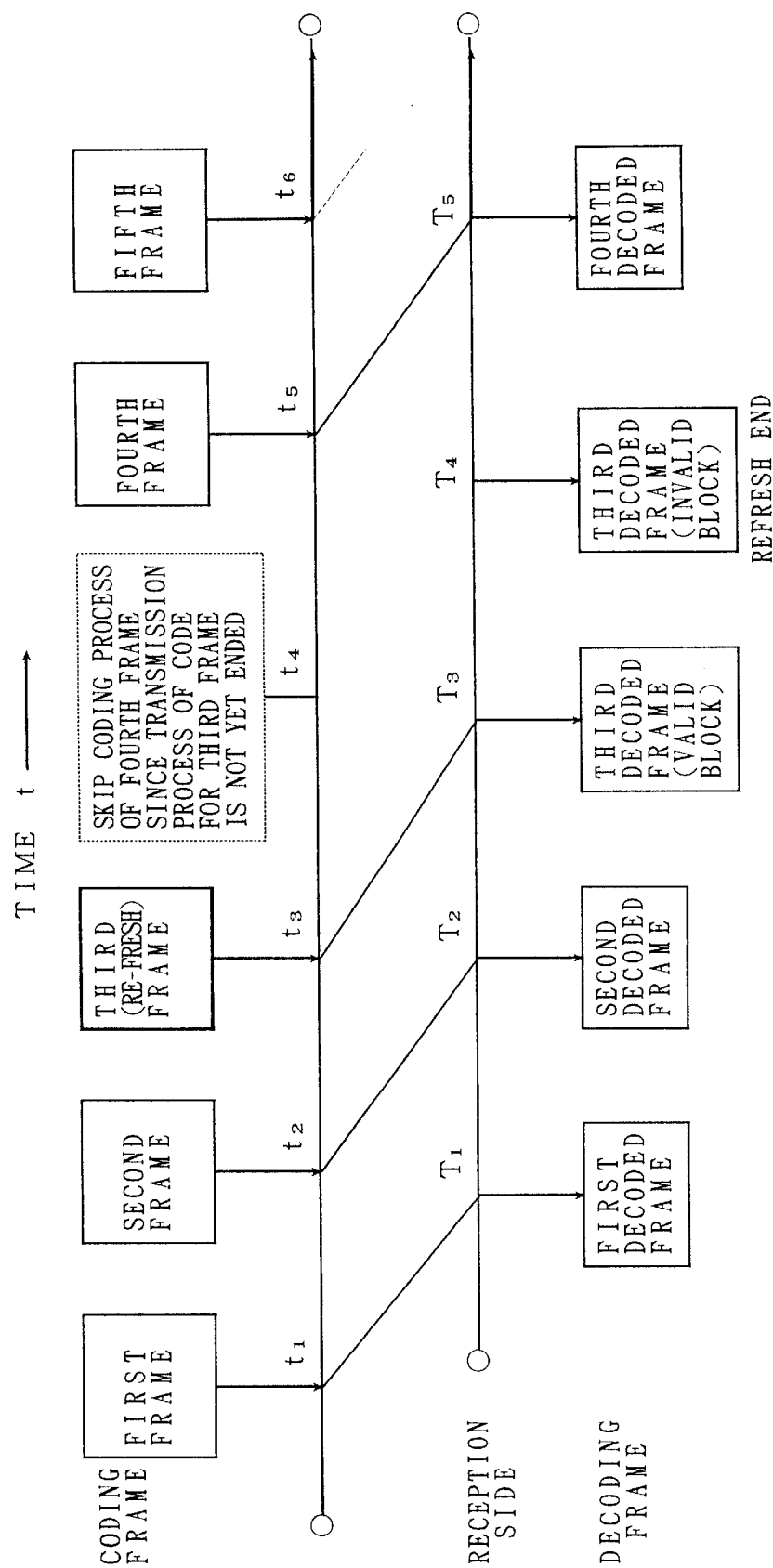
FIG. 39 shows an explanatory view of decoding reference frame when the 6th image data encoding method is used.

FIG. 39 shows the operation in time series of encoding data in a frame in a sending equipment and reconstructing an original image from transmitted encoded data in a receiving equipment when the moving image have been encoded in frame units by the above described image data encoding method and transmitted to the receiving equipment where the original image is reconstructed from the encoded data. FIG. 39 indicates the difference in a process of reconstructing an original image in a refresh frame in a reconstructing equipment between the conventional image data encoding method shown in FIG. 5 and the image data encoding method according to the 6th image data encoding method.

As shown in FIG. 5, when images are reconstructed by the conventional encoding method, an encoding time interval is not synchronized with reconstruction time intervals and the reconstruction of the 3rd frame is performed at time $T_4$, not at time $T_3$, if the codes in a refresh frame (the 3rd frame, start-of-encoding time $t_3$) are not transmitted by the start-of-encoding time $t_4$. Thus, the reconstruction results in an unnatural image displayed on the receiving equipment. On the other hand, since an image in a refresh frame (the 3rd frame) is reconstructed from encoded data only in valid blocks at time $T_3$ in a method according to the present embodiment, the above described synchronization between an encoding time interval and a reconstruction tome interval can be prevented, and the reconstructed image is not displayed unnaturally on the receiving equipment. Then, since an image in a refresh frame (the 3rd frame) is reconstructed completely from encoded data with invalid blocks included at the reconstruction time $T_4$ and the image in the refresh frame (the 3rd frame) is reconstructed from encoded data in valid blocks at the reconstruction time $T_3$, an operator feels that the receiving equipment is assigned the shortest possible wait time when the image in the refresh frame is reconstructed.

Furthermore, since a refresh frame containing a large amount of codes is encoded after being divided into valid blocks and invalid blocks, and the encoded data in valid blocks are transmitted prior to those in invalid blocks, the capacity of a code buffer both in the sending and receiving equipments can be reduced than the conventional method.

Figure 40:
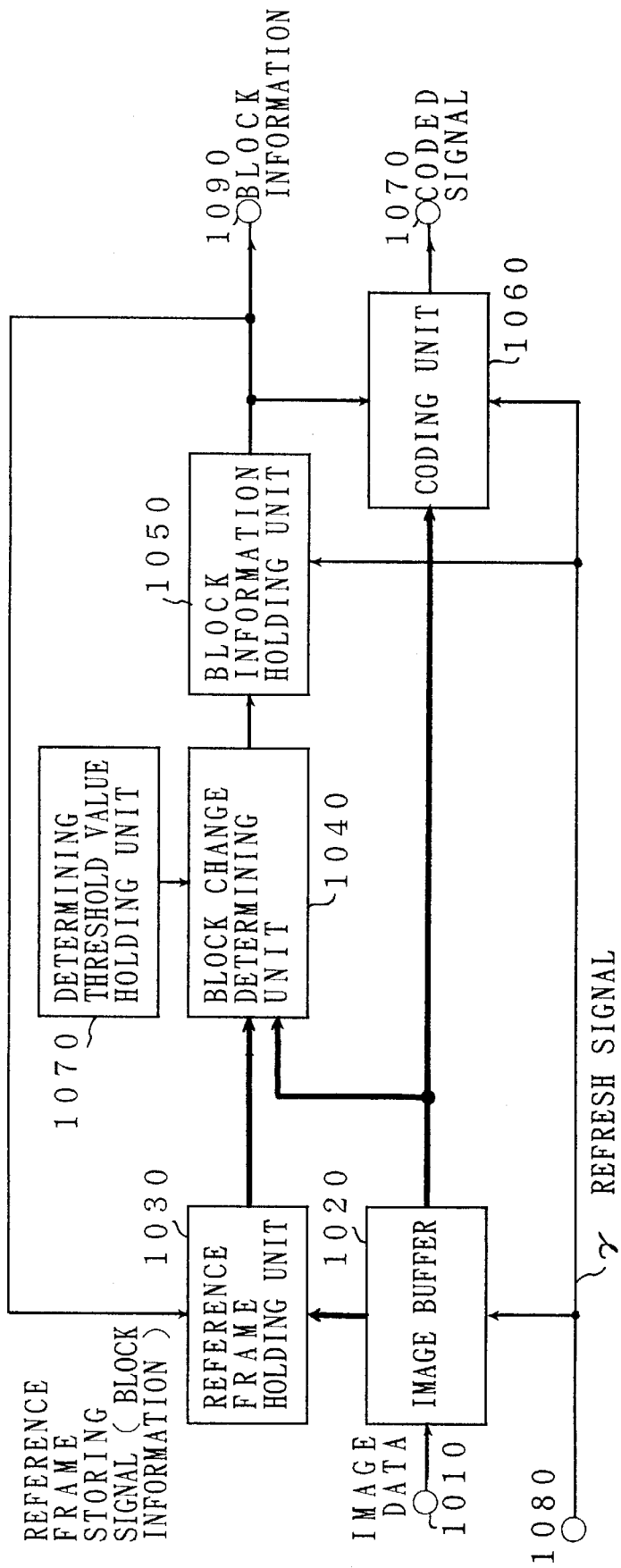
FIG. 40 shows a block diagram indicating the circuit configuration of the 15th image data encoding device for encoding image data according to the 6th image data encoding method.

FIG. 40 is the block diagram indicating the circuit configuration of the 15th image data encoding device for encoding image data according to the 6th image data encoding method.

An image buffer 1020 stores image data in one frame (present frame) applied through an input terminal 1010, and outputs the data in block (8×8 picture elements, for example) units in a predetermined order to a block change determining unit 1040 and an encoding unit 1060.

A reference frame storing unit 1030 is a memory for storing image data in a reference frame which are compared with the image data in the present frame stored in the image buffer 1020. The contents of the reference frame storing unit 1030 are sequentially rewritten according to block information in each block in the latest frame (present frame) applied from a block information storing unit 1050, and are used as image data in the reference frame.

The block change determining unit 1040 compares the image data in each block transmitted from the image buffer 1020 with the data in the corresponding block in the reference frame stored in the reference frame storing unit 1030, obtains (1) the sum of absolute values of the differences in picture element values, (2) the maximum absolute value of differences in image or picture element values, or (3) the sum of average square numbers of differences in image or picture element values, compares one of the values with a threshold stored in a determination threshold storing unit 1070, and determines whether each block in the present frame is valid (the above described value is equal to or larger than the threshold) or invalid (the above described value is smaller than the threshold).

The block information storing unit 1050 stores block information (indicating that the present block is valid or invalid) of each block in the present frame written by the block change determining unit 1040, and the block information is outputted to an encoding unit 1060, the reference frame storing unit 1030, and an output terminal 1090.

The reference frame storing unit 1030 receives from the image buffer 1020 a valid block having the block information indicating a valid block, and replaces the corresponding block in the reference frame with the valid block.

The encoding unit 1060 refers to the block information of each block stored in the block information storing unit 1050 when the data of each block of image data in the present frame are sent from the image buffer 1020 in a predetermined order. If a refresh signal r described later is not received, data in the blocks indicated as "valid" by the block information are encoded to variable-length data, and the encoded data are outputted from the output terminal 1070.

A refresh signal r indicates that the present frame stored in the present image buffer 1020 is a refresh frame, and is applied externally from a control unit not shown in FIG. 40 through an input terminal 1080. The refresh signal r is applied to the image buffer 1020, the block information storing unit 1050, and the encoding unit 1060.

On receiving the refresh signal r, the image buffer 1020 repeats two times the operation of outputting image data in all blocks in the present frame to the encoding unit 1060 sequentially from the first block. The block information storing unit 1050 also repeats two times the operation of outputting image data in all blocks in the present frame to the encoding unit 1060 sequentially from the first block synchronously with the above described operation.

On receiving a refresh signal r, the encoding unit 1060 first encodes only the blocks identified as valid blocks according to the block information, and second encodes the block identified as invalid blocks according to the block information. Therefore, the encoding unit 1060 divides a refresh frame into valid block data and invalid block data, and encodes and outputs them in this order.

Figure 41:
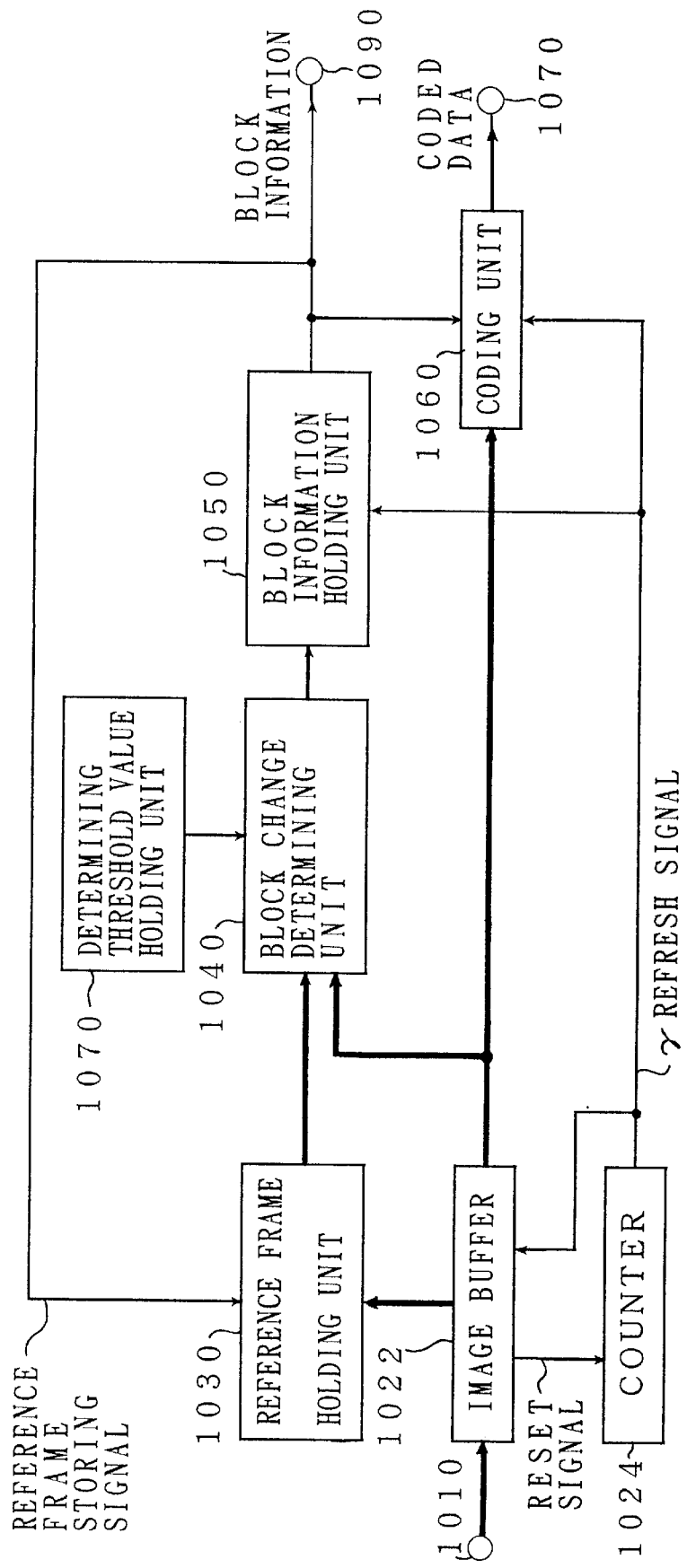
FIG. 41 shows a block diagram indicating the circuit configuration of the 16th image data encoding device for encoding image data according to the encoding method indicated in the flowchart.

FIG. 41 is the block diagram indicating the circuit configuration of the 16th image data encoding device for encoding image data according to the encoding method indicated in the flowchart shown in FIG. 38.

In FIG. 41, a circuit block also shown in FIG. 40 as a function of the image data encoding device is assigned the same name and number with the detailed explanation omitted here.

The 15th image data encoding device shown in FIG. 40 is externally provided with a refresh signal r, while the 16th image data encoding device shown in FIG. 41 is internally provided with a counter 1024 for generating a refresh signal at predetermined frame interval.

The counter is an up-counter for counting the number of frames at predetermined time intervals, for example, and outputs a refresh signal r to the image buffer 1022, the block information storing unit 1050, and the encoding unit 1060 when a counter value has reached a predetermined value, that is, at predetermined frame intervals.

On receiving a refresh signal r, the image buffer 1022, the block information storing unit 1050, and the encoding unit 1060 encode image data in the present frame as described above in the order of valid blocks first and then invalid blocks.

The image buffer 1022 stores image data in one frame which are applied through the input terminal 1010, and outputs a reset signal R to the counter 1024 at a predetermined timing (for example, after the process of encoding the image in the refresh frame has been performed) when it receives a refresh signal r from the counter 1024.

The counter 1024 is reset to a predetermined initial value (0, for example) on receiving a reset signal R.

Figure 42:
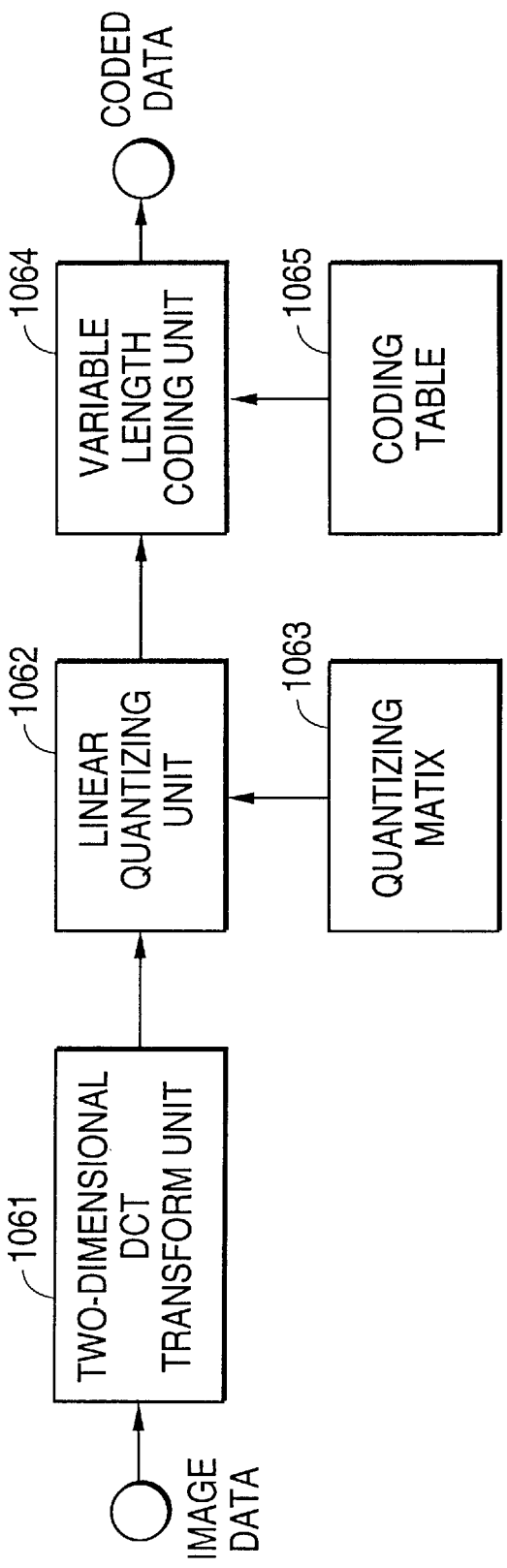
FIG. 42 shows an example of a configuration of the encoding unit in the 15th and 16th image data encoding device.

FIG. 42 shows an example of a configuration of the encoding unit 1060. The encoding unit 1060 shown in FIG. 42 comprises a two-dimensional DCT unit 1061, a linear quantizing unit 1062, a quantization matrix (quantization threshold) 1063, and an encoding table 1065. The configuration of the unit is similar to that of the conventional static image encoding device shown in FIG. 1. That is, it is different from the conventional device in that it does not contain the block buffer 12. The encoding table 1065 is used so that the variable-length encoding unit 1064 can efficiently encode the combination of a run length and a quantized coefficient outputted in block units from the linear quantizing unit 1062. For example, it is a table used in an entropy encoding method such as a Huffman code table, arithmetic operation code table, etc.

Thus, according to the present embodiment, a refresh frame is divided into valid blocks and invalid blocks, and the data in the valid blocks are first encoded and transmitted, and then the data in the invalid blocks are encoded and transmitted. Therefore, a reconstructing equipment (a receiving equipment) can reconstruct original images from refresh frames through a sort of hierarchical reconstruction. Therefore, an operator for the reconstructing equipment feels that his or her wait time is not very long in successfully reconstructing an original image.

Thus, the capacity of the code buffer for temporarily storing encoded data of images in frames both in encoding reconstructing equipments by encoding the data in refresh frames after dividing them into two block groups.

When images are refreshed, that is, when data in a refresh frame are encoded, a reference image stored in the reference frame 1030 should be replaced with the data in the refresh frame. In this case, the image data in all blocks in one frame stored in the reference frame 1030 should be updated to the above described image data in the refresh frame.

The following embodiment updates at a high speed the reference frame when the refreshing process is performed.

Figure 43:
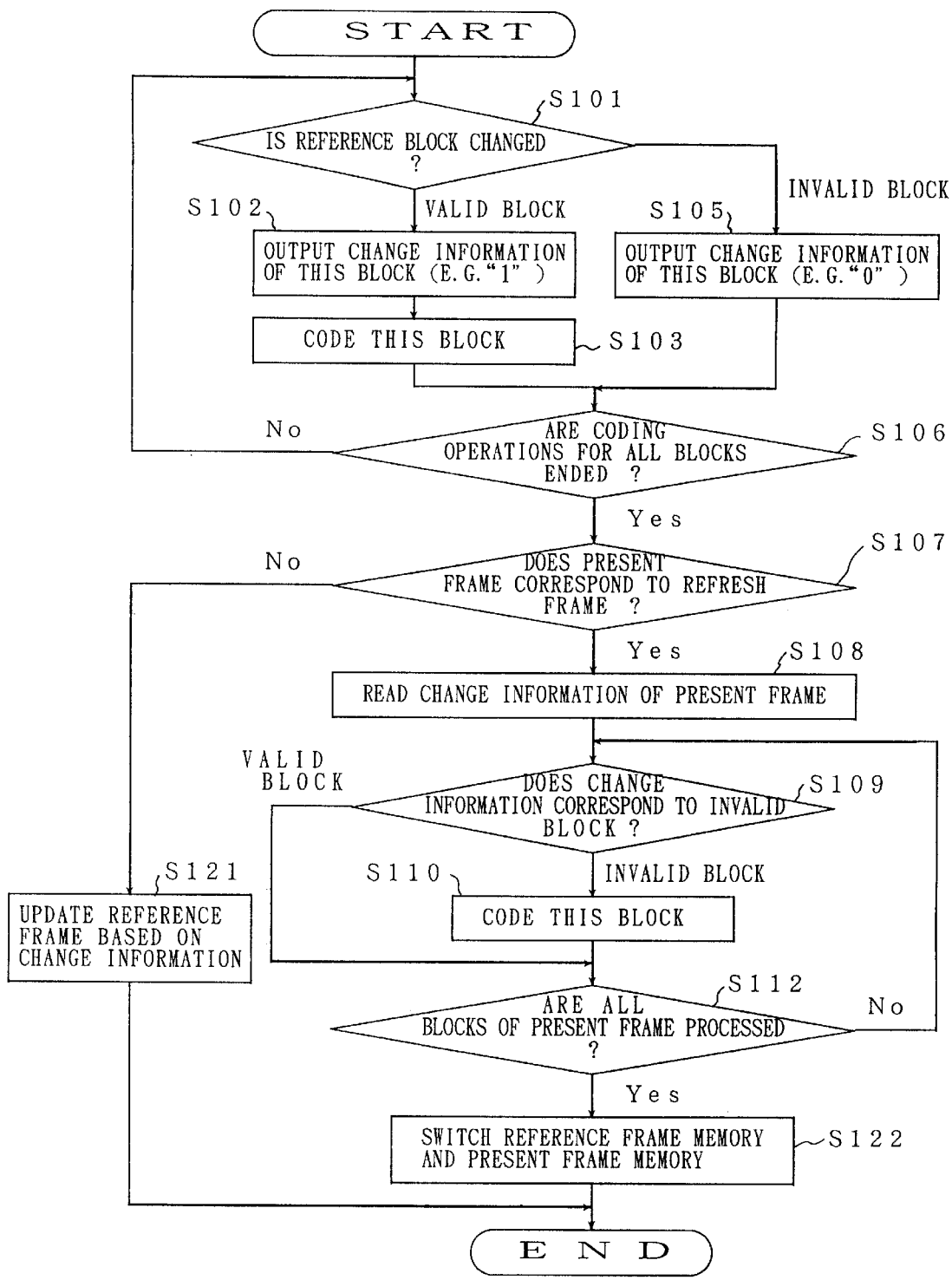
FIG. 43 shows a flowchart indicating the 7th image data encoding method.

FIG. 43 is the flowchart indicating the 7th image data encoding method.

A function also shown in FIG. 38 as that of the 6th image data encoding method is assigned the same symbol (step number).

In this embodiment, it is first determined as in the above described 6th image data encoding method whether blocks in the present frame are valid or invalid, and change information (block information) indicating whether blocks are valid or invalid is stored (S101–S103, S105 and S106). That is, up to this point, the data in the reference frame have not been updated.

Next, it is determined whether or not the present frame is a refresh frame (S107). If no ("No" in S107), valid blocks in the present frame replace the corresponding blocks in the reference frame according to the change information stored as described above, thereby updating the reference frame (S121).

If it is determined that the present frame is a refresh frame in step S107 ("Yes" n S107), then it is determined whether the blocks are valid or invalid according to the stored change information (S109), and the data in the invalid block are encoded (S110). When the process has been performed on all blocks ("Yes" in S112), then the frame memory for storing image data in the reference frame (reference frame memory) is replaced with the present frame memory for storing image data in the present frame, while the present frame memory is replaced with the reference frame memory for storing image data in the reference frame (S122).

Therefore, the image data applied next are applied to and stored in the frame memory hitherto used as a reference frame memory, and compared with the image data in the refresh frame stored in the frame memory hitherto used as the present frame memory. That is, according to the process in step S122, a process of updating a reference frame to be performed in a refreshing process can be instantaneously performed without any trouble.

Thus, in the 7th image data encoding method, since the functions of the reference frame memory and the present frame memory are switched to each other each time a refreshing process is performed, it is not necessary to rewrite the image data in all blocks in the reference frame to those in the present frame. Therefore, the reference frame memory can be updated instantaneously in a refreshing process.

Figure 44:
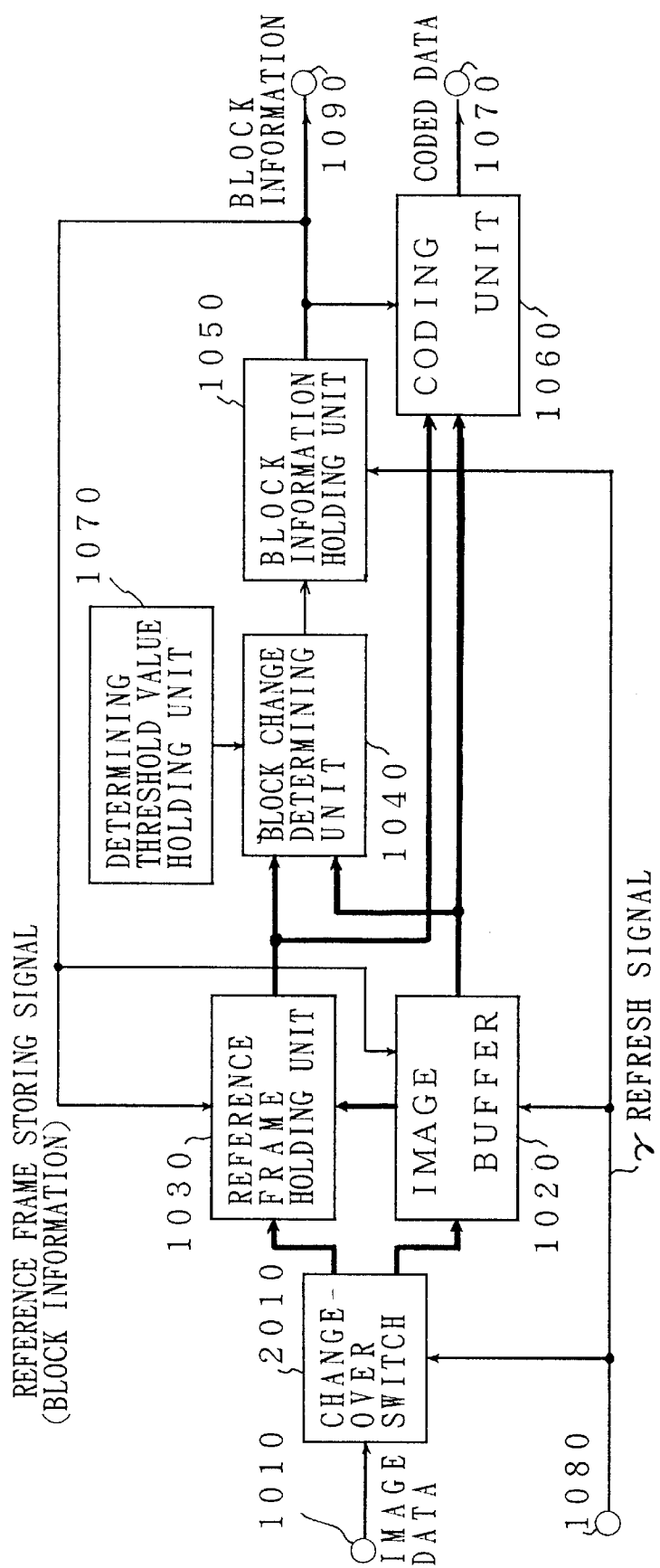
FIG. 44 shows a circuit configuration of the 17th image data encoding device for encoding image data according to the encoding method indicated in the flowchart.

FIG. 44 shows the circuit configuration of the 17th image data encoding device for encoding image data according to the encoding method indicated in the flowchart shown in FIG. 43.

In FIG. 44, a circuit block also shown in FIG. 40 as a function of the 15th image data encoding device is assigned the same name and number with the detailed explanation omitted here.

The image data encoding device shown in FIG. 44 is realized by providing the device shown in FIG. 40 with a switch 2010 for switching the reference frame storing unit 1030 and the image buffer (present memory) 1020 alternately in a refreshing process.

The switch 2010 receives a refresh signal r from an external control unit through the input terminal 1080. Each time the refresh signal r is applied, the switch 2010 switches the destination of image data in one frame (input frame) applied through the input terminal 1010 alternately to the image buffer 1020 and the reference frame storing unit 1030 after the above described refreshing process has been performed (after encoding the data in all blocks in the input frame). As a result, each time a refresh signal r is applied, the image buffer 1020 and the reference frame storing unit 1030 exchange their functions after a refreshing process has been performed.

Since the reference frame storing unit 1030 as being switched to an image buffer or the image buffer 1020 stores the image data in the present frame at present, the above described switching operation by the switch 2010 can update the images in the reference frame instantaneously in a refreshing process without transferring (copying) from the image buffer to the reference frame storing unit the data in all blocks in the latest frame to be stored in the reference frame storing unit according to a conventional method.

The level of the variation in moving between adjacent frames depends on the type of image. Therefore, if a threshold (hereinafter referred to as a determination threshold) used for valid blocks and appropriate to a mobile image is applied to a static image, then the value is too large for the image to be successfully detected as valid blocks although each of them affects the quality of the whole reconstructed image. On the other hand, if a determination threshold used to recognize static blocks as valid blocks, that is, appropriate to a static image, is applied to a mobile image, then the number of valid blocks becomes too large and the total amount of codes increases greatly.

The following embodiment has been developed to solve the above described problem.

Figure 45:
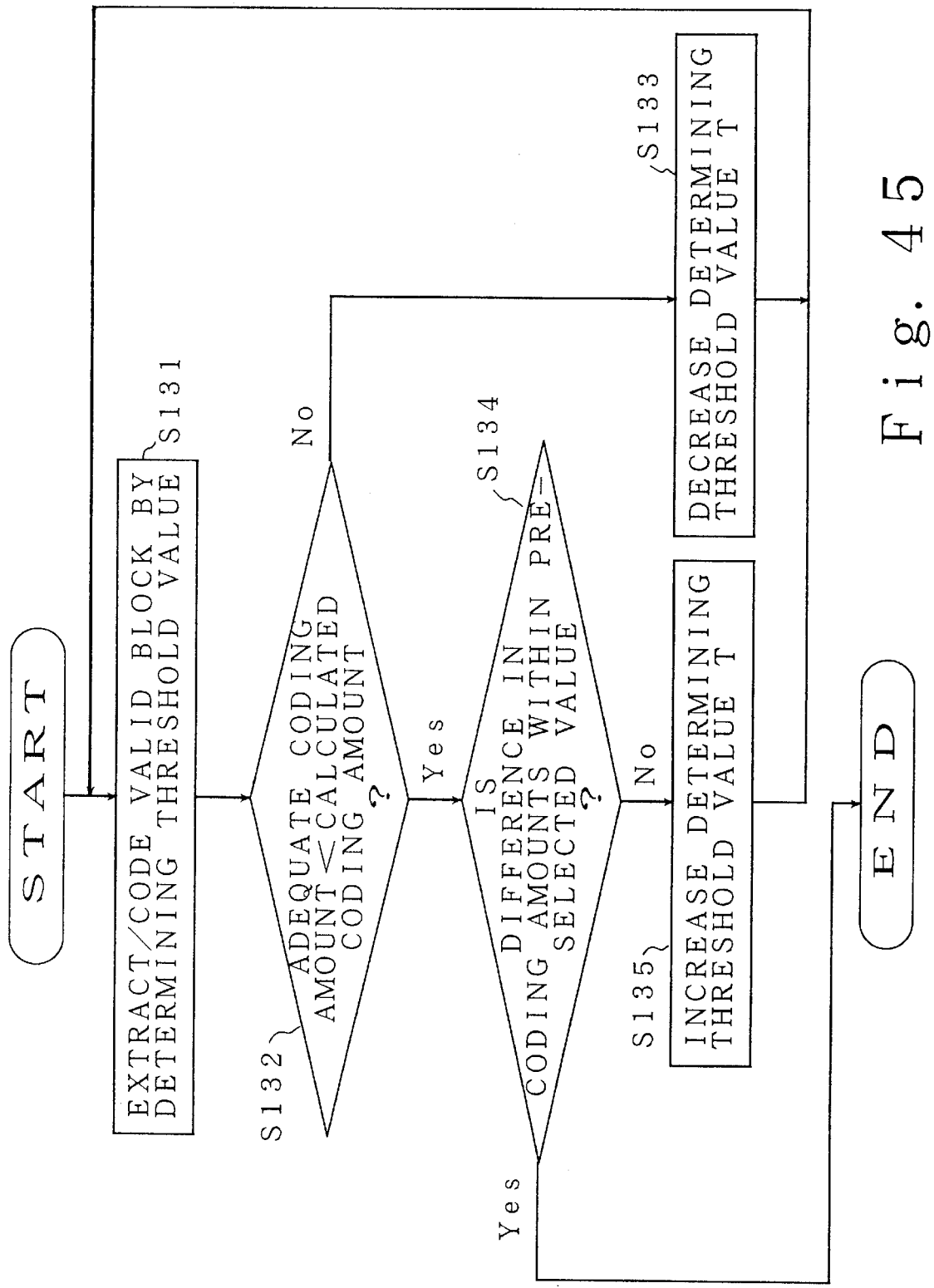
FIG. 45 shows a flowchart indicating the important operation of the 8th image data encoding method according to the embodiment.

First, FIG. 45 is the flowchart indicating the important operation of the 8th image data encoding method according to the embodiment.

First, any of (1) the sum of absolute values of the differences in image or picture element values, (2) the maximum absolute value of differences in image or picture element values, and (3) the sum of average square numbers of differences in image or picture element values is obtained for all block in a frame. Then, it is determined whether or not any of them is equal to or larger than a determination threshold T, all valid blocks having any of the above described values equal to or larger than the determination threshold are extracted, and the valid blocks are encoded (S131).

Then, if the amount of codes obtained by the above described encoding process (sum of the amount of codes in all valid blocks) is calculated, the obtained amount of codes is compared with a predetermined appropriate amount of codes (S132), and the obtained amount of codes is smaller than the appropriate amount of codes ("No" in S132), then the above described determination threshold is reduced (S133), and control is returned to the process in step S131.

If the calculated amount of codes is larger than the appropriate amount of codes ("Yes" in S132), then it is determined whether or not the difference between the amount values is smaller than a predetermined value (S134). If it is larger ("No" in S134), then the value of the determination threshold T is raised (S135), and control is returned to the process in step S132. On the other hand, if the difference between the amount values is smaller than a predetermined value ("Yes" in S134), then the determination threshold T is not changed.

Thus, the determination threshold T is changed until the sum of the amount of codes in valid blocks (calculated amount of codes) is equal to or larger than the appropriate amount of codes and the difference is smaller than a predetermined value. Then, the modification of the determination threshold T is stopped when the sum of the amount of codes in valid blocks has reached an appropriate value, thereby terminating a process of encoding valid blocks (method I).

In the above described method, a determination threshold T is reset according to the amount of codes obtained in an encoding process. Since the amount of codes varies in proportion to the number of encoded blocks, that is, the number of valid blocks, the number of valid blocks can be counted without performing an encoding process, and the determination threshold T can be modified until the amount of codes becomes equal to the appropriate value according to the number of valid blocks obtained by the above counting operation (method II). In this method II, since the determination threshold T can be set at a speed higher than method I, and the encoding process must be performed only once, the process of encoding the present frame can be completed at a speed higher than method I.

Furthermore, adjacent frames indicate very similar images in processing moving. Therefore, a determination threshold T can be a value used in encoding image data in the preceding frame, and can be modified (set) after the encoding process, thereby speeding up the encoding process (method III).

In the above described three methods, the determination threshold T is set each time the data in each frame are encoded. However, since the variation between frames is almost constant in a series of moving images (since images in a series of frames are similar), the determination threshold (T) setting process by each of the above described methods is performed on the first n frames (n=1, 2, 3, ... ), and the encoding process on the n-th and the following frames (the (n+1)th frame) is performed using the determination threshold T determined in any of the preceding frames so that the time taken for encoding the data in the (n+1) and the following frames can be shortened.

Figure 46:
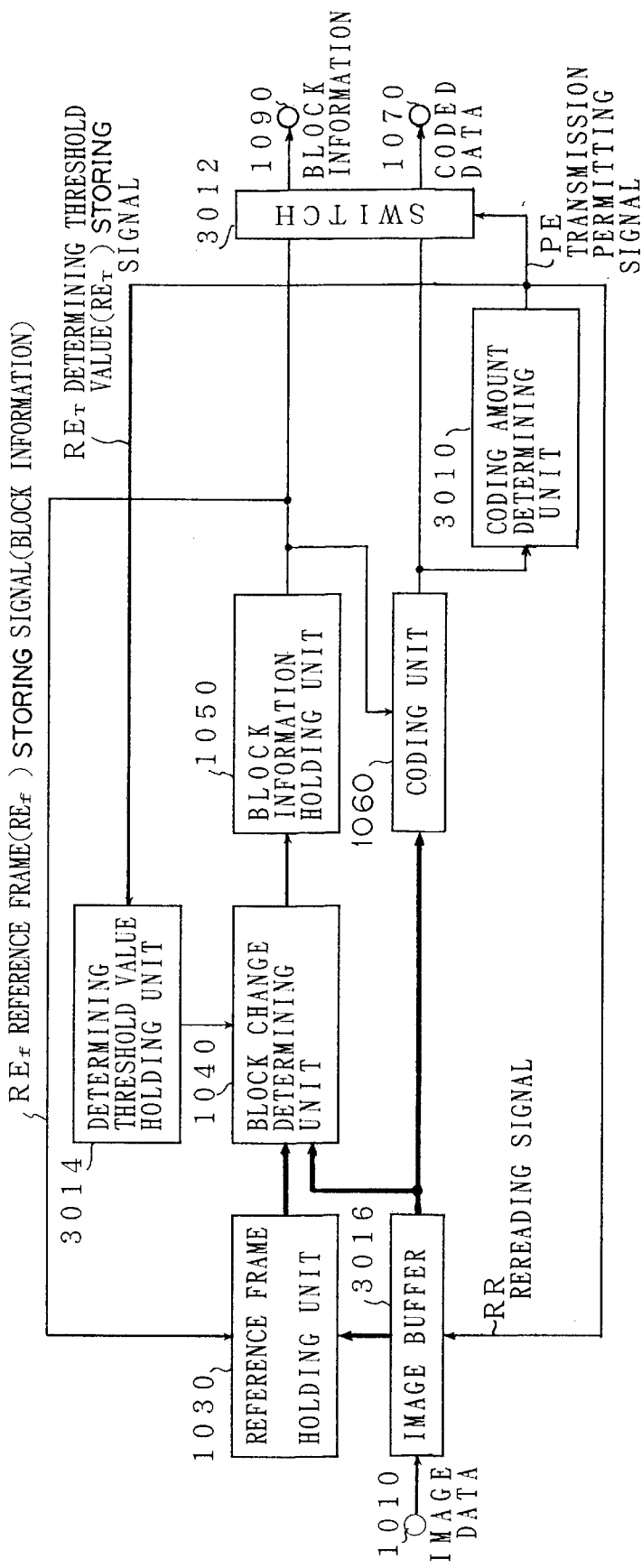
FIG. 46 shows a block diagram showing the main part of the circuit of the 18th image data encoding device.

FIG. 46 is the block diagram showing the circuit of the 18th image data encoding device for encoding image data in a frame after flexibly setting a determination threshold T by the above described method I so that the amount of codes is appropriate.

In FIG. 46, a circuit block also shown in FIG. 40 as a function of the 15th image data encoding device is assigned the same name and number with the detailed explanation omitted here.

The encoding unit 1060 sequentially reads from the block information storing unit 1040 the block information in each block in the present frame in a predetermined order, and encodes the data in valid blocks only. Then, on having encoded the data in one frame, the encoding unit 1060 transfers the encoded data in one frame to a code amount determining unit 3010.

The code amount determining unit 3010 determines whether or not the transferred amount of codes in the present frame is appropriate. If yes, the unit sends a send enable signal PE to a switch 3012.

On receiving the send enable signal PE, the switch 3012 externally outputs from the output terminals 1070 and 1090 respectively the encoded data in the present frame stored in the encoding unit 1060 and the block information on all blocks in the present frame stored in the block information storing unit 1050.

If the code amount determining unit 1060 determines that the amount of codes in the present frame does not refer to an appropriate value, it sends a determination threshold rewrite signal $RE_T$ to a determination threshold storing unit 3014, and sends a re-read signal RR to an image buffer 3016.

The determination threshold storing unit 3014 modifies a determination threshold T according to the instruction transmitted as a determination threshold rewrite signal $RE_T$ (instruction to raise or reduce the determination threshold T).

The block change determining unit 1040 generates using the modified determination threshold T the block information as to whether each image data block in the present frame transmitted again from the image buffer 3016 is valid or invalid, and transfers the block information to the block information storing unit 1050.

Then, the encoding unit 1060 encodes according to the newly obtained block information only valid blocks in the image data in the present frame transmitted again from the image buffer 3016, and outputs the obtained encoded data of the image data in the present frame to the code amount determining unit 3010.

The code amount determining unit 3010 determines whether or not the amount of the transmitted encoded data is appropriate.

Thus, the determination threshold storing unit 3014 modifies the determination threshold T until the code amount determining unit 3010 determines that the amount of codes is appropriate. Then, the code amount determining unit 3010 sends a send enable signal PE to the switch 3012 when the amount of codes of image data in the present frame is appropriate according to the modified determination threshold T. Thus, the encoded data of the image data in the present frame and the block information on each block in the present frame are externally outputted to the terminals 1070 and 1090 through the switch 3012.

The image data in each frame are thus encoded such that the amount of codes constantly is appropriate, and the encoded data and the block information on all blocks are outputted. Therefore, even if a reconstructing equipment for reconstructing original images from the encoded data receives encoded data relating to only valid or blocks according to the block information, the corresponding blocks to the valid blocks can be correctly updated.

Figure 47:
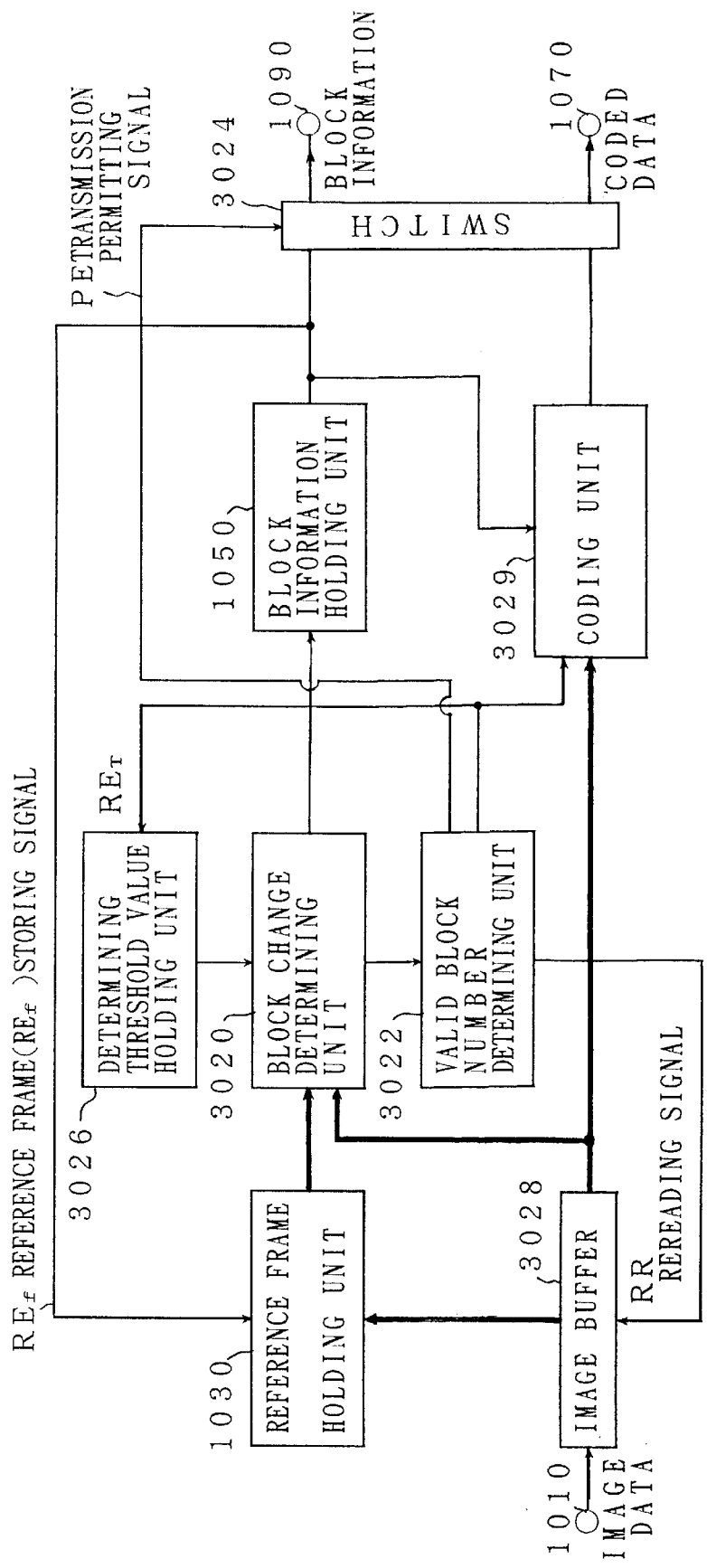
FIG. 47 shows a configuration of the 19th image data encoding device for encoding image data in each frame according to the above described method II.

FIG. 47 shows the configuration of the 19th image data encoding device for encoding image data in each frame according to the above described method II.

In FIG. 47, a circuit block also shown in FIG. 40 as a function of the 15th image data encoding device is assigned the same name and number.

In this device, a block change determining unit 3020 transmits block information indicating whether each block in the present frame is valid or invalid to a number-of-valid-blocks determining unit 3022 as well as to the block information storing unit 1050.

The number-of-valid-blocks determining unit 3022 counts the number of valid blocks through a built-in counter, etc., and determines whether or not the number of valid blocks in the present frame is appropriate. If the number of valid blocks is appropriate, the number-or-valid-blocks determining unit 3022 sends a send enable signal PE to a switch 3024 and issues an encode instruction to an encoding unit 3029. On receiving the instruction, the encoding unit 3029 refers to the block information stored in the block information storing unit 1050, and encodes image data only in the valid blocks in the present frame.

On receiving the signal PE after the encoding unit 1060 has completed its encoding process, the switch 3024 externally outputs from the terminals 1070 and 1090 respectively the encoded data of image data in the valid block in the present frame stored in the encoding unit 3029, and the block information on each block in the present frame stored in the block information storing unit 1050.

When the number-or-valid-blocks determining unit 3022 determines that the number of valid blocks in the present frame obtained using the present determination threshold T does not refer to an appropriate value, it sends a determination threshold rewrite signal $RE_T$ instructing the determination threshold storing unit 3026 to rewrite the determination threshold T, and sends a re-read signal RR to an image buffer 3028.

The determination threshold storing unit 3026 modifies the determination threshold T according to the determination threshold rewrite signal $RE_T$ transmitted from the number-of-valid-blocks determining unit 3022 (instructing to raise or reduce the determination threshold T).

The block change determining unit 3020 generates according to the modified determination threshold T block information indicating whether each block of image data in the present frame transmitted from the image buffer 3028 is valid or invalid.

Then, the above described operation is repeated until the number-of-valid-blocks determining unit 3022 determines that the number of the valid blocks in the present frame is appropriate. If the determination threshold storing unit 3026 sets an appropriate determination threshold T to the image data in the present frame, and the number of the valid blocks in the present frame is appropriate, then the encoded data of the valid blocks in the present frame encoded by the encoding unit 1060 and the block information on all blocks in the present frame are externally outputted from the terminals 1070 and 1090 respectively through the switch 3024.

Thus, The image data in each frame are thus encoded such that the amount of codes constantly is appropriate, and the encoded data and the block information on all blocks are outputted. Therefore, even if a reconstructing equipment for reconstructing original images from the encoded data receives encoded data relating to only valid blocks according to the block information, the corresponding blocks to the valid blocks can be correctly updated.

Figure 48:
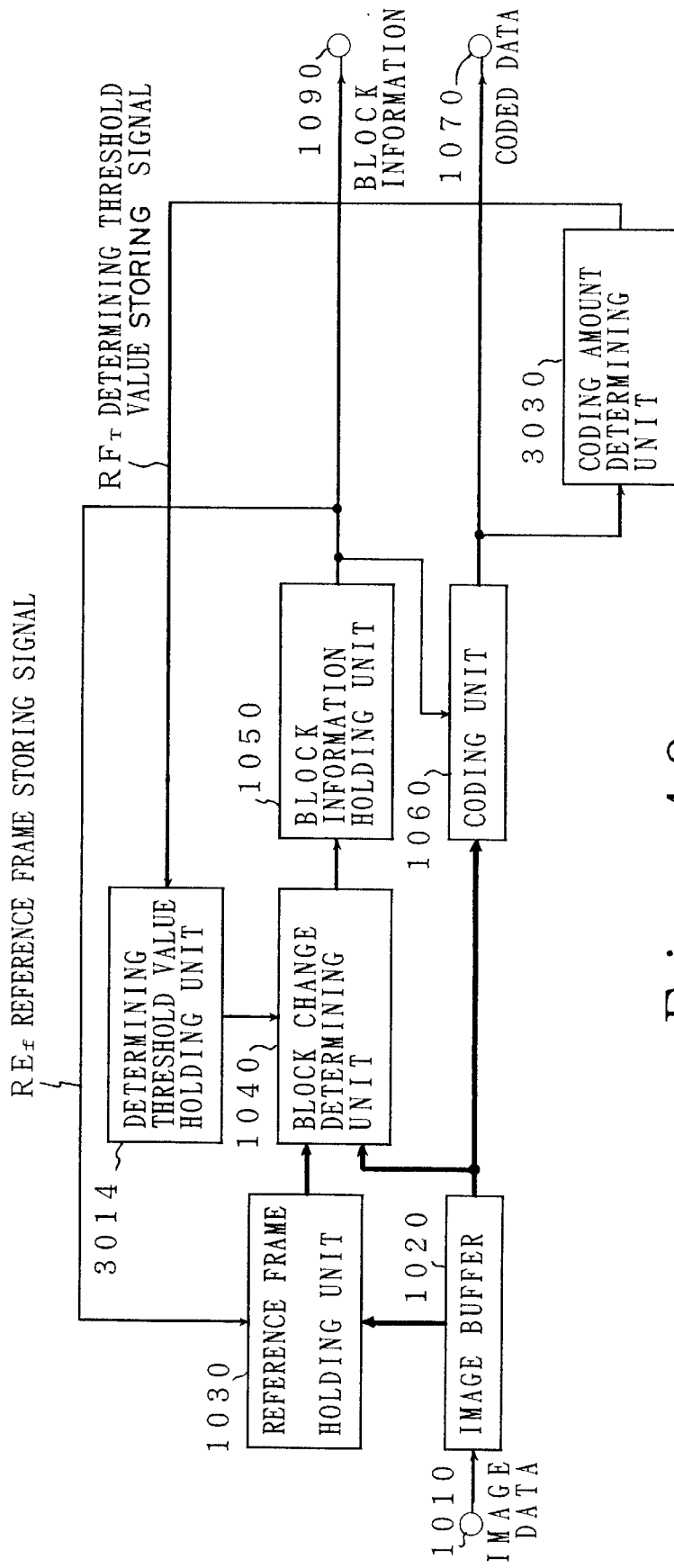
FIG. 48 shows a configuration of the 20th image data encoding device for encoding image data in each frame according to the above described method III.

FIG. 48 shows the configuration of the 20th image data encoding device for encoding image data in each frame according to the above described method III.

In FIG. 48, a circuit block also shown in FIG. 40 as a function of the 15th image data encoding device is assigned the same name and number.

A code amount determining unit 3030 determines whether or not the amount of image data in the present frame applied from the encoding unit 1060 is appropriate. If no, the unit sends a determination threshold rewrite signal $RE_T$ to the determination threshold storing unit 3014.

On receiving the determination threshold rewrite signal $RE_T$, the determination threshold storing unit 3014 modifies the determination threshold T according to the instruction of the signal (to raise or reduce the determination threshold T).

The determination threshold T modified by the determination threshold storing unit 3014 is used when the block change determining unit 1040 determines whether each block of image data in the succeeding frame is valid or invalid.

In this device, the block change determining unit 1040 determines whether each block in the present frame is valid or invalid using the determination threshold T set by the determination threshold storing unit 3014 according to the result of the image data encoding process performed on the preceding frame. Then, the encoding unit 1060 encodes only the blocks determined to be valid according to the determination above.

Then, the encoded data of the image data in the present frame provided by the encoding unit 1060 and the block information on each block in the present frame stored in the block information storing unit 1050 are externally outputted respectively through the terminals 1070 and 1090 immediately after being encoded.

Thus, with the device, it is determined whether a block is valid or invalid using a determination threshold T set according to the result of the encoding process performed on the preceding frame regardless of the appropriateness of the amount of codes of encoded data in the present frame. If the amount of encoded data in the present frame obtained by the encoding process using the determination threshold T is not appropriate at all, then the determination threshold T modified by the determination threshold storing unit 3014 is used in encoding the image data in the succeeding frame.

That is, the device can shorten the time taken for modifying a determination threshold T and speed up an encoding operation by taking advantage of the feature that adjacent frames indicate similar images in moving data.

Figure 49:
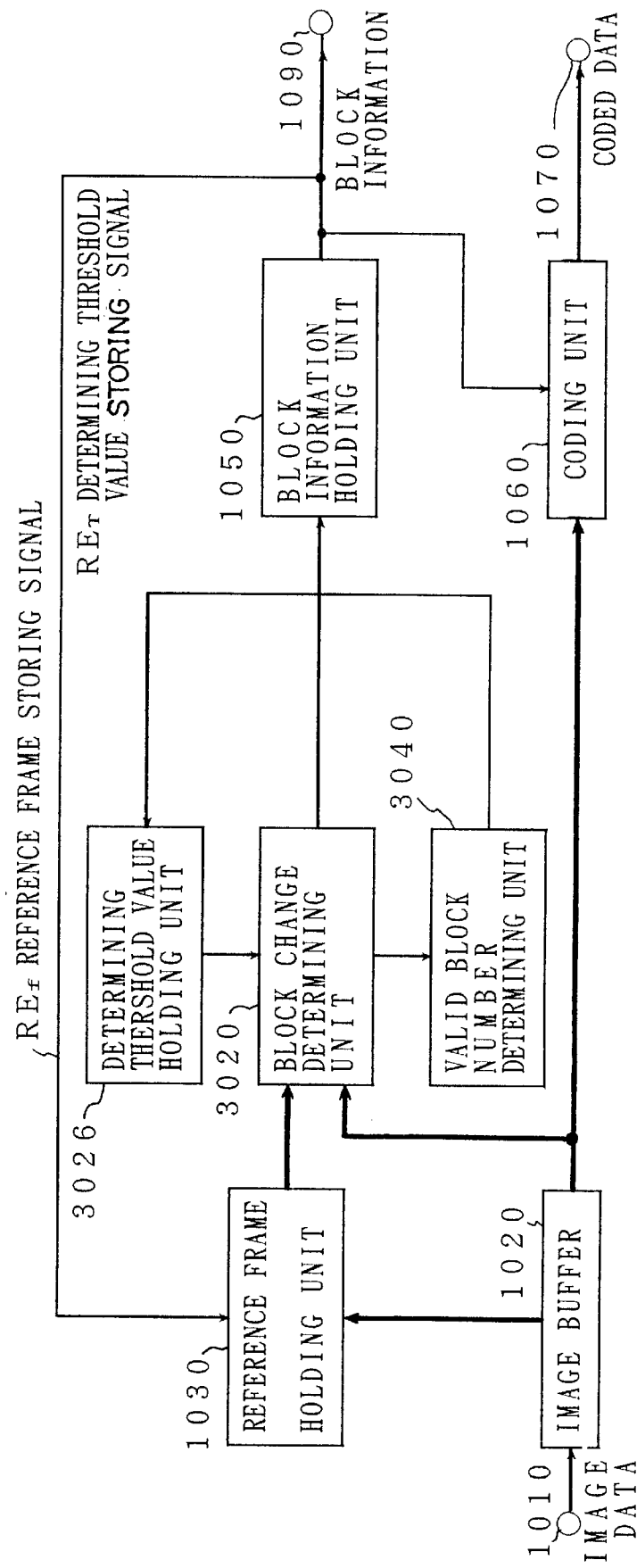
FIG. 49 shows a configuration of the 21st image data encoding device for encoding image data in each frame according to the above described method III.

FIG. 49 shows the configuration of the 21st image data encoding device for encoding image data in each frame according to the above described method III.

In FIG. 49, a circuit block also shown in FIG. 40 as a function of the 19th image data encoding device for encoding image data according to the above described method III is assigned the same name and number.

In the device, the function of a number-of-valid-blocks determining unit 3040 is different from that of the number-of-valid-blocks determining unit 3022, and the switch 3024 provided for the device shown in FIG. 47 is not provided in the present device.

Like the number-of-valid-blocks determining unit 3022, the number-of-valid-blocks determining unit 3040 counts the number of valid blocks in the present frame according to the result of the determination by the block change determining unit 3020, and determines whether or not the number of valid blocks is appropriate. The number-of-valid-blocks determining unit 3040 outputs a determination threshold rewrite signal $RE_T$ to the determination threshold determining unit 3026 only when the number of valid blocks is not appropriate.

Then, as described above, the determination threshold storing unit 3026 modifies the determination threshold T according to the instruction of the determination threshold rewrite signal $RE_T$.

The modified determination threshold T is used when the block change determining unit 3020 determines whether each block in the succeeding frame is valid or invalid.

The block information in each block in the present frame obtained by the block change determining unit 3020 is stored in the block information storing unit 1050 and outputted to the reference frame storing unit 1030. The encoding unit 1060 sequentially reads the block information in each block in the present frame stored in the block information storing unit 1050, and encodes only valid blocks in all blocks of image data in the present frame stored in the image buffer 1020 according to the block information.

The block information in each block in the present frame stored in the block information storing unit 1050 and the data in the present frame encoded by the encoding unit 1060 are externally outputted through the terminals 1070 and 1090 respectively.

Thus, with the device, it is determined using the determination threshold T set according to the result of the encoding process performed on the preceding frame whether or not each block in the present frame is valid. Only blocks determined to be valid are encoded and outputted externally together with the block information on the blocks. The determination threshold T modified by the determination threshold storing unit 3026 according to the number of valid blocks obtained in the encoding process is used in determining a valid block when image data in the succeeding frame are encoded.

Thus, unlike the device shown in FIG. 48, the device sequentially modifies the determination threshold T for each frame according to the number of valid blocks, not according to the amount of codes, to obtain the effect provided by the device shown in FIG. 48.

According to the image data encoding device operated by method I or II, a determination threshold T used in determining a valid block can be set to an appropriate value according to the type of image, a transmission rate of a transmission line, etc. That is, when ten pieces of images must be transmitted every second via an ISDN (integrated service digital network) of, for example, 64 Kb/s, valid block determination is made using a determination threshold T and only blocks determined to be valid are encoded. At this time, if the amount of codes in one frame exceeds 6400 bits, the image cannot be transmitted at a rate of 10 pieces per second. On the other hand, if the amount of codes in one frame is far below 6400 bits, then the low quality image is transmitted.

In this case, according to the 3rd embodiment, encoded data can be transmitted after the determination threshold T has been modified (set again) until the amount of codes has reached a desirable value (6400 bits in this case). Accordingly, a desirable image transmission can be performed depending on the number of pieces of transmitted images per unit time.

Next, an embodiment having the effects of the 18th through 21st image data encoding devices is explained below.

Figure 50:
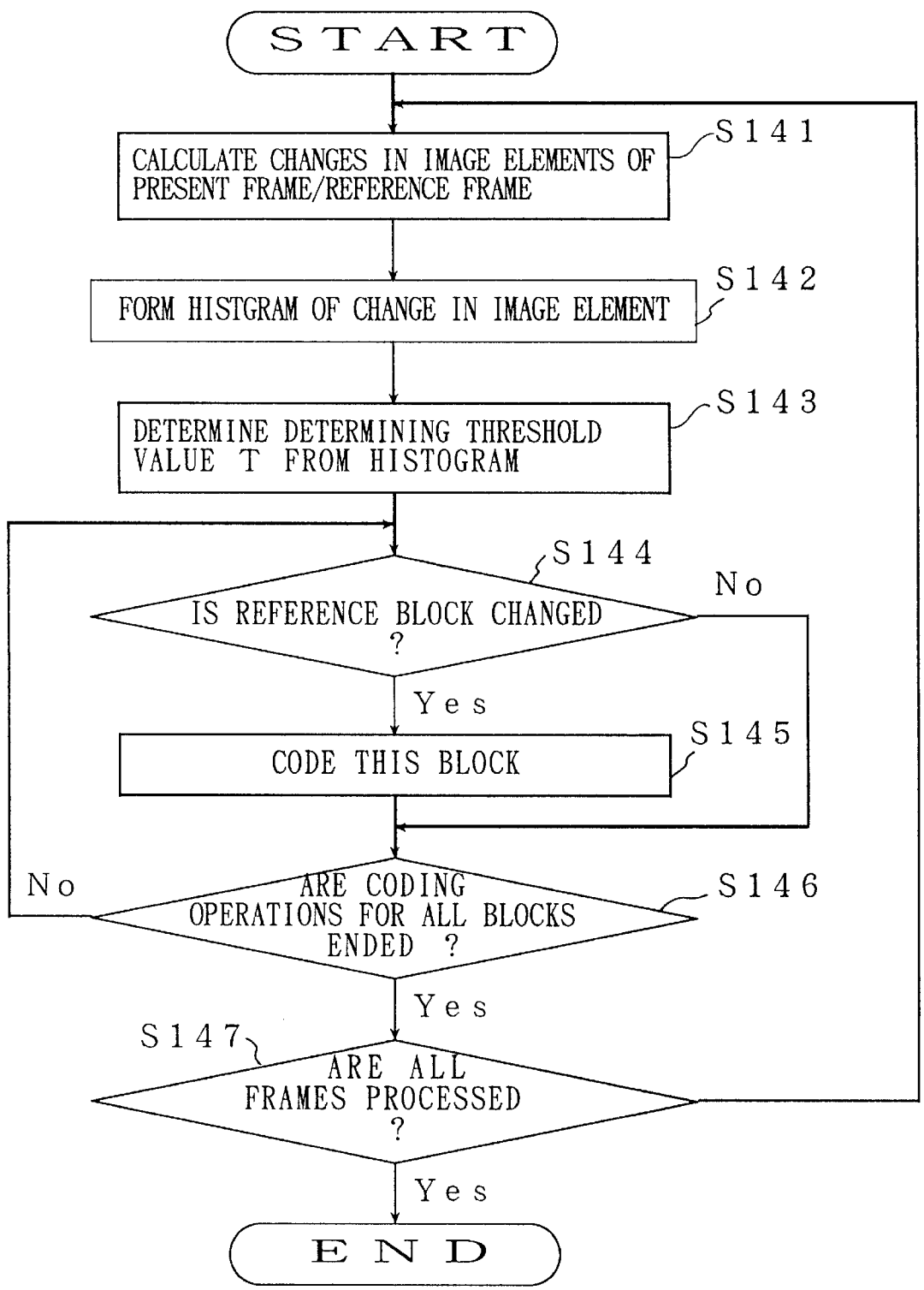
FIG. 50 shows a flowchart explaining the 9th image data encoding method according to the above described embodiment.

FIG. 50 is the flowchart explaining the 9th image data encoding method according to the above described embodiment.

According to the encoding method, a process of obtaining a predetermined variation in image or picture element value (for example, (1) a sum of absolute values of differences, (2) the maximum absolute value of difference, or (3) sum of square numbers of differences, etc.) between corresponding blocks in the present frame and the reference frame is performed on all blocks (S141). Then, the number of blocks is calculated for the variation in image or picture element value to obtain a histogram of the variation in image or picture element value (S142).

Then, according to the obtained histogram, a determination threshold T is determined to detect valid blocks (S143). The determination threshold T is based on the reference value of 10% of the number of blocks in one frame, with the number of blocks integrated sequentially from the largest variation in image or picture element value until the result has reached the reference value or the approximation of the reference value. Then, the minimum value of the variation in image or picture element value is set as the determination threshold T.

Then, the variation in image or picture element value is compared with the determination threshold T for all blocks in the present frame, and it is determined that a block in which the variation in image or picture element value is equal to or larger than the determination threshold T is determined to be an image-changed block compared with the corresponding block in the reference frame. An image-changed block, that is, a valid block, is encoded (S144 through S146).

The processes in steps S141 through S146 are performed on all the other frames. When it is determined that the encoding process has been performed on all valid blocks in all frames ("Yes" in S147), then the encoding process terminates.

Figure 51:
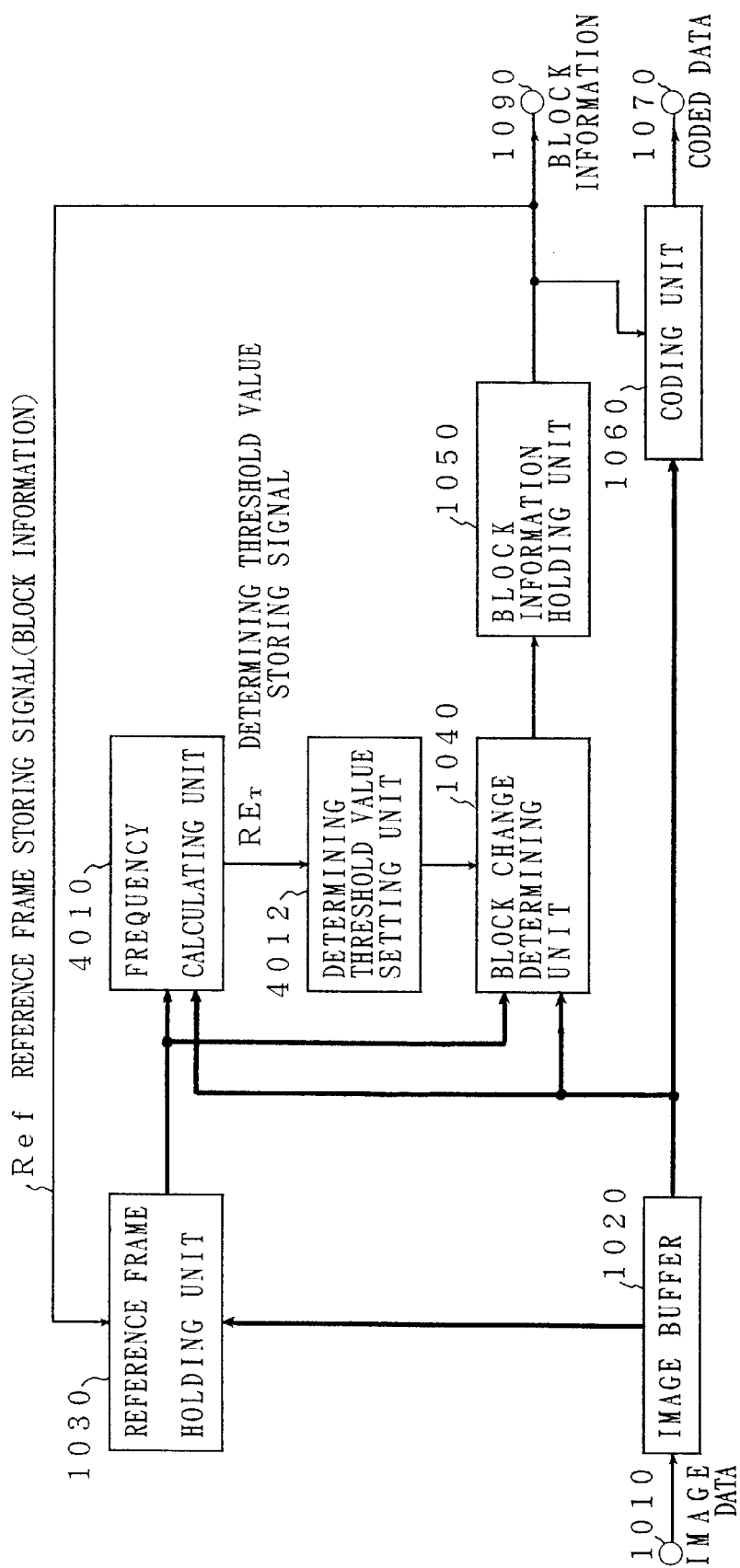
FIG. 51 shows a block diagram showing the circuit configuration of the 22nd image data encoding device.

FIG. 51 is the block diagram showing the circuit configuration of the 22nd image data encoding device for encoding image data in each frame according to the 9th image data encoding method.

In FIG. 51, each of the image buffer 1020, the reference frame storing unit 1030, the block change determining unit 1040, the block information storing unit 1050, and the encoding unit 1060 has the function identical to that of the circuit block assigned the same name and number used in the above described image data encoding devices.

A frequency calculating unit 4010 obtains the variation in image or picture element value (for example, the maximum absolute value of difference) between each block in the present frame stored in the image buffer 1020 and the corresponding block in the reference frame stored in the reference frame storing unit 1030, and then the frequency (the number of blocks) is calculated for each value of the variation in image or picture element value. That is, a histogram of the variation in image or picture element value is obtained with the frequency represented by the number of blocks. Then, on generating the histogram, the frequency calculating unit 4010 outputs a determination threshold rewrite signal $RE_T$ to a determination threshold setting unit 4012.

The determination threshold setting unit 4012 sequentially enters the frequency (the number of blocks) of variation in image or picture element from the frequency calculating unit 4010 in the order from the largest variation in image or picture element value, and then sequentially integrates the frequency (the number of blocks). When the integrated value has reached a predetermined level (for example, approximately 10% of all blocks in one frame), the determination threshold setting unit 4012 sets the determination threshold T to the value of the variation in image or picture element obtained as integrated frequency (the number of blocks) in the last step of the calculating process, that is, the value of the minimum variation in image or picture element as integrated frequency (the number of blocks).

If the determination threshold T is thus set, the block change determining unit 1040 receives the image data in the present frame and the reference frame respectively from the image buffer 1020 and the reference frame storing unit 1030, and determines using the determination threshold T whether each of the blocks in the present frame is valid of invalid. The valid/invalid determination can be performed by obtaining again the variation in image or picture element value for each block in the present frame, and comparing the resultant value with the determination threshold T. As a result, the block change determining unit 1040 outputs to the block information storing unit 1050 the block information indicating that each of the blocks in the present frame is valid or invalid (for example, "1" for a valid block and "0" for an invalid block).

The encoding unit 1060 sequentially reads in a predetermined order from the block information storing unit 1050 the block information about each block in the present frame stored in the image buffer 1020, and then encodes only the data in valid blocks. When the encoding unit 1060 has encoded the data in all valid blocks in the present frame, the encoding unit 1060 outputs through the terminal 1070 the encoded data obtained by the above described encoding process, and the block information storing unit 1050 outputs through the terminal 1090 the block information about each block in the present frame.

Figure 52:
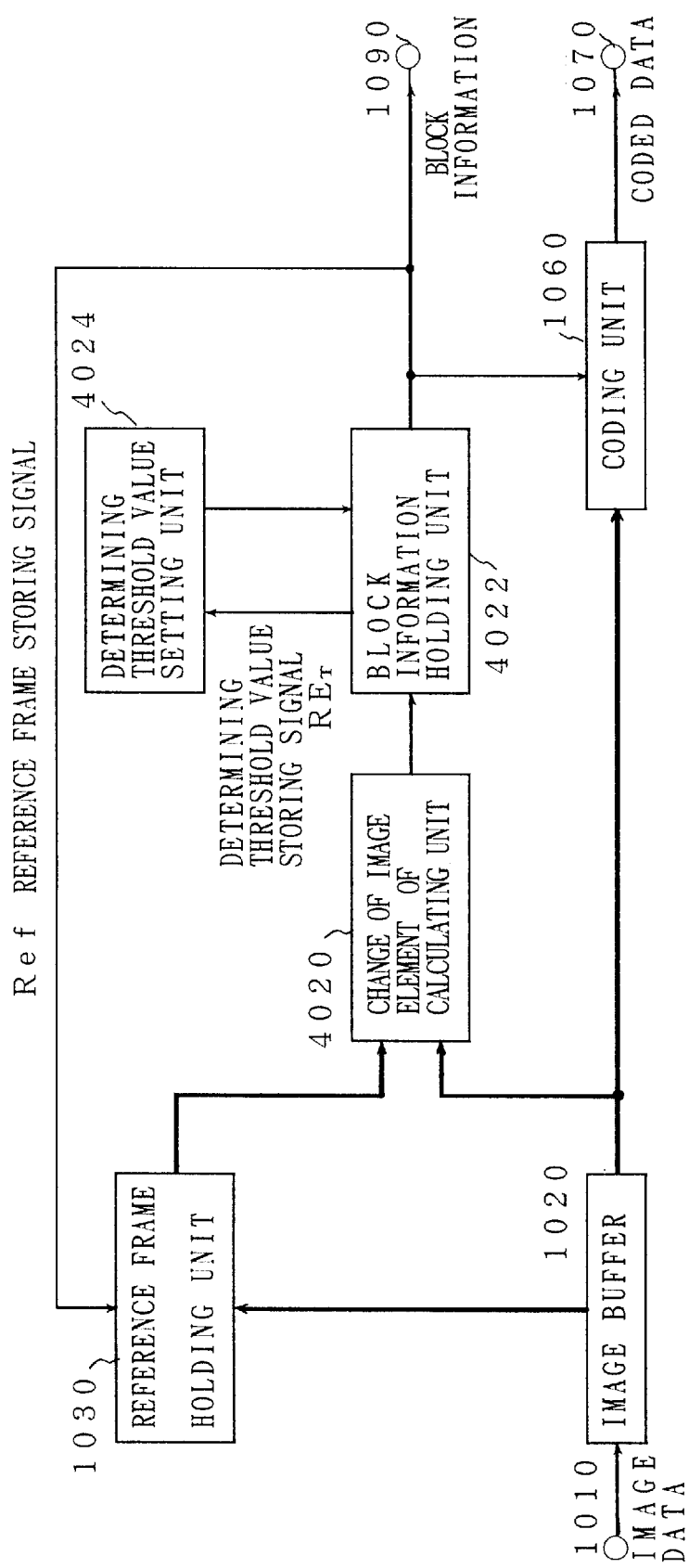
FIG. 52 shows a block diagram showing another configuration of the 23th image data encoding device encoding image data according to the method indicated by the flowchart.

FIG. 52 is the block diagram showing the configuration of the 23th image data encoding device for, as in the 22th image data encoding device, encoding image data according to the method indicated by the flowchart shown in FIG. 50.

In FIG. 52, each of the image buffer 1020, the reference frame storing unit 1030, and the encoding unit 1060 has the function identical to that of the circuit block assigned the same name and number used in the above described 15th image data encoding devices shown in FIG. 39.

A image or picture element change calculating unit 4020 receives the image data in the present frame and the reference frame respectively from the image buffer 1020 and the reference frame storing unit 1030, and, like the frequency calculating unit 4010 of the image data encoding unit shown in FIG. 22, obtains the variation in image or picture element value (for example, the maximum absolute value of difference) for each block in the present frame, and the results are temporarily stored in the block information storing unit 4022.

On receiving and storing the variation in image or picture element value for each of the blocks in the present frame from the image or picture element change detecting unit 4020, the block information storing unit 4022 outputs a determination threshold rewrite signal $RE_T$ to a determination threshold setting unit 4024.

The determination threshold setting unit 4024 reads from the block information storing unit 4022 the variation in image or picture element value for all blocks in the present frame, generates a histogram for each value with the frequency represented as the number of blocks, and sets the histogram to, for example, a determination threshold T according to the above described method. Then, the determination threshold setting unit 4024 receives from the block information storing unit 4022 the variation in image or picture element value for each block in the present frame, sequentially compares the variation in image or picture element value for each block with the determination threshold T, determines a block whose variation in image or picture element value is equal to or larger than the determination threshold T to be a valid block and a block whose variation in image or picture element value is smaller than the determination threshold T to be an invalid block, and rewrites the variation in image or picture element value stored in the block information storing unit 4022 for each block to a binary block information ("1" for a valid block and "0" for an invalid block) indicating that each block is valid or invalid.

As described above, if the block information about all blocks in the present frame is stored in the block information storing unit 4022, the encoding 1060 sequentially reads in a predetermined order from the block information storing unit 4022 the block information about each block in the present frame, and encodes only the data in the blocks whose block information refers to a valid block in all blocks in the present frame.

Thus, according to the 4th embodiment, a histogram of the variation in a predetermined image or picture element value (for example, the maximum absolute value of difference) between corresponding blocks in the present frame and the reference frame is generated for one frame, and a determination threshold T is set as a reference value for use in extracting a valid block in the present frame according to the generated histogram. Therefore, an appropriate determination threshold T can be set for each frame even if a frame contains a series of mobile images having different variations. Thus, the image data can be encoded after extracting the optimum valid block in each frame.

Based on the frequency (the number of blocks) of each value in the variation in a image or picture element value, a determination threshold T can be set such that the number of valid blocks can be fixed for each frame. Therefore, the amount of codes can be controlled to be fixed for each frame, and the optimum image transmission can be realized under various conditions such as the information transmission speed of a transmission line, the number of pieces of frames per unit time, etc.

Since the frequency of changes in images is leveled among frames in moving images, a determination threshold T is set only for the first n frames (n=1, 2, 3, . . . ) and a determination threshold T set for the n-th frame can be used in detecting valid blocks in the (n+1)th and the following frames. Thus, an encoding process can be performed at a high speed for the (n+1)th frame.

Furthermore, a valid block can be extracted at a high speed by using the maximum absolute value of difference as the variation in a image or picture element value, thereby performing the encoding process at a high speed. The sum of absolute values of differences or the sum of square numbers of differences can be used as the variation in the image or picture element value.

As described above, when moving images are encoded, an absolute value of the difference is obtained for each image or picture element in each block in the reference frame, the maximum absolute value of differences is compared with a predetermined threshold, and it is determined whether or not each block in the reference frame is valid or invalid. At this time, if a image or picture element signal contains any noises, then an area that should be normally level indicates an unleveled color in a block form.

That is, in a series of blocks in an area where similar colors are used adjacently (for example, a background area), if a block is determined to be valid and another block adjacent to that block is considered to be invalid due to noises, etc. generated in a image or picture element signal, then the above described problem arises. These block noises appear conspicuously as the encoding process is performed further. Accordingly, it is indispensable to periodically refresh a reference frame to solve such a problem.

However, if a refreshing process is performed in a conventional method, unnatural flashing images are displayed because large differences are recorded between adjacent frames.

Next, an embodiment for solving such problems is explained below.

Figure 53:
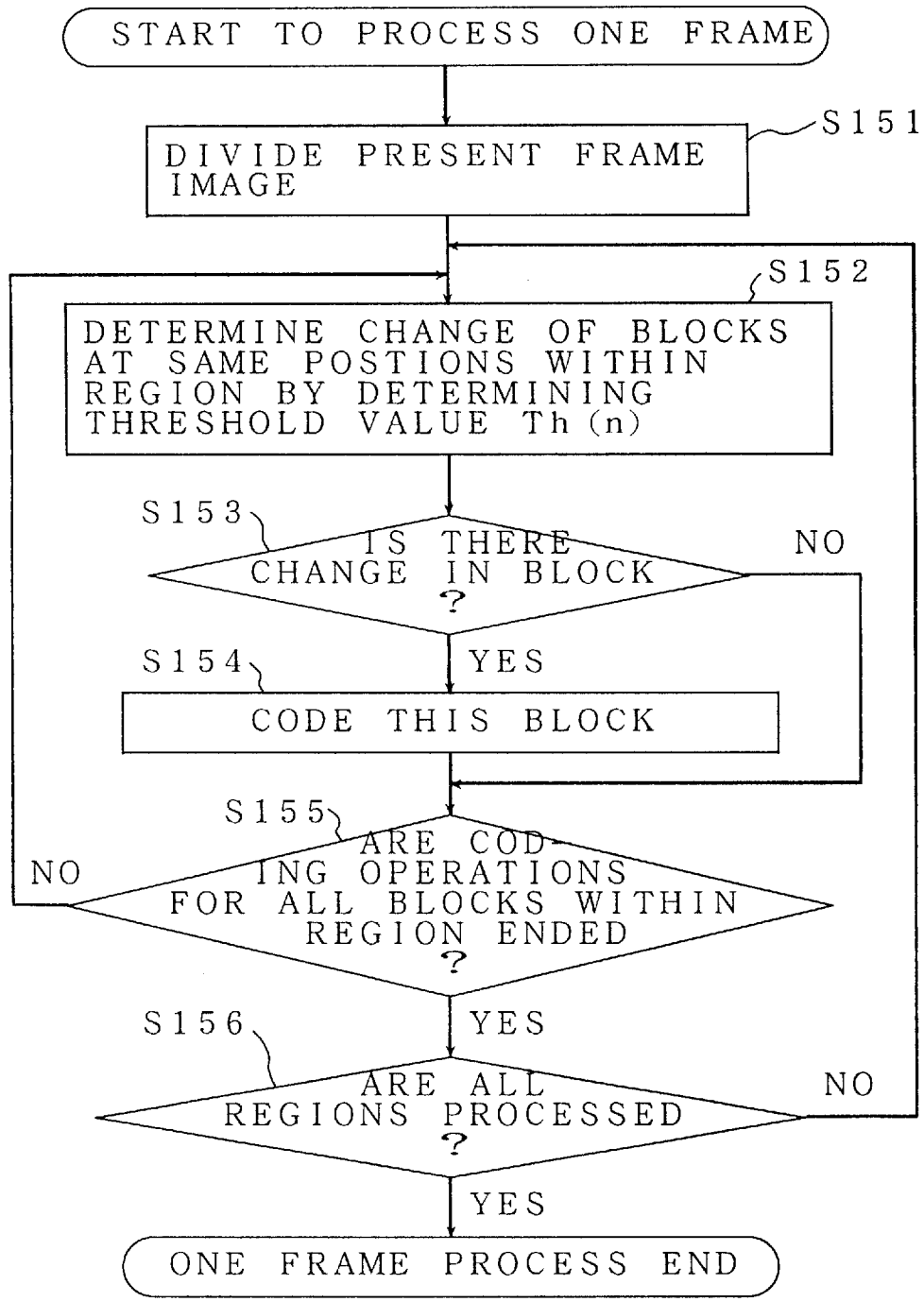
FIG. 53 shows a flowchart indicating the 10th image data encoding method according to the above described embodiment.

FIG. 53 is the flowchart indicating the 10th image data encoding method according to the above described embodiment. The flowchart indicates a process of encoding image data in one frame.

In this method, image data in the present frame are divided into n (n=1, 2, 3, . . . ) areas (S151).

According to the present embodiment, determination thresholds $Th_1, Th_2, Th_3, \ldots, Th_n$ are individually provided for each of the divided areas, and a valid block is extracted by using a corresponding determination threshold for each block in each area.

That is, the first area is selected from the above described n areas, and the areas are divided to a plurality of blocks of a predetermined size (for example, 8×8 image or picture elements or 16×16 image or picture elements, etc.). Then, the variation in a predetermined image or picture element value (the maximum absolute value of difference, the sum of absolute values of differences, or the sum of square numbers, etc.) between the corresponding blocks in the present and reference frames is obtained, and is compared with a corresponding determination threshold $Th_{(1)}$ so that it is determined whether or not the image data are different between the corresponding blocks in the present and reference frames (S152 and S153).

Then, a valid block, that is, a block determined to have changed in image data compared with the reference frame, is extracted ("Yes" in S153), and the image data in valid blocks are encoded (S154). On the other hand, image data in an invalid block, that is, a block determined not to have changed in image data compared with the reference frame (S153) are not encoded at all.

When the above described processes in S152 through S154 have been performed on all blocks in the first area selected first ("Yes" in S155), the processes in S152 through S155 are performed on the next selected second area.

Thus, image data are encoded for the valid blocks determined as described above in the second area.

In all areas in the present frame, if the processes in steps S152 through S155 are performed, and the encoding process has been performed on all areas in the present frame ("Yes" in S156), then the process of encoding image data in the present frame is terminated.

Thus, a difference generated in an area (difference between a reconstructed image and the original image) can be reduced by using a determination threshold individually for each area in a frame or by setting a small determination threshold for an area. That is, if a difference can be detected, the corresponding block is extracted as a valid block, and an encoding process is performed on the valid block. Thus, the deterioration of images due to a difference in a specific area can be prevented by adjusting a determination threshold or by reducing the difference in a specific area to a level beyond the visual recognition.

Furthermore, the increment in the amount of codes detected in a reference frame refreshing process can be minimized. That is, a block is extracted or encoded only if it has changed in images to the extent that the difference can be recognized (a valid block). Therefore, the amount of data to be encoded can be reduced and the total amount of codes can be lessened. In this case, a refreshing operation can be performed without any problem by reducing the determination threshold of each area down to a value small enough to extract as a valid block only a block whose difference in image data generates the deterioration in a resultant image.

Figure 54:
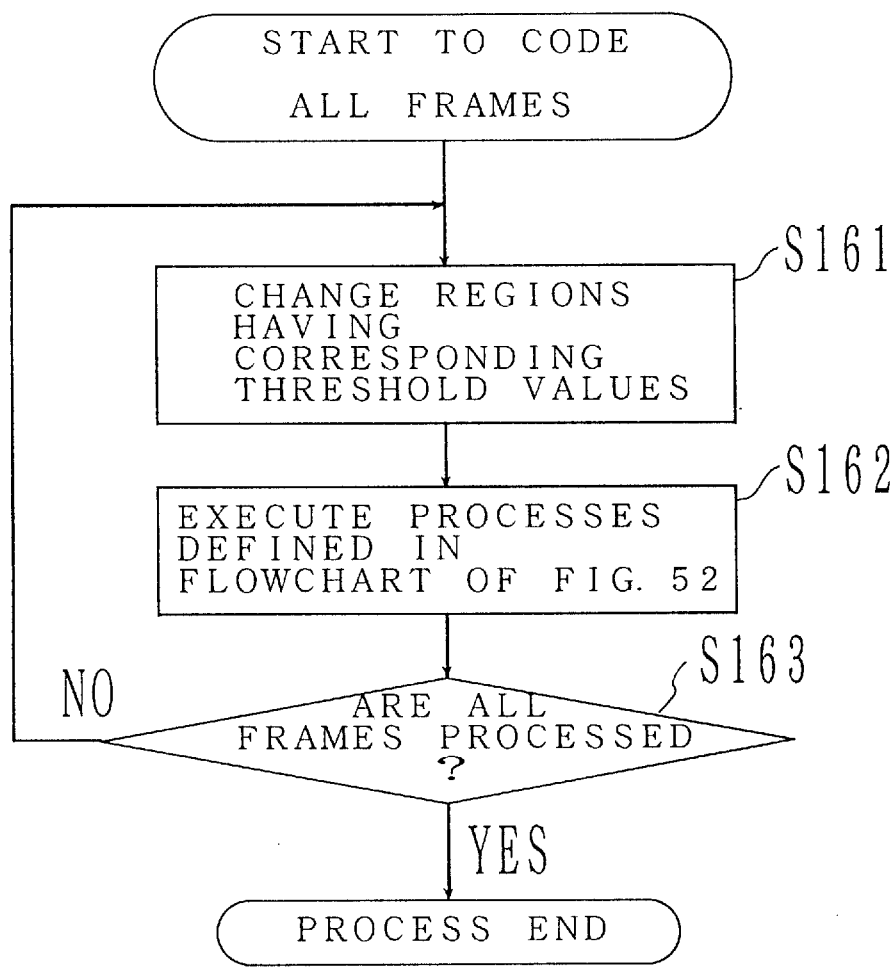
FIG. 54 shows a flowchart indicating the 11th image data encoding method.

FIG. 54 is the flowchart indicating the 11th image data encoding method as another embodiment of solving a problem in the above described conventional refreshing process.

The flowchart in FIG. 54 indicates a method of encoding a plurality of frames. The process in step S162 shown in FIG. 54 is equivalent to the processes in steps S151 through S156 in the flowchart shown in FIG. 53.

In the encoding method, a determination threshold individually used in each area in a frame is appropriately modified (S161).

Using a modified determination threshold, the image data in the present frame can be encoded according to the flowchart shown in FIG. 53 (S162).

Back in step S161, a determination threshold to be assigned to each area in the succeeding frame is modified, and the image data in the frame are encoded (S162).

Likewise, the processes in steps S161 and S162 are performed on the remaining frames. If the encoding process has been performed on all frames ("Yes" in 163), the encoding process is terminated.

Thus, a conventional problem that unnatural flashing images are generated can be prevented by sequentially encoding a series of frames.

An example of the solution is explained as follows.

For example, a frame is divided to 10 areas, and the 10 areas are individually named the 1st area, the 2nd area, . . . , and the 10th area. The determination thresholds for each of the areas are $Th_1$ (for the 1st area), $Th_2$ (for the 2nd area), . . . , and $Th_{10}$ (for the 10th area).

Furthermore, two additional thresholds $VAL_a$ and $VAL_b$ are provided as determination thresholds.

$VAL_a$: a threshold for use in a refreshing process to determine as an invalid block a block whose difference in images is small enough to generate deterioration of images that can be recognized.

$VAL_b$: a threshold larger than $VAL_a$, and used to reduce the amount of codes.

When a threshold is modified at frame intervals, the threshold to be assigned to each of the areas in the 1st to the 10th frames is modified as follows.

the 1st frame $Th_1<Th_2=Th_3=Th_4=Th_5=Th_6=Th_7=Th_8=Th_9=Th_{10}$ ($Th_1=VAL_a$, $Th_2=Th_3=$ . . . , $Th_{10}=VAL_b$)

the 2nd frame $Th_2<Th_1=Th_3=Th_4=Th_5=Th_6=Th_7=Th_8=Th_9=Th_{10}$ ($Th_2=VAL_a$, $Th_1=Th_3=$ . . . , $Th_{10}=VAL_b$)

.
.
.

the 10th frame $Th_{10}<Th_1=Th_2=Th_3=Th_4=Th_5=Th_6=Th_7=Th_8=Th_9=Th_{10}$ ($Th_{10}=VAL_a$, $Th_1=Th_2=$ . . . , $Th_9=VAL_b$)

That is, in the 1st frame, threshold $VAL_a$ is assigned only to determination threshold $Th_1$ in the 1st area, while threshold $VAL_b$ is assigned to determination thresholds $Th_2$ through $Th_{10}$. Thus, in the 1st frame, the difference in the 1st area in the 1st frame is reduced down to the extent that the deterioration of image cannot be recognized.

In the 2nd frame, since threshold $VAL_a$ is assigned only to the 2nd area, the difference in the 2nd area in the reference frame is reduced down to the extent that the deterioration of image cannot be recognized.

Likewise, in each frame from the 3rd to the 10th frames, the image data in the reference frame are refreshed in the 10th frame by sequentially assigning threshold $VAL_a$ to the 3rd, the 4th, . . . , and the 10th area respectively. Then, the image data in the reference frame can be refreshed every 10th frame by repeating the above described process on the 11th and the following frames.

If the image data in the reference frame are refreshed by this method, one area is refreshed for each frame. Accordingly, unnatural flashing images generated in a refreshing process are prevented by setting the areas to an appropriate size, thereby solving the problem caused by the conventional method.

Next, another method of solving the problem caused by the conventional method is described below.

In this case, ten thresholds having, for example, the following correlation are preliminarily provided.

$VAL_1<VAL_2<VAL_3<VAL_4<VAL_5<VAL_6<VAL_7<VAL_8<VAL_9<VAL_{10}$

Assume that $VAL_1$ corresponds to $VAL_a$ above.

The determination threshold assigned to each area in the 1st through the 10 frames is modified in a loop format as follows.

the 1st frame
$Th_1<Th_2<Th_3<Th_4<Th_5<Th_6<Th_7<Th_8<Th_9<Th_{10}$
($Th_i=VAL_i$ (i=1~10))

the 2nd frame
$Th_2<Th_3<Th_4<Th_5<Th_6<Th_7<Th_8<Th_9<Th_{10}<Th_1$
($Th_i=VAL_{i-1}$ (i=2, 3, . . . , 9), $Th_1=VAL_{10}$)

.
.
.

the 10th frame
$Th_{10}<Th_1<Th_2<Th_3<Th_4<Th_5<Th_6<Th_7<Th_8<Th_9$
($Th_{10}=VAL_1$ $Th_j=VAL_{j+1}$ (j=1~9))

In this method, the difference in each area in the reference frame can be reduced more gradually than the method described above. Therefore, unnatural flashing images can be furthermore prevented.

In the above described two examples, the correspondence between an area and a determination threshold is modified for each frame. However, it can be modified optionally for any intervals. Furthermore, it can be modified for any time intervals, not frame intervals. The necessary process is indicated as the process in step S161 indicated by the flowchart shown in FIG. 54.

Figure 55:
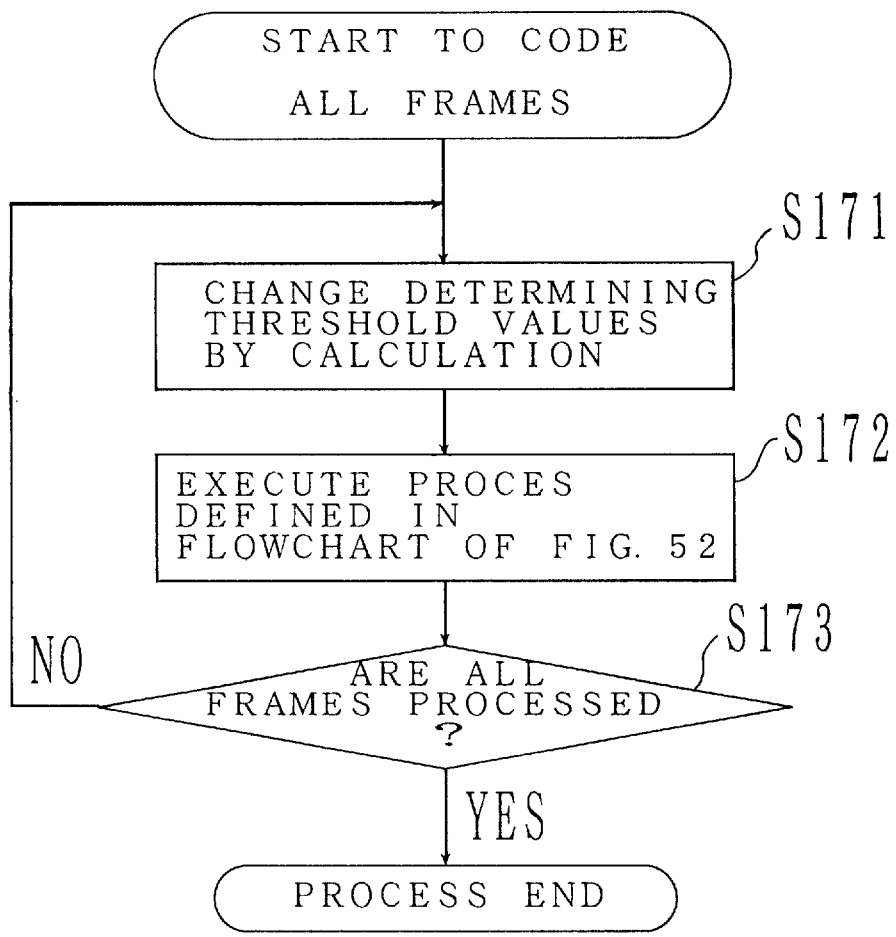
FIG. 55 shows a flowchart indicating the 12th image data encoding method according to further embodiment of the present invention.

FIG. 55 is the flowchart indicating the 12th image data encoding method according to another embodiment for solving the problem caused in the refreshing process by the conventional method.

According to the encoding method indicated by the flowchart, the determination threshold used for each area in a frame can be modified by an arithmetic operation, not by a switch of outputs (S171). This process is equivalent to the process in step S161 of the flowchart shown in FIG. 54. A determination threshold is modified for each area.

While a determination threshold for each area is modified at predetermined frame intervals or time intervals, the image data in each frame are encoded as in the process in step S162 indicated by the flowchart shown in FIG. 54 (S171 through S173).

Therefore, this encoding method provides an effect equivalent to that of the 11th image data encoding method indicated by the flowchart shown in FIG. 54.

Figure 56:
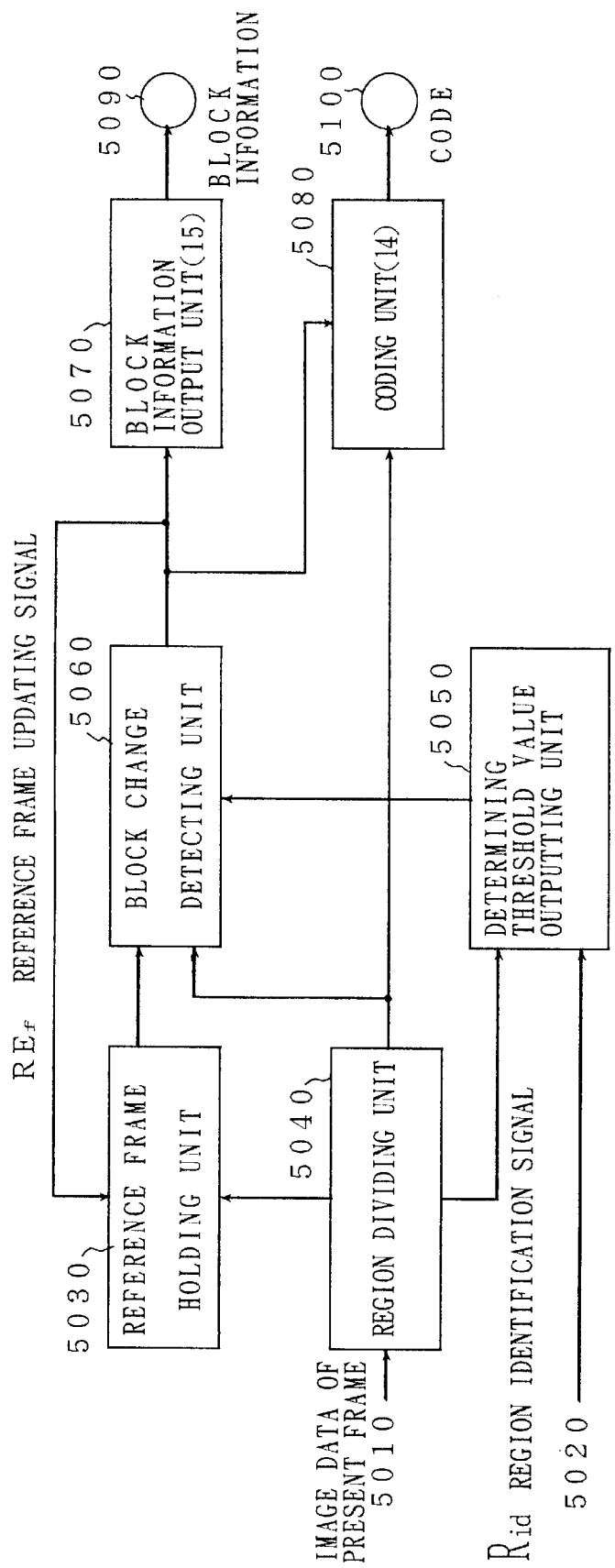
FIG. 56 shows a block diagram indicating the configuration of the 24th image data encoding device.

FIG. 56 is the block diagram indicating the configuration of the 24th image data encoding device for encoding a series of image data in frame units according to the encoding method indicated by the flowchart shown in FIGS. 56, 53, 54, and 55.

A reference frame storing unit 5030 is a memory for storing image data in the reference frame for use in detecting a valid block in the reference frame applied through a terminal 5010.

An area dividing unit 5040 divides image data in the present frame applied through the terminal 5010 into a plurality of areas. Then, it sequentially outputs starting with the 1st area to a block change determining unit 5060, and outputs to a determination threshold output unit 5050 an identification signal (area identification signal) Rid indicating the area being outputted to the block change determining unit 5060.

In addition to the area identification signal Rid, the determination threshold output unit 5050 receives a frame signal $FR_n$ indicating the frame number of the present frame from a terminal 5020, and outputs to the block change determining unit 5060 according to these signals the determination threshold for use in detecting a valid block in each block in the areas in the present frame whose image data have been inputted to the block change determining unit 5060.

The block change determining unit 5060 divides the image data in each area applied by the area dividing unit 5040 to a plurality of blocks, compares the image data in each block with the image data in the corresponding block in the reference frame stored in the reference frame storing unit 5030, and obtains the variation in a predetermined image or picture element value. Then, the unit compares the variation in a image or picture element value with the determination threshold applied from the determination threshold output unit 5050, determines whether the present block is valid or invalid, and outputs the determination result to the reference frame storing unit 5030, a block information output unit 5070, and an encoding unit 5080.

The block information output unit 5070 receives a determination result and externally outputs it through a terminal 5090 as block information ("1" for a valid block, and "0" for an invalid block).

On receiving a determination result indicating that the present block is valid, the encoding unit 5080 receives the image data of the block from the area dividing unit 5040, and encodes them. It does not encodes the image data of invalid blocks. The unit externally outputs through a terminal 5100 the encoded data of valid blocks obtained by the encoding process.

The reference frame storing unit 5030 receives the determination result as a reference frame update signal REf (for example, "High" for a valid block, and "Low" for an invalid block), and replaces the corresponding block in the reference frame stored therein with the block stored in the area dividing unit 5040 if the block is valid. If the block is invalid, the corresponding block in the reference frame is not replaced at all.

Thus, it is determined whether or not each block in each divided area of image data in the present frame applied from the terminal 5010 is valid according to an individual determination threshold outputted by the determination threshold output unit 5050. Then, the encoding unit 5080 encodes only valid blocks, and the reference frame storing unit 5020 replaces the image data in the corresponding block in the reference frame with the image data in the valid block.

Therefore, a series of image data can be appropriately encoded by the image data encoding method indicated by the flowchart shown in FIG. 54 or 55.

Figure 57A:
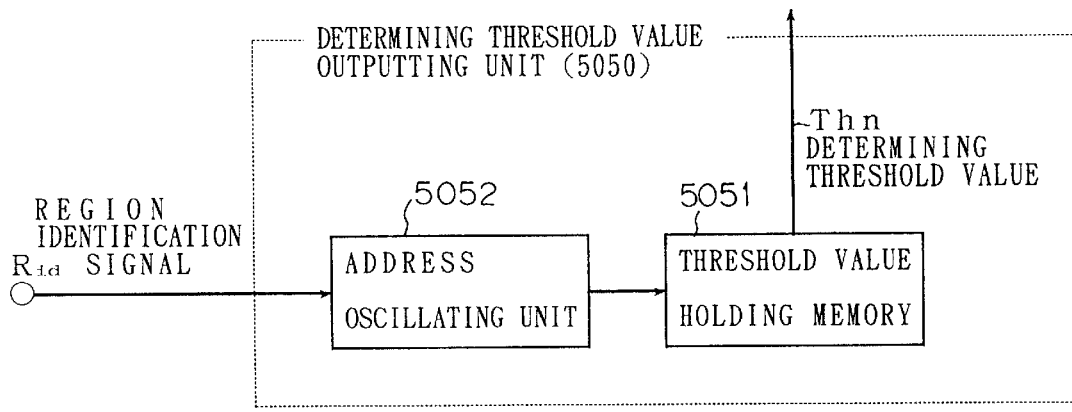
FIGS. 57A to 57C show each of the configuration examples of the determination threshold output unit in the 24th image data encoding device.
Figure 57B:
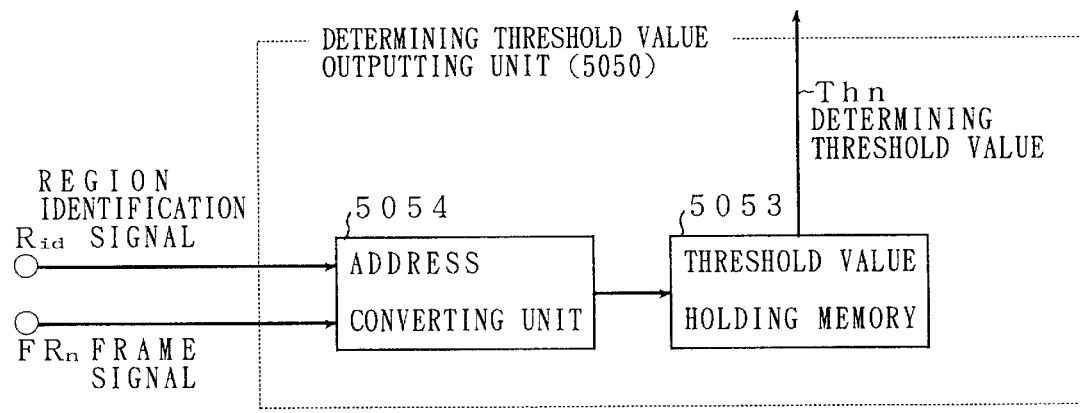
Figure 57C:
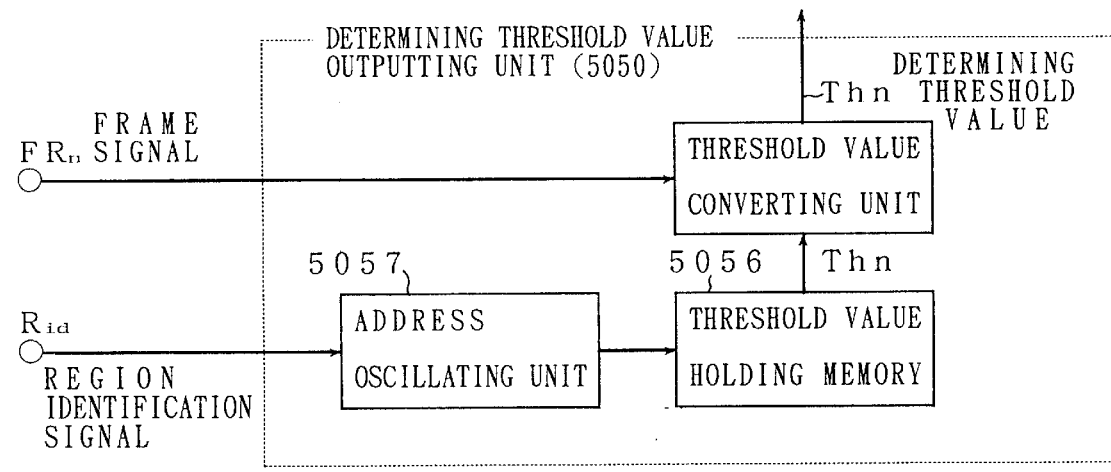

Next, each of the configuration examples of the determination threshold output unit 5050 is shown in FIGS. 57A, 57B, and 57C.

FIG. 57A shows an example of a basic circuit for outputting determination threshold $Th_n$ (n=1, 2, ...) set for each area in a frame. That is, a threshold storing memory 5051 stores determination threshold $Th_n$ (n=1, 2, ...) individually corresponding to each area in a frame.

On receiving an area identification signal Rid from the area dividing unit 5040 shown in FIG. 56, an address sending unit 5052 sends an address in the threshold storing memory 5051 in which determination threshold $Th_n$ corresponding to the area indicated by the signal Rid is stored. Thus, the threshold storing memory 5051 outputs determination threshold $Th_n$ corresponding to the area being received by the encoding area. That is, no frame signals $FR_n$ are used in the circuit.

Next, FIG. 57 shows a circuit example of switching determination threshold $Th_n$ for each area in each frame. It relates to the image data encoding method indicated by the flowchart shown in FIG. 25. In FIG. 57, a threshold storing memory 5053 has a configuration similar to that of the threshold storing memory 5051.

In FIG. 57B, an address transforming unit 5053 generates an address in the threshold storing memory 5052 according to an area identification signal Rid received from the area dividing unit 5040 and to a frame signal $FR_n$ received through the terminal 5020, and outputs the address to the memory 5053 for storing determination threshold $Th_n$ for the area in the present frame outputted from the area dividing unit 5040 to the block change determining unit 5060. Then, the threshold storing memory 5053 outputs determination threshold $Th_n$ for the area in the present frame to the block change detecting unit 5060.

Thus, in this circuit, determination threshold $Th_n$ is set according to a frame signal indicating a frame number and to an area identification signal Rid indicating the area for which a valid/in-valid block determination is made. Therefore, determination threshold $Th_n$ for each area in a frame can be modified (switched) at a predetermined frame intervals (for each of any number of frames) as in the image encoding method indicated by the flowchart shown in FIG. 55.

Then, the circuit shown in FIG. 57C has the function equivalent to that of the circuit shown in FIG. 57B. With this circuit, a threshold storing memory 5056 shown in FIG. 57C has the same configuration as the threshold storing memory 5053 shown in Figure B.

On receiving an area identification signal Rid from the area dividing unit 5040, an address generating unit 5057 notifies of an address to be outputted the threshold storing memory 5056 storing determination threshold $Th_n$ for the area in the present frame being applied to the block change detecting unit 5020. Thus, the threshold storing memory 5056 outputs to a threshold transforming unit 5058 determination threshold $Th_n$ for the area stored at the above described address.

The threshold transforming unit 5058 converts determination threshold $Th_n$ to determination threshold $Th_n'$ for the area in the present frame indicated according to a frame signal $FR_n$ received from the terminal 50202, and outputs threshold $Th_n'$ to the block change detecting unit 5020.

Thus, with the circuit, the threshold transforming unit 5058 converts determination threshold $Th_n$ fixedly assigned to each area in a frame and outputted by the threshold storing memory 5056 to determination threshold $Th_n'$ and outputs it to the block change detecting unit 5060. Therefore, as in the image data encoding method indicated by the flowchart shown in FIG. 55, modifying predetermined determination threshold $Th_n$ through an arithmetic operation modifies the value of determination threshold $Th_n$ for each area in a frame for each of any number of frames.

As described above, according to the present invention, a frame is divided into a plurality of block when a series of images such as moving images, etc. are encoded, and a block indicating a change in images from the preceding frame as indicating a value larger than a predetermined threshold is extracted as a valid block, and only the image data of the valid block are encoded. Therefore, moving having rather static images between adjacent frames such as TV telephone images, moving images, etc. can be compressed efficiently.

Furthermore, when an original image is reconstructed, block information indicating whether a block in a frame is valid or invalid is transmitted together with encoded data of image data in the valid block. Therefore, an image reconstructing equipment can recognize the position of the valid block according to the block information. As a result, the image reconstructing equipment can display the image in the valid block at a correct position when the original image is reconstructed from the encoded data in the valid block. That is, a series of images such as moving images, etc. can be reconstructed by modifying images in valid blocks.

Furthermore, according to the present invention, two thresholds are used as determination thresholds for use in determining a valid block. The two thresholds are appropriately used so that image change starting and ending portions can be correctly detected and the image-changed areas can be extracted as a series of valid blocks in adjacent areas where images change from those in the preceding frames even if the variation in images is not constant or the areas include blocks where images change moderately. Thus, a natural image can be reconstructed successfully.

Additionally, according to the present invention, image data are encoded after a frame is divided into valid and invalid blocks when a refreshing process is performed. Then, the encoded data are divisionally transmitted to a reconstructing equipment. Thus, a refresh frame receiving equipment can reconstruct an original image without being assigned lengthy wait time. Furthermore, the capacity of code buffers for storing encoded data can be reduced both in sending (encoding) and receiving (reconstructing) equipments.

According to the present invention, image data in a reference frame (reference images) can be updated during a refreshing process at a higher speed than by a conventional method.

Furthermore, according to the present invention, a determination threshold used in extracting a valid block (whose data are to be encoded) indicating a change in images from the reference frame can be adaptively set such that the amount of codes refers to an appropriate value under various conditions such as the transmission rate of images and a transmission line, the number of transmitted frames per unit time, etc. As a result, an image can be transmitted according to the above described conditions, and a higher quality image can be transmitted.

According to the present invention, the variation in a predetermined image or picture element value between each block in a transmission frame and the corresponding block in the reference frame is obtained, the frequency (the number of blocks) of the variation in a predetermined image or picture element value is obtained in all transmission frames, and a determination threshold is set to extract a valid block (whose data are to be encoded) indicating a change in images from the reference frame according to the frequency. As a result, a determination threshold can be set such that the amount of codes refers to an appropriate value under various conditions such as information transmission speed, the number of transmitted frames per unit time, etc. Thus, the optimum image transmission can be realized according to the above described conditions.

Furthermore, according to the present invention, a threshold can be assigned individually to each area in each frame. Therefore, the value of a threshold is minimized for an area in the reference frame to be refreshed and updated so that the deterioration of the image in the updated area can be reduced and cannot be recognized in the reconstructed image.

Each of the areas in the reference frame can be sequentially refreshed at predetermined frame intervals by changing the above described update areas at predetermined frame intervals (for example, changing in block line units downwards from the top of an image). In this case, all blocks in the reference frame are not refreshed simultaneously, but each area in the reference frame is sequentially refreshed at predetermined frame intervals. As a result, the difference in images between adjacent images before and after the refreshed areas, thereby constructing a natural image.

Since all blocks in the reference frame are not refreshed simultaneously and unconditionally as in the conventional method, but only a block indicating the difference to the extent that the deterioration of an image can be recognized is refreshed, the increment of the amount of codes during the refreshing process can be minimized.

While the invention has been shown and described with particular reference to the preferred embodiment thereof, it will be understood that variations and modifications in form and details may be made therein without departing from the spirit and scope of the inventions as defined in the appended claims.

What is claimed is:

1. A method of decoding coded image data of a valid block, said method comprising:

(a) decoding the coded image data of the valid block into decoded image data of the valid block, the valid block being one of first blocks having original image data with a variation greater than a predetermined threshold when compared to previous original image data of a corresponding block in a same position of second blocks in a reference frame, where only the original image data of valid blocks are encoded and the second blocks in the reference frame are renewed using the original image data of the valid blocks, where the second blocks in the reference frame contain the previous original image data of the valid blocks;

(b) identifying an address of an image memory for writing the decoded image data of the valid block, based on block information indicating which of the first blocks corresponds to the valid block; and (c) writing the decoded image data of the valid block into the image memory in accordance with the address.

2. The image data decoding method according to claim 1, wherein said identifying in step (b) comprises calculating a number of continuous invalid blocks based on the block information.

3. The image data decoding method according to claim 1, further comprising the step of:

(d) separating the coded image data of the valid block from the block information received together in input data.

4. The image data decoding method according to claim 1, wherein the block information is coded block information and said decoding in step (a) further comprises decoding the coded block information.

5. An image data decoding method decoding coded image data of a valid block, comprising:

decoding coded block information into decoded block information indicating which of first blocks corresponds to the valid block;

decoding the coded image data of the valid block into decoded image data of the valid block, the valid block being one of the first blocks having original image data with a variation greater than a predetermined threshold when compared to previous original image data of a corresponding block in a same position of second blocks in a reference frame, where only the original image data of valid blocks are encoded and the second blocks in the reference frame are renewed using the original image data of the valid blocks, where the second blocks in the reference frame contain the previous original image data of the valid blocks;

identifying a write address of an image memory for writing the decoded image data of the valid block, based on the decoded block information; and writing the decoded image data of the valid block into the image memory in accordance with the write address.

6. An image data decoding apparatus decoding coded image data of a valid block, comprising:

decoding means for decoding the coded image data of the valid block into decoded image data of the valid block, the valid block being one of first blocks having original image data with a variation greater than a predetermined threshold when compared to previous original image data of a corresponding block in a same position of second blocks in a reference frame, where only the original image data of valid blocks are encoded and the second blocks in the reference frame are renewed using the original image data of the valid blocks, where the second blocks in the reference frame contain the previous original image data of the valid blocks;

an image memory for storing the decoded image data of the valid blocks; and address calculating means for calculating a write address of said image memory for the decoded image data of the valid block based on block information indicating which of the first blocks corresponds to the valid block.

7. The image data decoding apparatus according to claim 6, wherein said address calculating means calculates a number of continuous invalid blocks from the block information and obtains said write address for said decoded image data of the valid block.

8. The image data decoding apparatus according to claim 6, further comprising:

separating means for separating the coded image data of the valid block from the block information received together in input data.

9. An image data decoding apparatus decoding coded image data of a valid block, comprising:

first decoding means for decoding the coded image data of the valid block into decoded image data of the valid block, the valid block being one of first blocks having original image data with a variation greater than a predetermined threshold when compared to previous original image data of a corresponding block in a same position of second blocks in a reference frame, where only the original image data of valid blocks are encoded and the second blocks in the reference frame are renewed using the original image data of the valid blocks, where the second blocks in the reference frame contain the previous original image data of the valid blocks;

second decoding means for decoding coded block information into decoded block information indicating which of the first blocks corresponds to the valid block;

an image memory for storing the decoded image data of the valid blocks; and address calculating means for calculating a writing address for the decoded image data of the valid block based on the decoded block information.

10. The image data decoding apparatus according to claim 9, wherein said address calculating means obtains the write address of the decoded image data by calculating a number of continuous invalid blocks from the decoded block information.

11. The image data decoding apparatus according to claim 9, further comprising:

separating means for separating the coded image data of the valid block from the coded block information received together in input data.

12. A method of decoding coded image data of a valid block, the valid block being one of first blocks representing a present frame having original image data with a variation greater than a predetermined threshold when compared to previous original image data of a corresponding block in a same position of second blocks in a reference frame, where only the original image data of valid blocks are encoded and the second blocks in the reference frame are renewed using the original image data of the valid blocks, where the second blocks in the reference frame contain the previous original image data of the valid blocks, comprising:

decoding the coded image data of the valid block into decoded image data of the valid block; and identifying an address of an image memory into which the decoded image data of the valid block is to be written based on block information indicating which of the first blocks corresponds to the valid block, the reference frame containing the second blocks being composed of previous image frames having coded image data.

13. A method according to claim 12, further comprising the step of decoding coded block information into decoded block information, the coded block information being the block information coded along with the coded image data of the valid block, and wherein said identifying step identifies the address based on the decoded block information.

14. An apparatus to decode coded image data of a valid block, the valid block being one of first blocks representing a present frame having original image data with a variation greater than a predetermined threshold when compared to previous original image data of a corresponding block in a same position of second blocks in a reference frame, where only the original image data of valid blocks are encoded and the second blocks in the reference frame are renewed using the original image data of the valid blocks, where the second blocks in the reference frame contain the previous original image data of the valid blocks, comprising:

decoding means for decoding the coded image data of the valid block into decoded image data of the valid block;

an image memory to store the decoded image data of the valid blocks; and address calculating means for calculating an address of an image memory for writing the decoded image data of the valid block, based on block information indicating which of the first blocks corresponds to the valid block, the reference frame containing the second blocks being composed of previous image frames having coded image data.

15. An apparatus according to claim 14, further comprising decoding means for decoding coded block information into decoded block information, the coded block information being the block information coded along with the coded image data of the valid block, and wherein said address calculating means calculates the address based on the decoded block information.

* * * * *